(12) United States Patent
Miki

(10) Patent No.: US 9,282,065 B2
(45) Date of Patent: Mar. 8, 2016

(54) RELAY UNIT

(75) Inventor: Shigeo Miki, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 223 days.

(21) Appl. No.: 13/605,441

(22) Filed: Sep. 6, 2012

(65) Prior Publication Data

US 2013/0083803 A1    Apr. 4, 2013

(30) Foreign Application Priority Data

Sep. 30, 2011   (JP) .................................. 2011-216493

(51) Int. Cl.
*H04L 29/14*    (2006.01)
*H04L 12/939*   (2013.01)

(52) U.S. Cl.
CPC .............. *H04L 49/555* (2013.01); *H04L 69/40* (2013.01)

(58) Field of Classification Search
CPC ............................. H04L 49/555; H04L 69/40
USPC .......................................................... 370/401
See application file for complete search history.

(56) References Cited

U.S. PATENT DOCUMENTS

2008/0305794 A1 * 12/2008 Mukaiyama et al. ...... 455/435.1

FOREIGN PATENT DOCUMENTS

JP    2007-174119 A    7/2007
KR    10-2010-0041003 A    4/2010

OTHER PUBLICATIONS

Hanzawa, "Complete Understanding of Spanning Tree", NIKKEI Network, pp. 60-70, Oct. 9, 2006.
Office Action issued by the Korean Patent office on Nov. 25, 2013 with a partial English translation.

* cited by examiner

*Primary Examiner* — Khaled Kassim
(74) *Attorney, Agent, or Firm* — Rabin & Berdo, P.C.

(57) ABSTRACT

A relay unit includes a main-system switch and a sub-system switch that are connected to each other via an inter-system line, that are connected to a main-system line and a sub-system line, and that relays a frame; and control sections that control a relay operation of the main-system switch and the sub-system switch. The control sections store information on a number of connections of relay units and information on a connection priority, and select a control aspect of the relay operation of at least one of the main-system switch and the sub-system switch according to the number of connections and the connection priority.

4 Claims, 58 Drawing Sheets

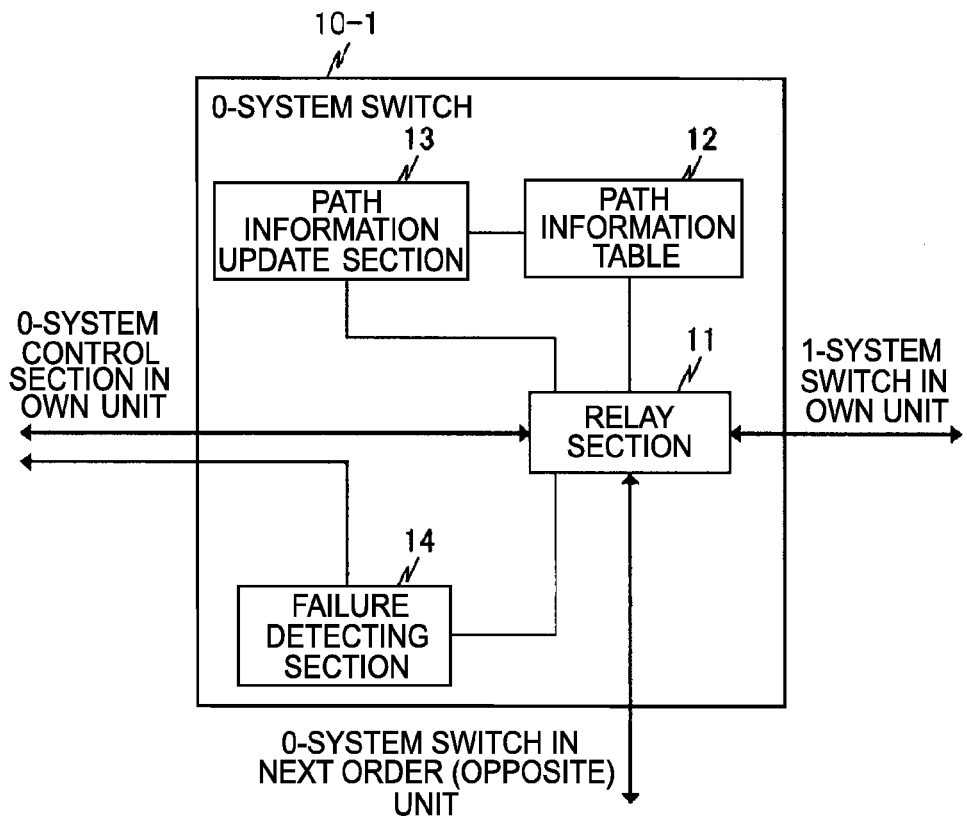

FIG.7

| NUMBER | CONNECTION STATE NAME | STATE |
|---|---|---|
| 1 | INDEPENDENT STATE | STATE IN WHICH COMMUNICATION BETWEEN OWN CONTROL SECTION AND OTHER SYSTEM-CONTROL SECTION IN OWN UNIT CANNOT BE ESTABLISHED AND STATE IN WHICH COMMUNICATION BETWEEN OWN CONTROL SECTION AND OPPOSITE CONTROL SECTION CANNOT BE ESTABLISHED<br>INITIAL STATE OF CONTROL SECTION |
| 2 | PERFECT STATE | STATE IN WHICH NO FAILURE OCCURS IN OWN UNIT, IN OPPOSITE UNIT, AND BETWEEN OWN UNIT AND OPPOSITE UNIT |
| 3 | FAILURE BETWEEN UNITS IN OTHER SYSTEM | STATE IN WHICH COMMUNICATION IS ESTABLISHED BETWEEN OWN CONTROL SECTION AND OTHER SYSTEM-CONTROL SECTION IN OWN UNIT AND BETWEEN OWN CONTROL SECTION AND OPPOSITE CONTROL SECTION, BUT FAILURE OCCURS BETWEEN OTHER SYSTEM-SWITCH IN OWN UNIT AND OPPOSITE SWITCH |
| 4 | FAILURE BETWEEN UNITS IN OWN SYSTEM | STATE IN WHICH COMMUNICATION IS ESTABLISHED BETWEEN OWN CONTROL SECTION AND OTHER SYSTEM-CONTROL SECTION IN OWN UNIT AND BETWEEN OTHER SYSTEM-CONTROL SECTION IN OWN UNIT AND OPPOSITE CONTROL SECTION, BUT FAILURE OCCURS BETWEEN OWN CONTROL SECTION AND OPPOSITE CONTROL SECTION |
| 5 | FAILURE IN OPPOSITE UNIT | STATE IN WHICH COMMUNICATION IS ESTABLISHED BETWEEN OWN CONTROL SECTION AND OTHER SYSTEM-CONTROL SECTION IN OWN UNIT, BETWEEN OWN CONTROL SECTION AND OPPOSITE CONTROL SECTION, AND BETWEEN OTHER SYSTEM-CONTROL SECTION IN OWN UNIT AND OPPOSITE CONTROL SECTION, BUT COMMUNICATION BETWEEN TWO CONTROL SECTIONS IN OPPOSITE UNIT CANNOT BE ESTABLISHED |
| 6 | FAILURE IN OWN UNIT | STATE IN WHICH COMMUNICATION BETWEEN OWN CONTROL SECTION AND OTHER SYSTEM-CONTROL SECTION IN OWN UNIT CANNOT BE ESTABLISHED, ALTHOUGH COMMUNICATION IS ESTABLISHED BETWEEN TWO CONTROL SECTIONS IN OWN UNIT AND TWO CONTROL SECTIONS IN OPPOSITE UNIT |
| 7 | DOUBLE FAILURE BETWEEN UNITS | STATE IN WHICH COMMUNICATION BETWEEN OWN CONTROL SECTION AND OTHER SYSTEM-CONTROL SECTION IN OWN UNIT IS ESTABLISHED, BUT FAILURE OCCURS BETWEEN OWN SWITCH AND OPPOSITE SWITCH AND BETWEEN OTHER SYSTEM-SWITCH IN OWN UNIT AND OPPOSITE SWITCH |
| 8 | SIMPLEX STATE | STATE IN WHICH COMMUNICATION IS ESTABLISHED BETWEEN OWN CONTROL SECTION AND OPPOSITE CONTROL SECTION, BUT COMMUNICATION CANNOT BE ESTABLISHED BETWEEN OWN CONTROL SECTION AND OTHER SYSTEM-CONTROL SECTION IN OWN UNIT AND BETWEEN TWO CONTROL SECTIONS IN OPPOSITE UNIT |
| 9 | FAILURE IN OPPOSITE UNIT AND FAILURE BETWEEN UNITS IN OTHER SYSTEM | STATE IN WHICH COMMUNICATION IS ESTABLISHED BETWEEN OWN CONTROL SECTION AND OTHER SYSTEM-CONTROL SECTION IN OWN UNIT AND BETWEEN OWN CONTROL SECTION AND OPPOSITE CONTROL SECTION, BUT COMMUNICATION CANNOT BE ESTABLISHED BETWEEN TWO CONTROL SECTIONS IN OPPOSITE UNIT AND BETWEEN OTHER SYSTEM-CONTROL SECTION AND OPPOSITE CONTROL SECTION |

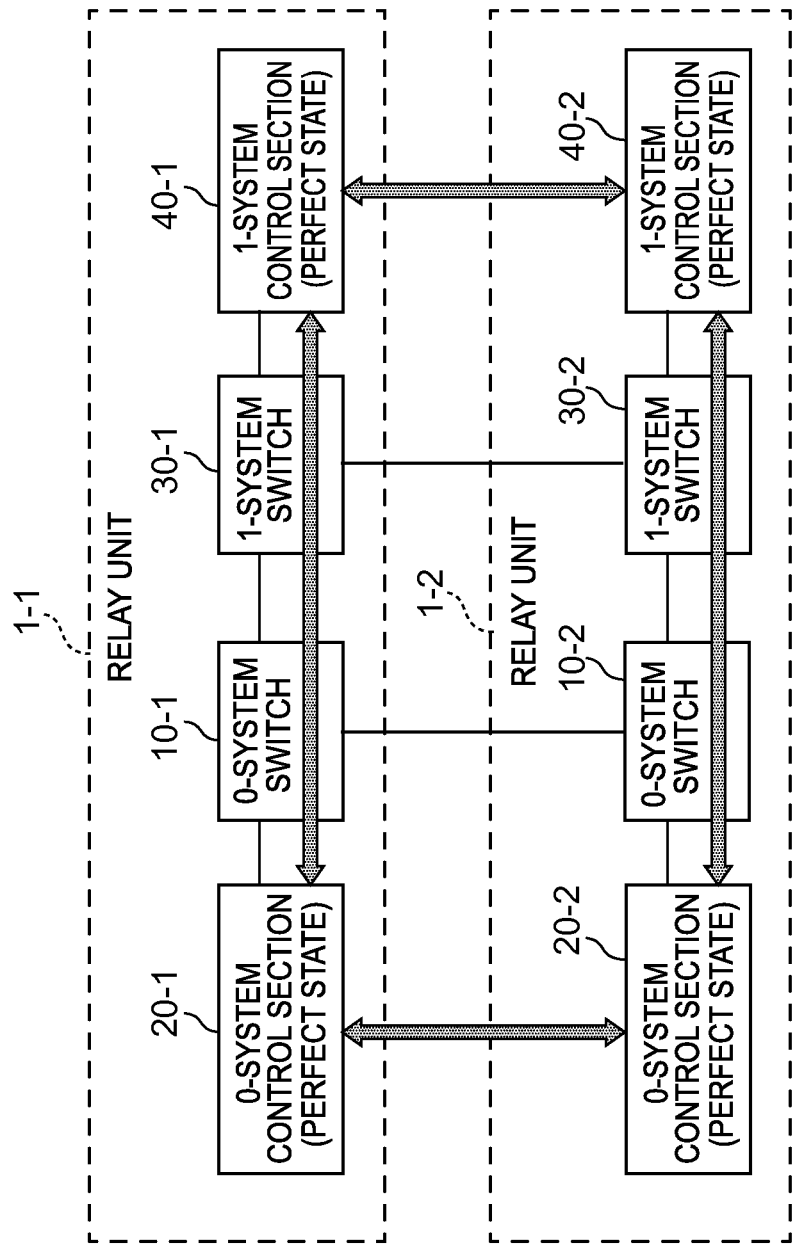

FIG.14

| NOTIFICATION INFORMATION NAME | CONTENT OF NOTIFICATION | NOTIFICATION DESTINATION |
|---|---|---|
| CONNECTION STATE | CONNECTION INFORMATION STORED IN CONTROL SECTION | OTHER SYSTEM-CONTROL SECTION IN OWN UNIT AND OPPOSITE CONTROL SECTION |
| OCCURRENCE OF FAILURE BETWEEN UNITS | NOTIFY DETECTION OF COMMUNICATION FAILURE WITH OPPOSITE SWITCH BY OWN SWITCH OR NOTIFY DETECTION OF COMMUNICATION FAILURE WITH OPPOSITE CONTROL SECTION | OTHER SYSTEM-CONTROL SECTION IN OWN UNIT |
| ESTABLISHMENT OF COMMUNICATION BETWEEN UNITS | NOTIFY ESTABLISHMENT OF COMMUNICATION WITH OPPOSITE CONTROL SECTION | OTHER SYSTEM-CONTROL SECTION IN OWN UNIT |
| OCCURRENCE OF FAILURE IN UNIT | NOTIFY DETECTION OF COMMUNICATION FAILURE WITH OTHER SYSTEM-SWITCH BY OWN SWITCH OR NOTIFY DETECTION OF COMMUNICATION FAILURE WITH OTHER SYSTEM CONTROL SECTION IN OWN UNIT | OPPOSITE CONTROL SECTION |
| ESTABLISHMENT OF COMMUNICATION IN UNIT | NOTIFY ESTABLISHMENT OF COMMUNICATION WITH OTHER SYSTEM-CONTROL SECTION IN OWN UNIT | OPPOSITE CONTROL SECTION |

FIG.15

| NUMBER | COMMAND NAME | CONTENT OF COMMAND |
|---|---|---|
| COMMAND 1 | COMMAND TO PERMIT RELAY TO OTHER SYSTEM-SWITCH | PERMIT RELAY OF USER TRAFFIC TO OTHER SYSTEM-SWITCH |
| COMMAND 2 | COMMAND TO PERMIT RELAY TO OPPOSITE SWITCH | PERMIT RELAY OF USER TRAFFIC TO OPPOSITE SWITCH |
| COMMAND 3 | COMMAND TO PROHIBIT RELAY TO OTHER SYSTEM-SWITCH | COMMAND WHICH IS NOTIFIED AFTER COMMUNICATION WITH OTHER SYSTEM-CONTROL SECTION IS DISCONNECTED AND WHICH PROHIBITS RELAY OF USER TRAFFIC TO OTHER SYSTEM-SWITCH |
| COMMAND 4 | COMMAND TO PROHIBIT RELAY TO OPPOSITE SWITCH | COMMAND WHICH IS NOTIFIED AFTER COMMUNICATION WITH OPPOSITE CONTROL SECTION IS DISCONNECTED AND WHICH PROHIBITS RELAY OF USER TRAFFIC TO OPPOSITE SWITCH |
| COMMAND 5 | RELAY SUPPRESSION VALIDATION COMMAND | SUPPRESS PROCESSING FOR RELAYING USER TRAFFIC RECEIVED FROM OTHER SYSTEM-SWITCH TO OPPOSITE SWITCH |
| COMMAND 6 | RELAY SUPPRESSION INVALIDATION COMMAND | RELEASE SUPPRESSION OF PROCESSING FOR RELAYING USER TRAFFIC RECEIVED FROM OTHER SYSTEM-SWITCH TO OPPOSITE SWITCH |
| COMMAND 7 | COMMAND TO DELETE PATH TO OPPOSITE SWITCH | DELETE MAC ADDRESS WHOSE TRANSMISSION PATH IS SET TO OPPOSITE SWITCH FROM PATH CONTROL TABLE |
| COMMAND 8 | COMMAND TO DELETE PATH TO OTHER SYSTEM-SWITCH | DELETE MAC ADDRESS WHOSE TRANSMISSION PATH IS SET TO OTHER SYSTEM-SWITCH FROM PATH CONTROL TABLE |

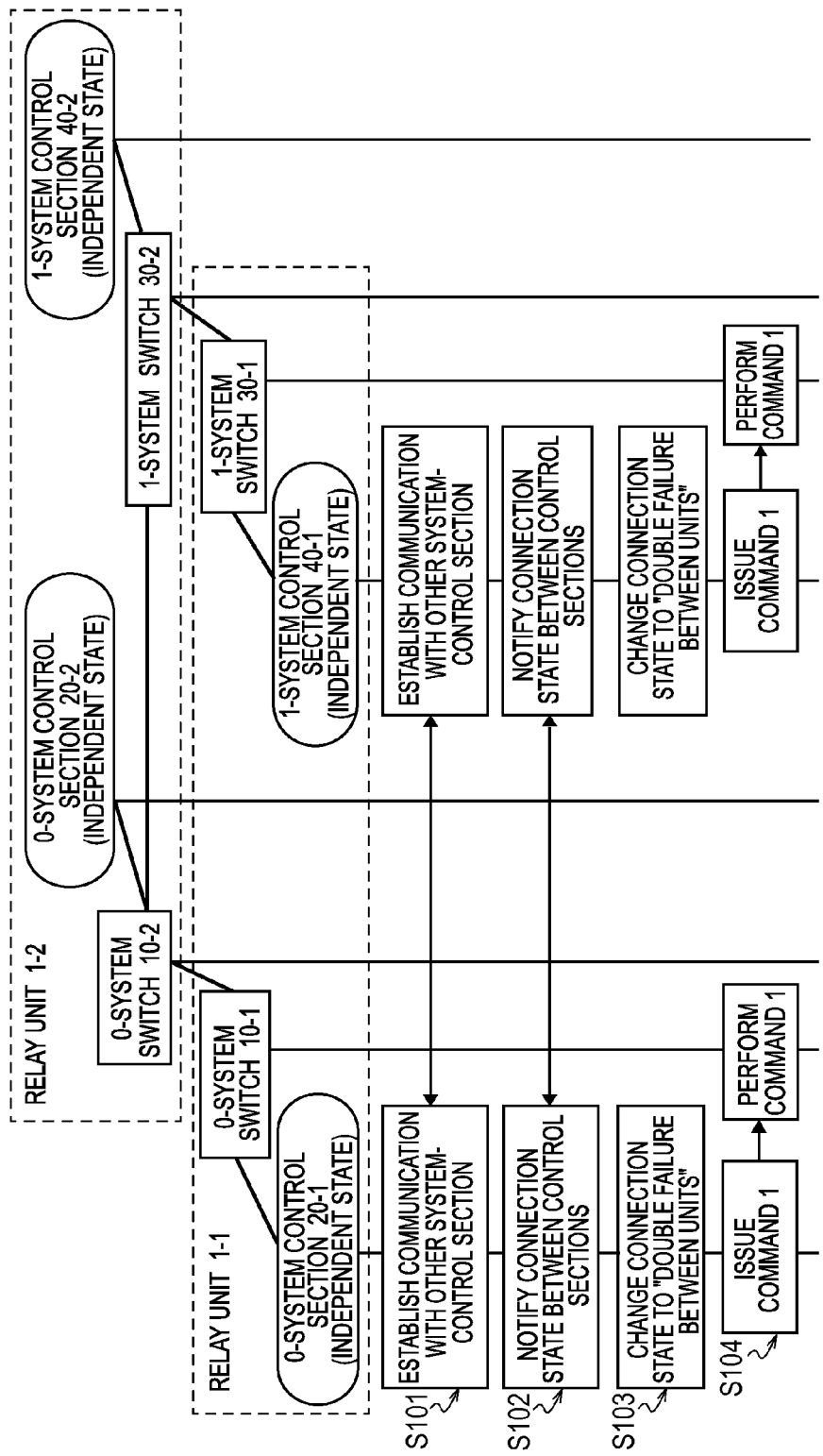

FIG.18

| CONNECTION STATE OF OTHER SYSTEM-CONTROL SECTION / CONNECTION STATE OF OWN CONTROL SECTION | INDEPENDENT STATE | SIMPLEX STATE | FAILURE IN OWN UNIT |
|---|---|---|---|
| INDEPENDENT STATE | DOUBLE FAILURE BETWEEN UNITS | FAILURE BETWEEN UNITS IN OWN SYSTEM | FAILURE BETWEEN UNITS IN OWN SYSTEM |
| SIMPLEX STATE | FAILURE BETWEEN UNITS IN OTHER SYSTEM AND FAILURE IN OPPOSITE UNIT | FAILURE IN OPPOSITE UNIT | NO CASE |
| FAILURE IN OWN UNIT | FAILURE BETWEEN UNITS IN OTHER SYSTEM | NO CASE | PERFECT STATE |

FIG.23

| CONNECTION STATE BEFORE NOTIFICATION IS RECEIVED | CONNECTION STATE AFTER NOTIFICATION IS RECEIVED |
|---|---|
| DOUBLE FAILURE BETWEEN UNITS | FAILURE BETWEEN UNITS IN OWN SYSTEM |
| FAILURE BETWEEN UNITS IN OTHER SYSTEM AND FAILURE IN OPPOSITE UNIT | FAILURE IN OPPOSITE UNIT |
| FAILURE BETWEEN UNITS IN OTHER SYSTEM | PERFECT STATE |

FIG.24

| CONNECTION STATE OF OTHER SYSTEM-CONTROL SECTION / CONNECTION STATE OF OWN CONTROL SECTION | INDEPENDENT STATE | DOUBLE FAILURE BETWEEN UNITS | FAILURE BETWEEN UNITS IN OWN SYSTEM |
|---|---|---|---|
| INDEPENDENT STATE | SIMPLEX STATE | FAILURE IN OWN UNIT | FAILURE IN OWN UNIT |
| DOUBLE FAILURE BETWEEN UNITS | FAILURE BETWEEN UNITS IN OTHER SYSTEM AND IN OPPOSITE UNIT | FAILURE BETWEEN UNITS IN OTHER SYSTEM | NO CASE |
| FAILURE BETWEEN UNITS IN OWN SYSTEM | FAILURE IN OPPOSITE UNIT | NO CASE | PERFECT STATE |

FIG.28

| CONNECTION STATE BEFORE COMMUNICATION IS UNAVAILABLE | CONNECTION STATE AFTER COMMUNICATION IS UNAVAILABLE |
|---|---|
| SIMPLEX STATE | INDEPENDENT STATE |
| FAILURE IN OWN UNIT | INDEPENDENT STATE |
| FAILURE BETWEEN UNITS IN OTHER SYSTEM AND FAILURE IN OPPOSITE UNIT | DOUBLE FAILURE BETWEEN UNITS |
| FAILURE BETWEEN UNITS IN OTHER SYSTEM | DOUBLE FAILURE BETWEEN UNITS |
| FAILURE IN OPPOSITE UNIT | FAILURE BETWEEN UNITS IN OWN SYSTEM |
| PERFECT STATE | FAILURE BETWEEN UNITS IN OWN SYSTEM |

FIG.30

| CONNECTION STATE BEFORE COMMUNICATION IS UNAVAILABLE | CONNECTION STATE AFTER COMMUNICATION IS UNAVAILABLE |
|---|---|
| DOUBLE FAILURE BETWEEN UNITS | INDEPENDENT STATE |
| FAILURE BETWEEN UNITS IN OWN SYSTEM | INDEPENDENT STATE |
| FAILURE BETWEEN UNITS IN OTHER SYSTEM AND FAILURE IN OPPOSITE UNIT | SIMPLEX STATE |
| FAILURE IN OPPOSITE UNIT | SIMPLEX STATE |
| FAILURE BETWEEN UNITS IN OTHER SYSTEM | FAILURE IN OWN UNIT |
| PERFECT STATE | FAILURE IN OWN UNIT |

FIG.32

| CONNECTION STATE BEFORE NOTIFICATION IS RECEIVED | CONNECTION STATE AFTER NOTIFICATION IS RECEIVED |
|---|---|
| FAILURE BETWEEN UNITS IN OWN SYSTEM | DOUBLE FAILURE BETWEEN UNITS |
| FAILURE IN OPPOSITE UNIT | FAILURE BETWEEN UNITS IN OTHER SYSTEM AND FAILURE IN OPPOSITE UNIT |
| PERFECT STATE | FAILURE BETWEEN UNITS IN OTHER SYSTEM |

FIG.34

| CONNECTION STATE BEFORE NOTIFICATION IS RECEIVED | CONNECTION STATE AFTER NOTIFICATION IS RECEIVED |
|---|---|
| FAILURE BETWEEN UNITS IN OWN SYSTEM | SIMPLEX STATE |
| FAILURE IN OPPOSITE UNIT | FAILURE BETWEEN UNITS IN OTHER SYSTEM AND FAILURE IN OPPOSITE UNIT |
| PERFECT STATE | FAILURE BETWEEN UNITS IN OTHER SYSTEM |

FIG.36

| CONNECTION STATE BEFORE NOTIFICATION IS RECEIVED | CONNECTION STATE AFTER NOTIFICATION IS RECEIVED |
|---|---|
| SIMPLEX STATE | FAILURE BETWEEN UNITS IN OWN SYSTEM |
| FAILURE BETWEEN UNITS IN OTHER SYSTEM AND FAILURE IN OPPOSITE UNIT | FAILURE IN OPPOSITE UNIT |
| FAILURE IN UNITS IN OTHER SYSTEM | PERFECT STATE |

RELAY UNIT

CROSS-REFERENCE TO RELATED APPLICATIONS

This application claims priority under 35 USC 119 from Japanese Patent Application No. 2011-216493 filed on Sep. 30, 2011, the disclosure of which is incorporated by reference herein.

BACKGROUND OF THE INVENTION

1. Technical of the Field

The invention relates to a relay unit which include two-system switches that relay frames and which is cascaded in multiple stages to form a LAN.

2. Description of the Related Art

For example, in a communication network such as a layer 2 network, a structure has been used in which plural switches are connected to each other in a ring shape or a mesh shape in order to achieve redundancy with respect to the relay of frames. When this structure is simply used as is, frames are continuously looped between the switches. As a technique for preventing an infinite loop of frames, a spanning tree technique is known, for example. This technique determines a root switch based on an ID exchanged among the switches and determines a port to be invalidated based on a path cost from the root switch, thereby forming a loop-free tree structure. In addition, for example, Japanese Patent Application Laid-Open (JP-A) No. 2007-174119 discloses a technique for preventing a loop. JP-A No. 2007-174119 discloses a technique that arranges switches in a ring shape, and blocks the relay of frames using a specific port when a master device, which is one of the switches, has detected a loop, thereby preventing looping of frames.

However, in the spanning tree structure, since one switch is a root switch, the position at which the relay of frames is blocked is fixed and it is difficult to flexibly switch the relay routes when a failure occurs. As a result, it is difficult to effectively use the relay paths that can be formed between the switches. In addition, in JP-A No. 2007-174119, a loop is detected using the master device as the base, and the master device blocks the relay of frames using a specific port. Therefore, a similar situation occurs. In these techniques, when relay units including the switches are cascaded in multiple stages, it is thought that it is difficult to flexibly change the switching aspect of the relay route according to the number of connections.

SUMMARY OF THE INVENTION

The present invention has been made in view of the above circumstances and provides a relay unit.

According to a first aspect of the invention, there is provided a relay unit, the relay unit being configured to cascade in multiple stages to form a LAN and including: a main-system line and a sub-system line that relay a frame; an inter-system line that connects the main-system line and the sub-system line; a main-system switch and a sub-system switch that are connected to each other via the inter-system line, that are connected to the main-system line and the sub-system line, respectively, and that relay frames; and control sections that control a relay operation of each of the main-system switch and the sub-system switch, that can store information on a number of connections of relay units in the LAN and information on a connection priority of the relay unit to which the control sections belong, and that select a control aspect of the relay operation of at least one of the main-system switch and the sub-system switch according to the number of connections and the connection priority.

According to the relay unit of the first aspect of the invention, it is possible to form a network such that the number of connections can be flexibly increased or decreased and it is possible to effectively use the relay paths that can be formed among the switches.

BRIEF DESCRIPTION OF THE DRAWINGS

Preferred embodiments of the invention will be described in detail based on the following figures, wherein:

FIG. 2 is a block diagram illustrating the structure of the 0-system switch in FIG. 1;

FIG. 3 is a diagram illustrating an example of the path information table in FIG. 2;

FIG. 7 is a diagram illustrating a connection state which may be stored in the connection state storage section in FIGS. 5 and 6;

FIG. 8 is a diagram illustrating, with arrows, a communication state when the connection state in FIG. 7 is "perfect state";

FIG. 14 is a diagram illustrating a list of information items communicated between the control sections in FIG. 1;

FIG. 15 is a diagram illustrating a list of commands which may be issued from each of the control sections in FIG. 1 to a control target switch;

FIG. 17 is a sequence diagram illustrating the operations of switches and control sections in two systems at the time of the processing for establishing initial communication with the other system-control section;

FIG. 18 is a diagram illustrating a transition table of connection states at the time of the processing for establishing initial communication with the other system-control section;

FIG. 23 is a diagram illustrating a transition table of connection states when an inter-unit communication establishment notification is received;

FIG. 24 is a diagram illustrating a transition table of connection states at the time of the processing for establishing initial communication with the opposing control section;

FIG. 28 is a diagram illustrating a transition table of connection states when failure between units is detected;

FIG. 30 is a diagram illustrating a transition table of connection states when failure in the own unit is detected;

FIG. 32 is a diagram illustrating a transition table of connection states when the inter-unit failure occurrence notification is received;

FIG. 34 is a diagram illustrating a transition table of connection states when notification of the occurrence of failure in a unit is received;

FIG. 36 is a diagram illustrating a transition table of connection states when notification of the establishment of communication in a unit is received;

DETAILED DESCRIPTION OF THE INVENTION

Hereinafter, exemplary embodiments of the invention will be described in detail with reference to the accompanying drawings.

<First Embodiment>

Figure 1:
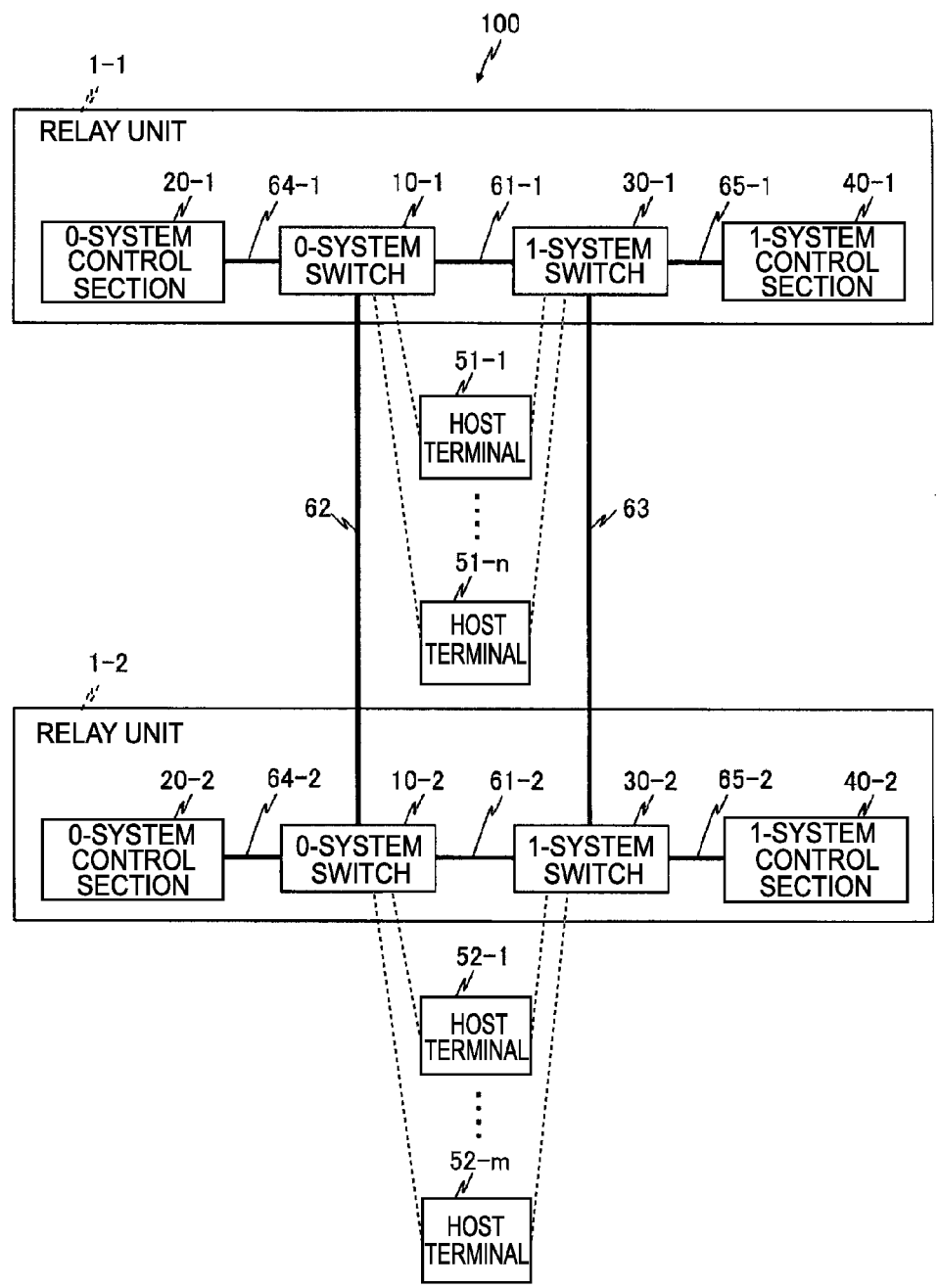
FIG. 1 is a block diagram illustrating the structure of a relay system according to a first embodiment of the invention.

FIG. 1 illustrates the structure of a relay system 100 according to an embodiment of the invention. The relay system 100 includes host terminals 51-1 to 51-n (n is an integer equal to or greater than 2) and relay units 1-1 and 1-2 which relay frames between host terminals 52-1 to 52-m (m is an integer equal to or greater than 2). The relay unit 1-1 and the relay unit 1-2 are cascaded via relay paths 62 and 63 to form a local area network (LAN).

The relay unit 1-1 includes a 0-system switch 10-1 and a 1-system switch 30-1 which are duplicated for the redundancy of a frame relay path, a 0-system control section 20-1 which controls the 0-system switch 10-1, and a 1-system control section 40-1 which controls the 1-system switch 30-1. Similarly, the relay unit 1-2 includes a 0-system switch 10-2 and a 1-system switch 30-2 which are duplicated for the redundancy of a frame relay path, a 0-system control section 20-2 which controls the 0-system switch 10-2, and a 1-system control section 40-2 which controls the 1-system switch 30-2. Hereinafter, the 0-system switches 10-1 and 10-2 are also referred to as main-system switches and the 1-system switches 30-1 and 30-2 are also referred to as sub-system switches.

Each of the host terminals 51-1 to 51-n can transmit and receive frames to and from one of the 0-system switch 10-1 and the 1-system switch 30-1 which is selected as a currently used system. Similarly, each of the host terminals 52-1 to 52-m can transmit and receive frames to and from one of the 0-system switch 10-2 and the 1-system switch 30-2 which is selected as a currently used system. These host terminals are, for example, terminals with a communication function, such as personal computers.

The 0-system switch 10-1 and the 1-system switch 30-1 can relay frames each other via a relay path 61-1 in the relay unit 1-1. Similarly, the 0-system switch 10-2 and the 1-system switch 30-2 can relay frames each other via a relay path 61-2 in the relay unit 1-2. In addition, the 0-system switch 10-1 and the 0-system switch 10-2 can relay frames each other between the units via the relay path 62. Similarly, the 1-system switch 30-1 and the 1-system switch 30-2 can relay frames each other between the units via the relay path 63. These switches are, for example, layer 2 switches (L2SW). Hereinafter, the relay path 62 and the relay path 63 are referred to as a main-system line and a sub-system line, respectively. Each of the relay paths 61-1 and 61-2 is referred to as an inter-system line.

The 0-system control section 20-1 can issue various commands to the 0-system switch 10-1 via a communication path 64-1 to control the 0-system switch 10-1. The 1-system control section 40-1 can issue various commands to the 1-system switch 30-1 via a communication path 65-1 to control the 1-system switch 30-1. Similarly, the 0-system control section 20-2 can issue various commands to the 0-system switch 10-2 via a communication path 64-2 to control the 0-system switch 10-2. The 1-system control section 40-2 can issue various commands to the 1-system switch 30-2 via a communication path 65-2 to control the 1-system switch 30-2.

The 0-system control section 20-1 and the 1-system control section 40-1 can establish communication in units each other via the communication path 64-1, the relay path 61-1, and the communication path 65-1. Similarly, the 0-system control section 20-2 and the 1-system control section 40-2 can establish communication in units each other via the communication path 64-2, the relay path 61-2, and the communication path 65-2. The 0-system control section 20-1 and the 0-system control section 20-2 can establish inter-unit communication each other via the communication path 64-1, the relay path 62, and the communication path 64-2. Similarly, the 1-system control section 40-1 and the 1-system control section 40-2 can establish inter-communication each other via the communication path 65-1, the relay path 63, and the communication path 65-2. Each of the control sections is, for example, a CPU that executes a predetermined communication control program.

FIG. 2 illustrates the structure of the 0-system switch 10-1.

A relay unit 11 relays various frames among the 0-system control section 20-1 in the relay unit 1-1, which is an own unit (a self unit), the 1-system switch 30-1 in the own unit, and the 0-system switch 10-2 in the relay unit 1-2, which is the next-order relay unit. In this embodiment, only two relay units, that is, the relay units 1-1 and 1-2, are provided. Therefore, when the relay unit 1-1 is a main unit, the relay unit 1-2 is referred to as an opposite unit (an opposing unit).

If the transmission source address of the transmitted frame is stored in a path information table 12, the relay section 11 transmits the frame to a relay path corresponding to the transmission source address. If the transmission source address is not stored in the path information table 12, the relay section 11 relays the frame to all of the relay paths corresponding to VLAN to which the frame belongs. The relay section 11 starts, stops, suppresses, and resumes the relay of frames for specific traffic in response to a relay permission command, a relay prohibition command, a relay suppression validation command, and a relay suppression invalidation command from the 0-system control section 20-1. These commands are notified by the frames via the communication path 64-1.

FIG. 3 illustrates an example of the path information table 12. An "address" is the MAC address of a relay destination. A "virtual group" is a virtual network group, that is, a VLAN group. The groups include, for example, a group (hereinafter, referred to as VLAN_A) for relaying a user frame, a group (hereinafter, referred to as VLAN_B) for relaying a control frame between the control sections in the same unit, and a group (hereinafter, referred to as VLAN_C) for relaying a control frame between the control sections in the opposite unit.

The relay paths 61-1 and 61-2 in the same unit belong to both VLAN_A and VLAN_B as trunk lines, and traffics are virtually separated into VLAN_A and VLAN_B such that the frames of the VLAN_A and VLAN_B do not intersect each other.

The relay paths 62 and 63 between the opposite units belong to both VLAN_A and VLAN_C as trunk lines, and traffics are virtually separated into VLAN_A and VLAN_C such that the frames of the VLAN_A and VLAN_C do not intersect each other.

The communication paths 64-1, 64-2, 65-1, and 65-2 among the switches and the control sections belong to both VLAN_B and VLAN_C as trunk lines, and traffics are virtually separated into VLAN_B and VLAN_C such that the frames of the VLAN_B and VLAN_C do not intersect each other.

The "transmission path" indicates the relay destination of frames. In FIG. 3, the relay path 61-1 and the relay path 62 are illustrated as an example. The transmission paths are in one-to-one correspondence with ports. The relay section 11 transmits the received frame to the transmission path corresponding to the transmission source MAC address of the frame.

When the transmission source MAC address which is included in the frame transmitted to the relay section 11 is not stored in the path information table 12, the path information update section 13 associates the transmission source MAC address with the transmission path and stores them in the path information table 12. The path information update section 13 deletes the MAC address in the path information table 12 in response to a MAC address deletion command from the 0-system control section 20-1.

A failure detecting section 14 monitors the frames relayed by the relay section 11 and the state of the communication path connected to the relay section 11 to detect a traffic failure. For example, the failure can be detected by a keep-alive function of a switch manufactured by Cisco Systems, Inc. When a failure is detected, the failure detecting section 14 transmits a failure detection notification to the 0-system control section 20-1. At that time, the failure detecting section 14 also notifies the 0-system control section 20-1 of a relay path (for example, the relay path 61-1 or 62) where a failure has occurred.

The 0-system switch 10-2 has the same structure as that of the 0-system switch 10-1.

Figure 4:
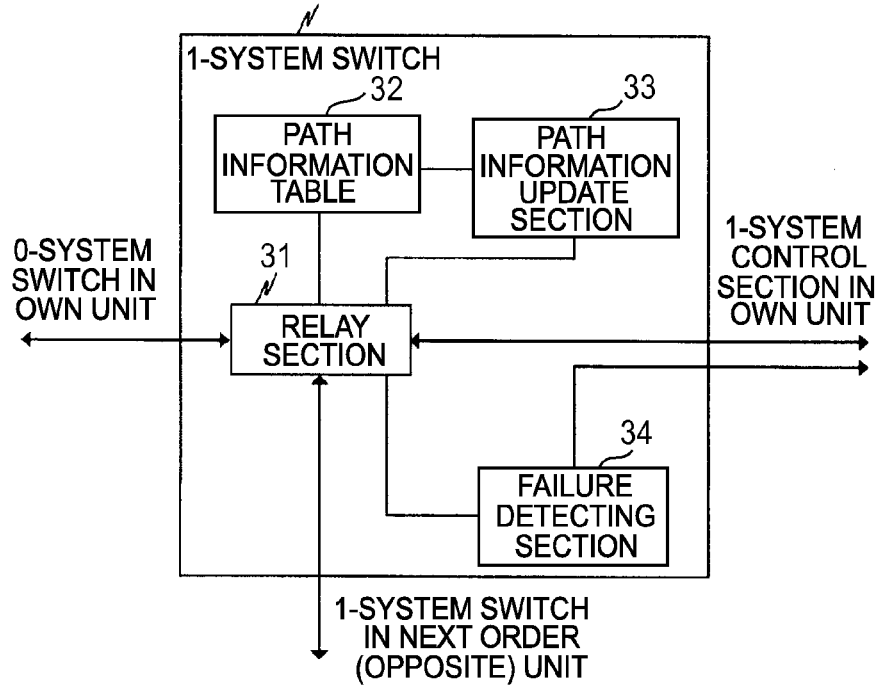
FIG. 4 is a block diagram illustrating the structure of the 1-system switch in FIG. 1.

FIG. 4 illustrates the structure of the 1-system switch 30-1.

A relay section 31 relays various frames among the 1-system control section 40-1 in the relay unit 1-1, which is an own unit, the 0-system switch 10-1 in the own unit, and the 1-system switch 30-2 in the relay unit 1-2, which is the next order (opposite) unit. If the transmission source address of the received frame is stored in a path information table 32, the relay section 31 transmits the frame to a relay path corresponding to the transmission source address. If the transmission source address is not stored in the path information table 32, the relay section 31 relays the frame to all of the relay paths corresponding to VLAN to which the frame belongs. The relay section 31 starts, stops, suppresses, and resumes the relay of frames for specific traffic in response to a relay permission command, a relay prohibition command, a relay suppression validation command, and a relay suppression invalidation command from the 1-system control section 40-1. These commands are notified by the frames via the communication path 65-1. The path information table 32 is the same as that illustrated in FIG. 3.

If the transmission source MAC address, which is included in the frame transmitted to the relay section 31, is not stored in the path information table 32, a path information update section 33 associates the transmission source MAC address with the transmission path to store them in the path information table 32. The path information update section 33 deletes the MAC address in the path information table 32 in response to one MAC address deletion command from the 1-system control section 40-1.

The failure detecting section 34 monitors packets relayed by the relay section 31 and the state of the communication path connected to the relay section 31 to detect a traffic failure. The failure can be detected by a keep-alive function of a switch manufactured by Cisco Systems, Inc. If a failure is detected, the failure detecting section 34 transmits a failure detection notification to the 1-system control section 40-1. At that time, the failure detecting section 34 also notifies the 1-system control section 40-1 of a relay path (for example, the relay path 61-1 or 63) where a failure has occurred.

The 1-system switch 30-2 has the same structure as the 1-system switch 30-1.

Figure 5:
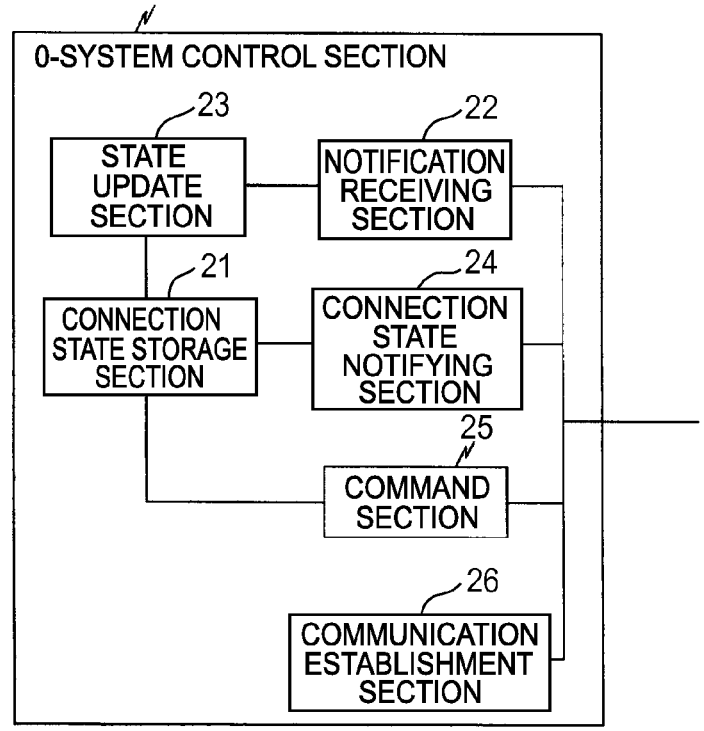
FIG. 5 is a block diagram illustrating the structure of the 0-system control section in FIG. 1.

FIG. 5 illustrates the structure of the 0-system control section 20-1. The 0-system control section 20-1 controls the 0-system switch 10-1 as a control target switch.

A connection state storage section 21 stores data indicating the connection state among the switches and the control sections. The connection state can be updated by a state update section 23. The connection state will be described in detail below (see FIG. 7). The connection state storage section 21 may also store the number of connections (N) between the relay units 1-1 and 1-2 and the connection priority (P) of the relay unit 1-1, which is an own unit. In this embodiment, the number of connections is "2". The connection priority of the relay unit 1-1 is, for example, "1", and the connection priority of the relay unit 1-2 is, for example, "2". The connection state storage section 21 is a storage device, such as a RAM or a hard disk. The number of connections and the connection priority are stored in the storage device and they can be rewritten.

The notification receiving section 22 receives the failure detection notification from the 0-system switch 10-1, and receives a connection state notification, a communication establishment notification, and a failure occurrence notification from the 1-system control section 40-1 in the own unit or the 0-system control section 20-2 in the opposite unit.

The state update section 23 updates the connection state of the connection state storage section 21 according to the content of the notifications. The content of the update will be described in detail below (see FIG. 18, FIG. 22, FIG. 26, FIG. 28, FIG. 30, FIG. 32, FIG. 34, and FIG. 36).

A connection state notifying section 24 notifies the 1-system control section 40-1 in the own unit and/or the 0-system control section 20-2 in the opposite unit, of the connection state stored in the connection state storage section 21. In addition, the connection state notifying section 24 transmits the communication establishment notification and the failure occurrence notification to the 1-system control section 40-1 and/or the 0-system control section 20-2.

A command section 25 transmits various commands to the 0-system switch 10-1, which is a control target switch, based on the connection state stored in the connection state storage section 21, thereby controlling the 0-system switch 10-1. The commands will be described in detail below (FIG. 14).

A communication establishment section 26 establishes communication between the 1-system control section 40-1 and the 0-system control section 20-2.

The notification receiving section 22, the state update section 23, the connection state notifying section 24, and the command section 25 perform the operation according to this embodiment if the number of connections stored in the connection state storage section 21 is "2".

The 0-system control section 20-2 has the same structure as the 0-system control section 20-1. The 0-system control section 20-2 controls the 0-system switch 10-2 as a control target switch.

Figure 6:
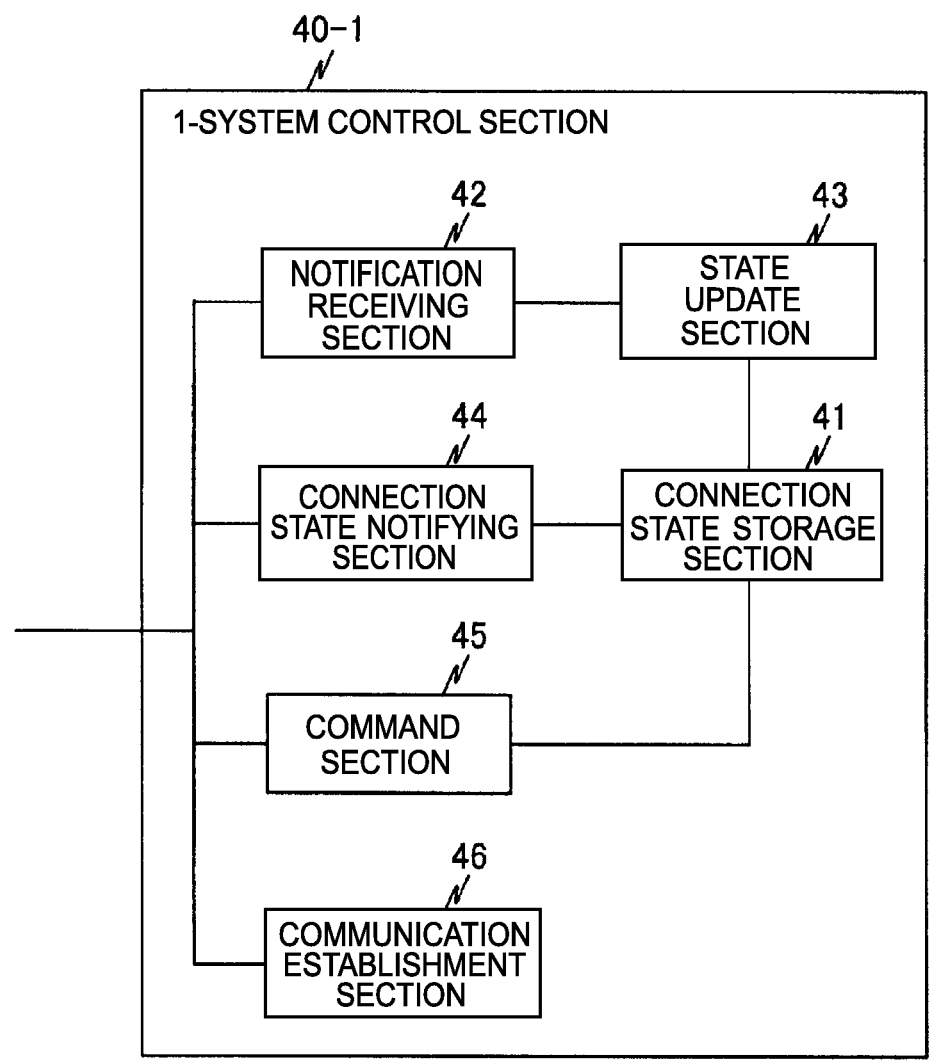
FIG. 6 is a block diagram illustrating the structure of the 1-system control section in FIG. 1.

FIG. 6 illustrates the structure of the 1-system control section 40-1. The 1-system control section 40-1 controls the 1-system switch 30-1 as a control target switch.

A connection state storage section 41 stores data indicating the connection state among the switches and the control sections. The connection state can be updated by the state update section 43. The connection state will be described in detail below (see FIG. 7).

A notification receiving section 42 receives a failure detection notification from the 1-system switch 30-1, and receives a connection state notification, a communication establishment notification, and a failure occurrence notification from the 0-system control section 20-1 in the own unit or the 1-system control section 40-2 in the opposite unit.

A state update section 43 updates the connection state of the connection state storage section 41 according to the content of the notifications. The content of the update will be described in detail below (see FIG. 18, FIG. 22, FIG. 26, FIG. 28, FIG. 30, FIG. 32, FIG. 34, and FIG. 36).

A connection state notifying section 44 notifies the 0-system control section 20-1 in the own unit and/or the 1-system control section 40-2 in the opposite unit of the connection state stored in the connection state storage section 41. The connection state notifying section 44 can transmit the communication establishment notification and the failure occurrence notification to the 0-system control section 20-1 and/or the 1-system control section 40-2.

A command section 45 transmits various commands to the 1-system switch 30-1, which is a control target switch, based on the connection state stored in the connection state storage section 41, thereby controlling the 1-system switch 30-1. The commands will be described in detail below (FIG. 14).

A communication establishment section 46 establishes communication between the 0-system control section 20-1 and the 1-system control section 40-2.

The 1-system control section 40-2 has the same structure as that of the 1-system control section 40-1. The 1-system control section 40-2 controls the 1-system switch 30-2 as a control target switch.

FIG. 7 illustrates the connection state which may be stored in the connection state storage sections 21 and 41. Hereinafter, a control section, which is an operation subject, is referred to as an own control section. A system including the control section, which is an operation subject, is referred to as an own system, and a system other than the own system is referred to as the other system. A control section, which is provided in the same relay unit of the own control section and which is for the other system, is referred to as the other system-control section. A relay unit including the own control section is referred to as an own unit. A relay unit opposite to the own unit is referred to as an opposite unit. Two control sections included in the opposite unit are referred to as an opposite control section with respect to the own control section, and an opposite control section with respect to the other system-control section, according to the corresponding systems. A switch, which the own control section controls as a control target, is referred to as a control target switch. A switch, which the other system-control section controls as a control target, is referred to as the other system-switch. Two switches included in the opposite unit are referred to as an opposite switch with respect to the control target switch, and an opposite switch with respect to the other system-switch, according to the corresponding systems.

An "independent state" is a state in which communication can not be established between the own control section and the other system-control section in the own unit and a state in which communication can not be established between the own control section and the opposite control section. The "independent state" is the initial state of the control section.

A "perfect state" is a state in which no failure occurs in the own unit, in the opposite unit, and between the own unit and the opposite unit. In other words, in the "perfect state", the control sections can communicate with each other. In FIG. 8, in the case of the "perfect state", the connection state is indicated by arrows.

Figure 9:
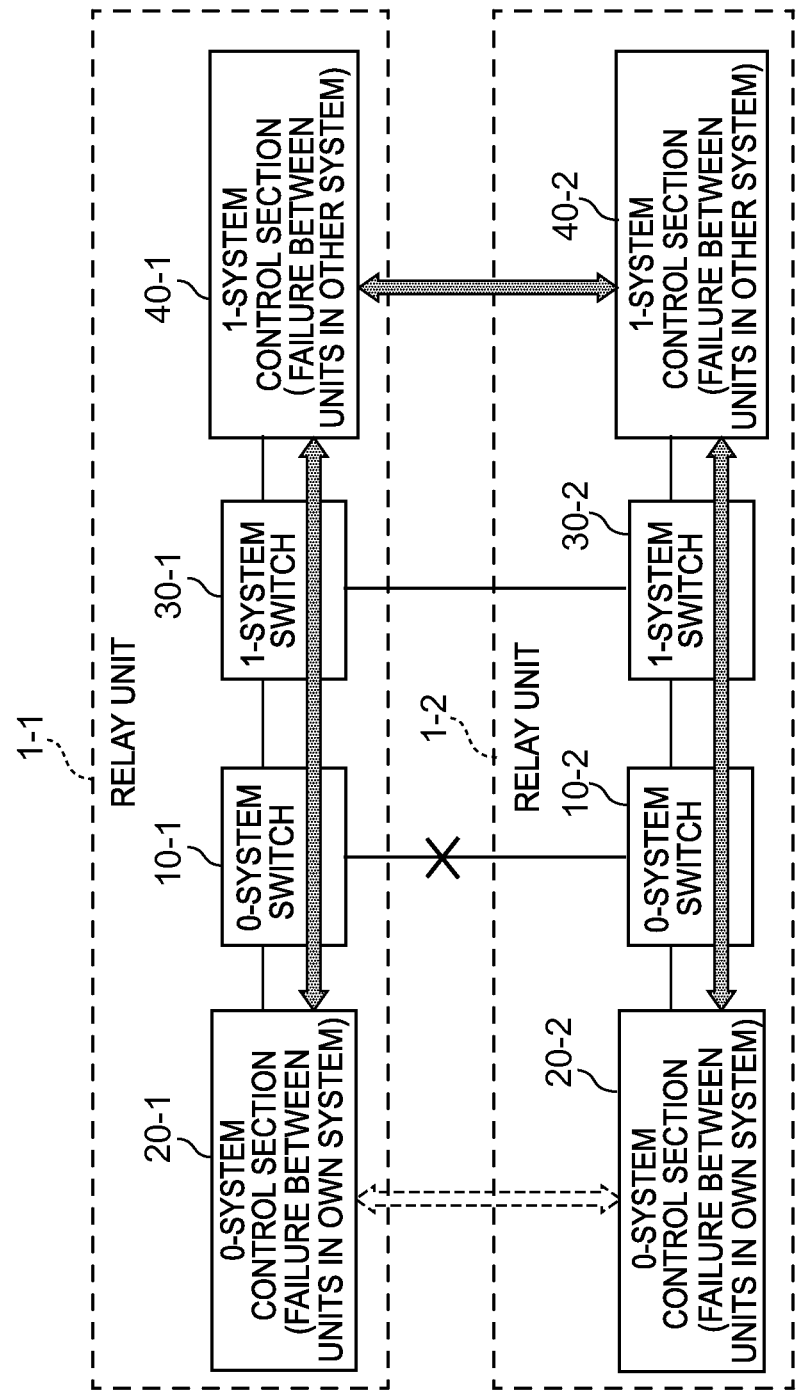
FIG. 9 is a diagram illustrating, with arrows, a communication state when the connection state in FIG. 7 is "failure between units in the other system" and "failure between units in the own system"

A "failure between the units in the other system" is a state in which communication is established between the own control section and the other system-control section in the own unit and between the own control section and the opposite control section, but a failure is taking place between the other system-switch in the own unit and the opposite switch. In FIG. 9, in the case of the "failure between the units in the other system", the connection state is indicated by arrows.

A "failure between the units in the own system" is a state in which communication is established between the own control section and the other system-control section in the own unit and between the other system-control section in the own unit and the opposite control section, but a failure is taking place between the own control section and the opposite control section. In FIG. 9, in the case of the "failure between the units in the own system", the connection state is indicated by arrows.

Figure 10:
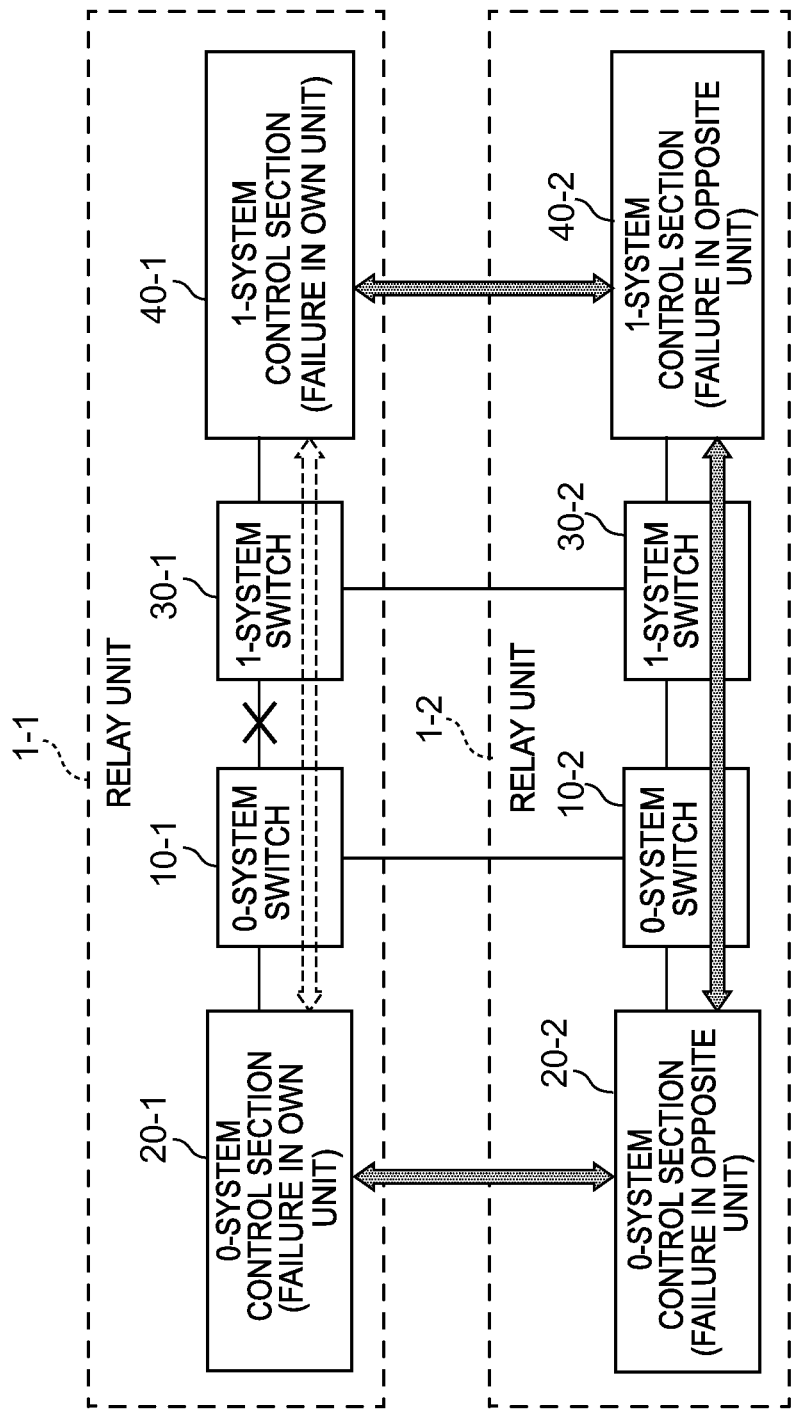
FIG. 10 is a diagram illustrating, with arrows, a communication state when the connection state in FIG. 7 is "failure in the own unit" and "failure in the opposite unit"

A "failure in the opposite unit" is a state in which communication is established between the own control section and the other system-control section in the own unit, between the own control section and the opposite control section thereof, and between the other system-control section in the own unit and the opposite control section thereof, but communication can not be established between both control sections in the opposite unit. In FIG. 10, in the case of the "failure in the opposite unit", the connection state is indicated by arrows.

A "failure in the own unit" is a state in which communication can not be established between the own control section and the other system-control section in the own unit, but communication is established between both control sections in the own unit and both control sections in the opposite unit. In FIG. 10, in the case of the "failure in the own unit", the connection state is indicated by arrows.

Figure 11:
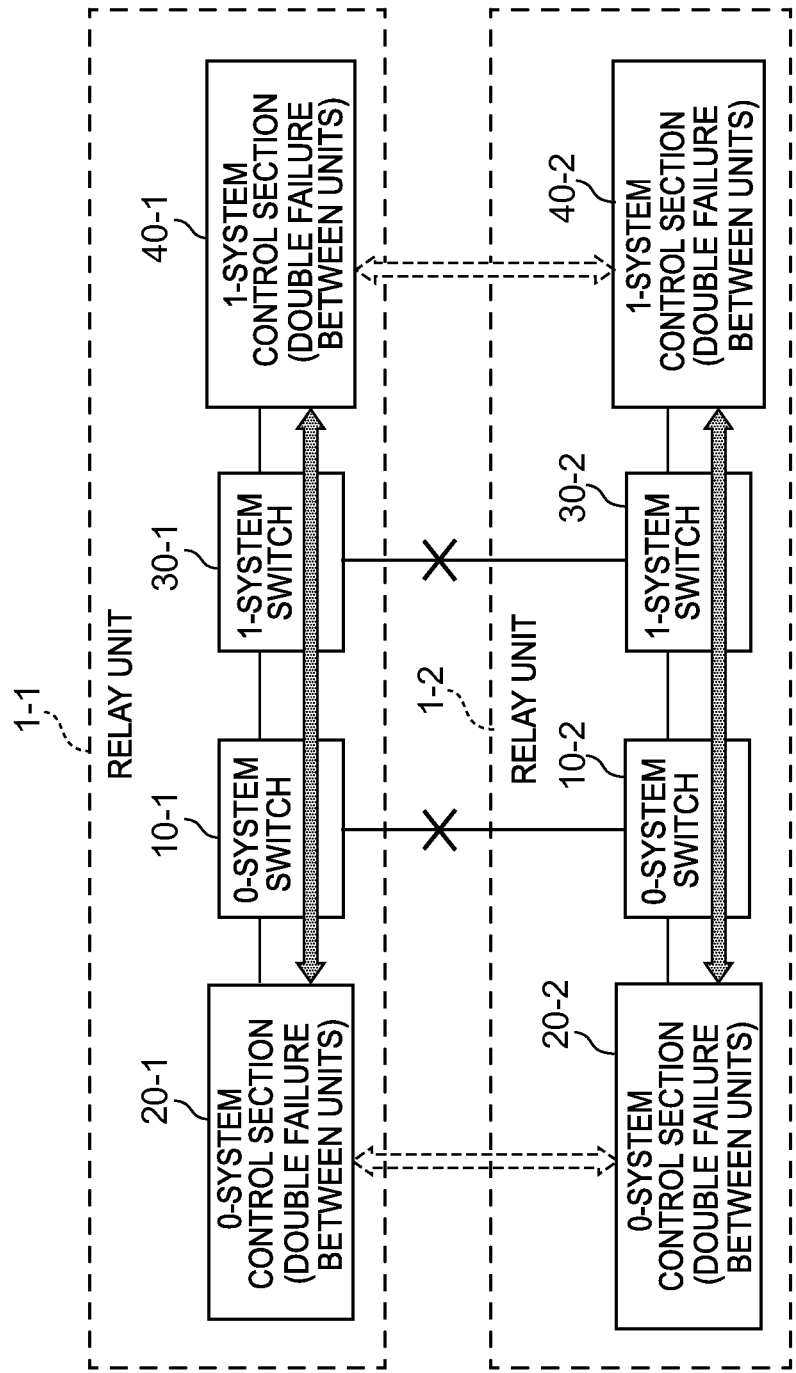
FIG. 11 is a diagram illustrating, with arrows, a connection state when the connection state in FIG. 7 is "double failure between units"

A "double failure between the units" is a state in which communication is established between the own control section and the other system-control section in the own unit, but a failure is taking place between the control target switch and the opposite switch thereof and between the other system-switch in the own unit and the opposite switch thereof. In FIG. 11, in the case of the "double failure between the units", the connection state is indicated by arrows.

Figure 12:
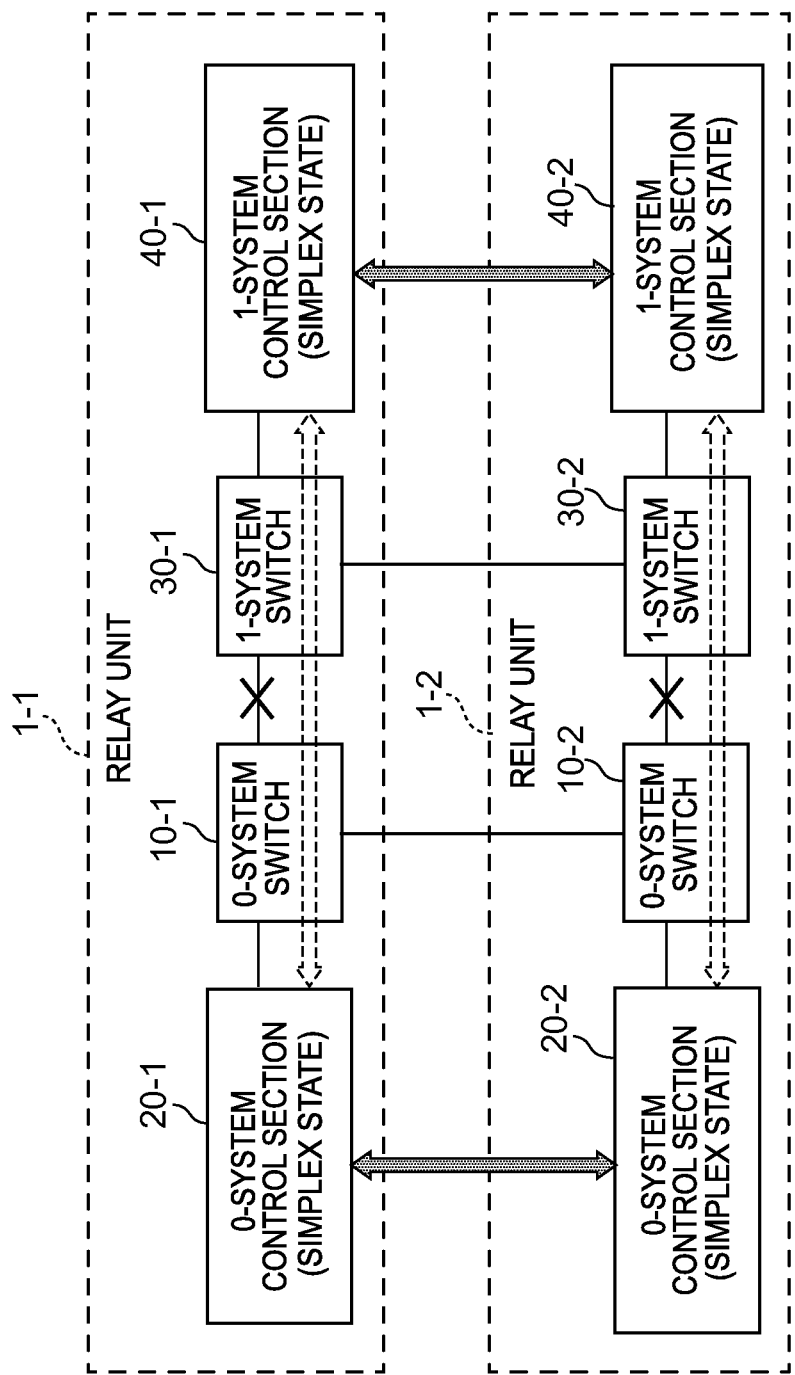
FIG. 12 is a diagram illustrating, with arrows, a communication state when the connection state in FIG. 7 is "simplex state"

A "simplex state" is a state in which communication is established between the own control section and the opposite control section thereof, but communication can not be established between the own control section and the other system-control section in the own unit and between both control sections in the opposite unit. In FIG. 12, in the case of the "simplex state", the connection state is indicated by arrows.

Figure 13:
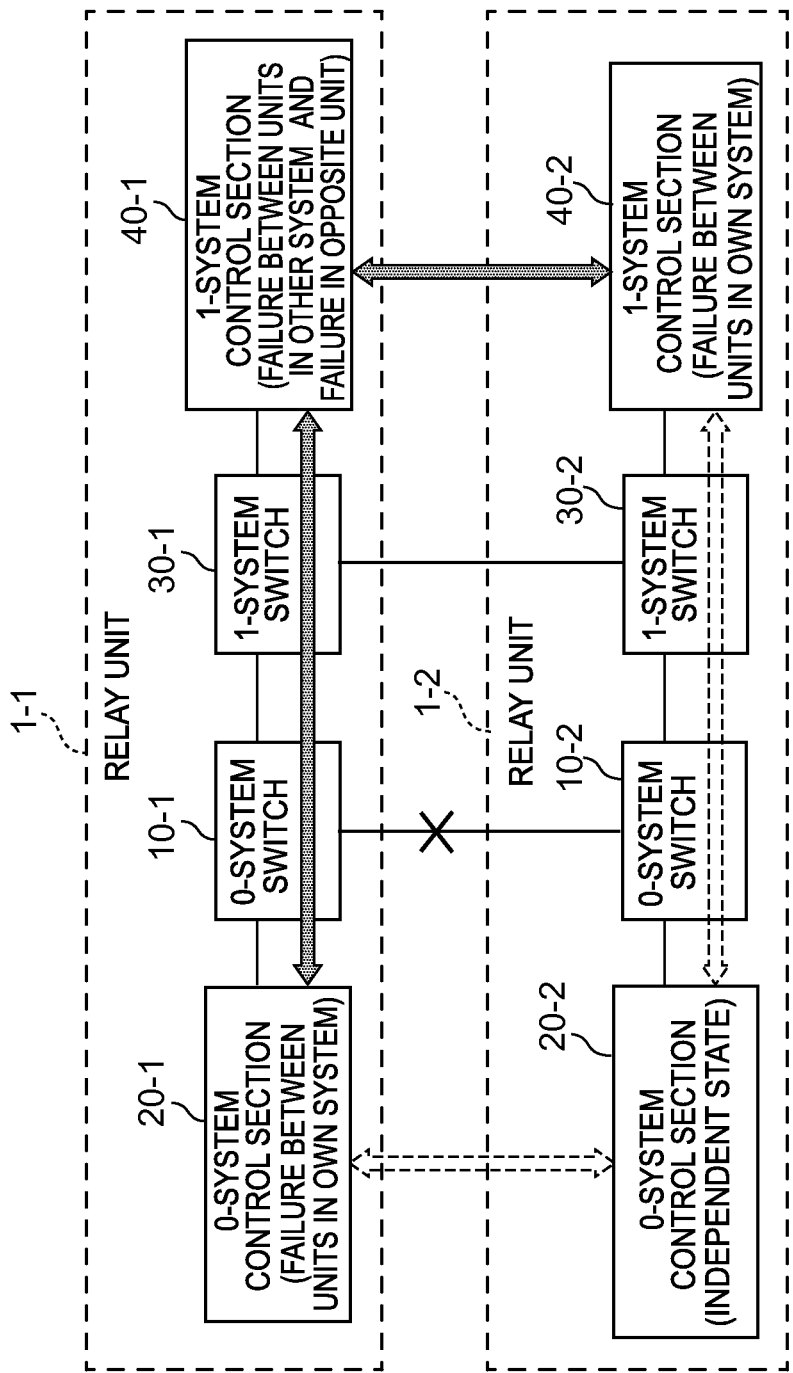
FIG. 13 is a diagram illustrating, with arrows, a communication state when the connection state in FIG. 7 includes a state of "failure between units in the other system and failure in the opposite unit"

A "failure between the units in the other system and failure in the opposite unit" is a state in which communication is established between the own control section and the other system-control section in the own unit and between the own control section and the opposite control section thereof, but communication is not established between both control sections in the opposite unit and between the other system-control section and the opposite control section thereof. In FIG. 13, in the case of the "failure between the units in the other system and failure in the opposite unit", the connection state is indicated by arrows.

FIG. 14 illustrates a list of information items notified between the control sections. These information items are notified by the connection state notifying sections 24 and 44.

A "connection state" is data stored in the connection state storage sections 21 and 41 and the content thereof is one of the states illustrated in FIG. 13. The connection state is notified to the 1-system control section 40-1, which is the other system-control section, in the relay unit 1-1, which is the own unit, and/or the 0-system control section 20-2, which is the opposite control section.

The "occurrence of a failure between the units" is a notification for the detection, by the control target switch, of a communication failure with the opposite switch or of a communication failure with the opposite control section. The notification is transmitted to the other system-control section in the own unit.

The "establishment of communication between the units" is a notification for the establishment of communication with the opposite control section. The notification is transmitted to the other system-control section in the own unit.

The "occurrence of a failure in the unit" is a notification for the detection, by the control target switch, of a communication failure with the other system-switch or of a communication failure with the other system-control section in the own unit. The notification is transmitted to the opposite control section.

The "establishment of communication in the unit" is a notification for the establishment of communication with the other system-control section in the own unit. The notification is transmitted to the opposite control section.

FIG. 15 illustrates a list of commands transmitted from each control section to the control target switch. The commands are issued from the command sections 25 and 45.

"Command 1" is a command to permit the relay of a user traffic to the other system-switch (command to permit a relay to the other system-switch).

"Command 2" is a command to permit the relay of a user traffic to the opposite switch (command to permit a relay to the opposite switch).

"Command 3" is a command which is notified after communication with the other system-control section is disconnected and which is also a command to prohibit the relay of user traffic to the other system-switch (command to prohibit a relay to the other system-switch).

"Command 4" is a command which is notified after communication with the opposite control section is disconnected and which is also a command to prohibit the relay of user traffic to the opposite switch (command to prohibit a relay to the opposite switch).

"Command 5" is a command to suppress a processing for relaying a user traffic, received from the other system-switch, to the opposite switch (relay suppression validation command).

"Command 6" is a command to release the suppression of a processing for relaying a user traffic, received from the other system-switch, to the opposite switch (relay suppression invalidation command).

"Command 7" is a command to delete the MAC address, whose transmission path is set to the opposite switch, from the path control table (command to delete a path to the opposite switch).

"Command 8" is a command to delete the MAC address, whose transmission path is set to the other system-switch, from the path control table (command to delete a path to the other system-switch).

Figure 16:
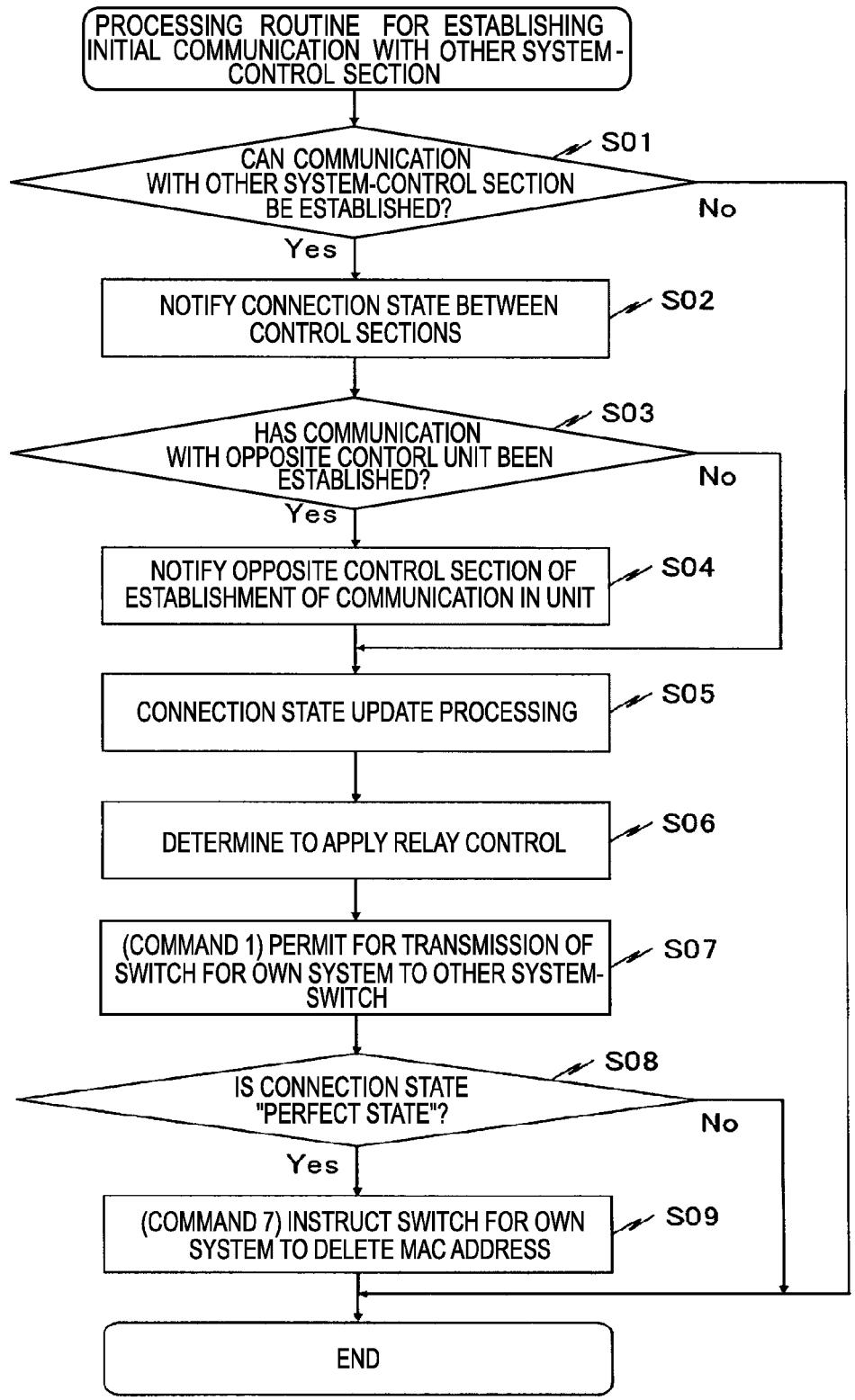
FIG. 16 is a flowchart illustrating the processing routine for establishing initial communication with the other system-control section.

Next, an operation when the 0-system control section 20-1, which is the own control section, establishes initial communication with the 1-system control section 40-1, which is the other system-control section, will be described with reference to FIGS. 16 and 17. The 0-system control section 20-1 continuously performs the flow until initial communication with the 1-system control section 40-1 is established. The description will be made assuming that each of the connection state storage section 21 of the 0-system control section 20-1 and the connection state storage section 41 of the 1-system control section 40-1 stores the "independent state" as an initial connection state. Each operation will be described using the 0-system control section 20-1 as an operation subject.

First, the communication establishment section 26 attempts to establish communication with the communication establishment section 46 of the 1-system control section 40-1 (Steps S01 and S101). If the establishment of communication is failed, the flow ends.

If communication is established, the connection state notifying section 24 notifies the 1-system control section 40-1 of the connection state. The connection state notifying section 44 of the 1-system control section 40-1 notifies the 0-system control section 20-1 of the connection state (Steps S02 and S102). In this case, the connection state, which the units notify each other, is an "independent state".

Then, if it is determined that communication with the 0-system control section 20-2, which is the opposite control section, has been established (Step S03), the connection state notifying section 24 transmits a notification of establishment of communication in the unit, to the 0-system control section 20-2 (Step S04). At the present time, the connection state is the "independent state", and communication with the 0-system control section 20-2 has not been established. Therefore, the connection state notifying section 24 proceeds to Step S05 without transmitting the notification of establishment of communication in the unit.

Then, the state update section 23 updates the connection state of the connection state storage section 21 on the basis of the connection state stored in the connection state storage section 21 and the connection state notified from the 1-system control section 40-1 (Step S05).

FIG. 18 illustrates a transition table of connection state when a processing for establishing of initial communication with the other system-control section is performed. A "own control section connection state" indicates the current connection state of the own control section (in this embodiment, the 0-system control section 20-1). The "connection state of the other system-control section" indicates a connection state notified from the other system-control section (in this embodiment, the 1-system control section 40-1). The connection states determined by the both two states are illustrated in a matrix in the transition table.

The state update section 23 updates the connection state of the connection state storage section 21 according to the transition table. Specifically, at the present time, since the current connection state of the own control section is the "independent state" and the connection state notified from the other control section is also the "independent state", the state update section 23 updates the connection state of the connection state storage section 21 to the "double failure between the units".

Then, the command section 25 performs a relay control application determining processing (Step S06). Next, the operation of the relay control application determining processing will be described with reference to FIG. 19. The command section 25 determines whether or not the connection state of the connection state storage section 21 is the "perfect state" (Step S11). Since the current connection state is the "double failure between the units", the command section 25 ends the determining processing without issuing the relay suppression command (Step S12).

Then, the command section 25 transmits command 1 to permit a relay to the 1-system switch 30-1, which is the other system-switch, to the 0-system switch 10-1, which is the control target switch (Steps S07 and S104). The 0-system switch 10-1 can relay the frames of user traffic received thereafter to the 1-system switch 30-1 in response to command 1.

Then, the command section 25 determines whether or not the connection state of the connection state storage section 21 is the "perfect state" (Step S08). Since the current connection state is the "double failure between the units", the command section 25 ends the determining processing without issuing command 7 to delete the MAC address (Step S09).

If the connection state is the "perfect state", the command section 25 issues command 7 to the 0-system switch 10-1. In this case, the path information update section 13 of the 0-system switch 10-1 deletes the MAC address, whose transmission path is set to the opposite switch, from the path control table in response to command 7. Then, the 0-system switch 10-1 does not relay the frame received from the 1-system switch 30-1, which is the other system-switch, to the 0-system switch 10-2, which is the opposite switch. The relay section 11 adds the MAC address of the frame received thereafter as an "address" to the path control table 12, thereby setting a new frame relay destination.

Figure 20:
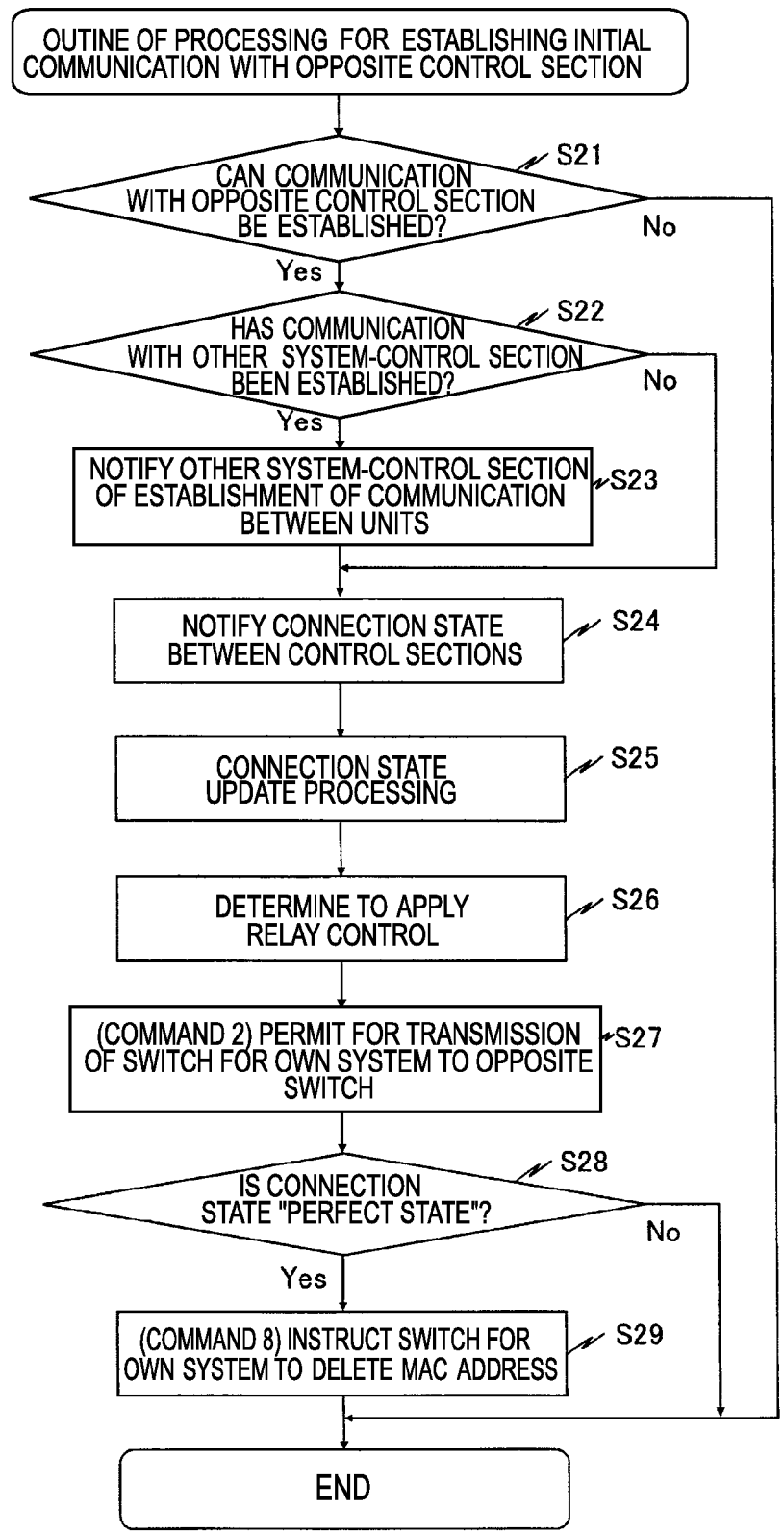
FIG. 20 is a flowchart illustrating the processing routine for establishing initial communication with the opposing control section.
Figure 21:
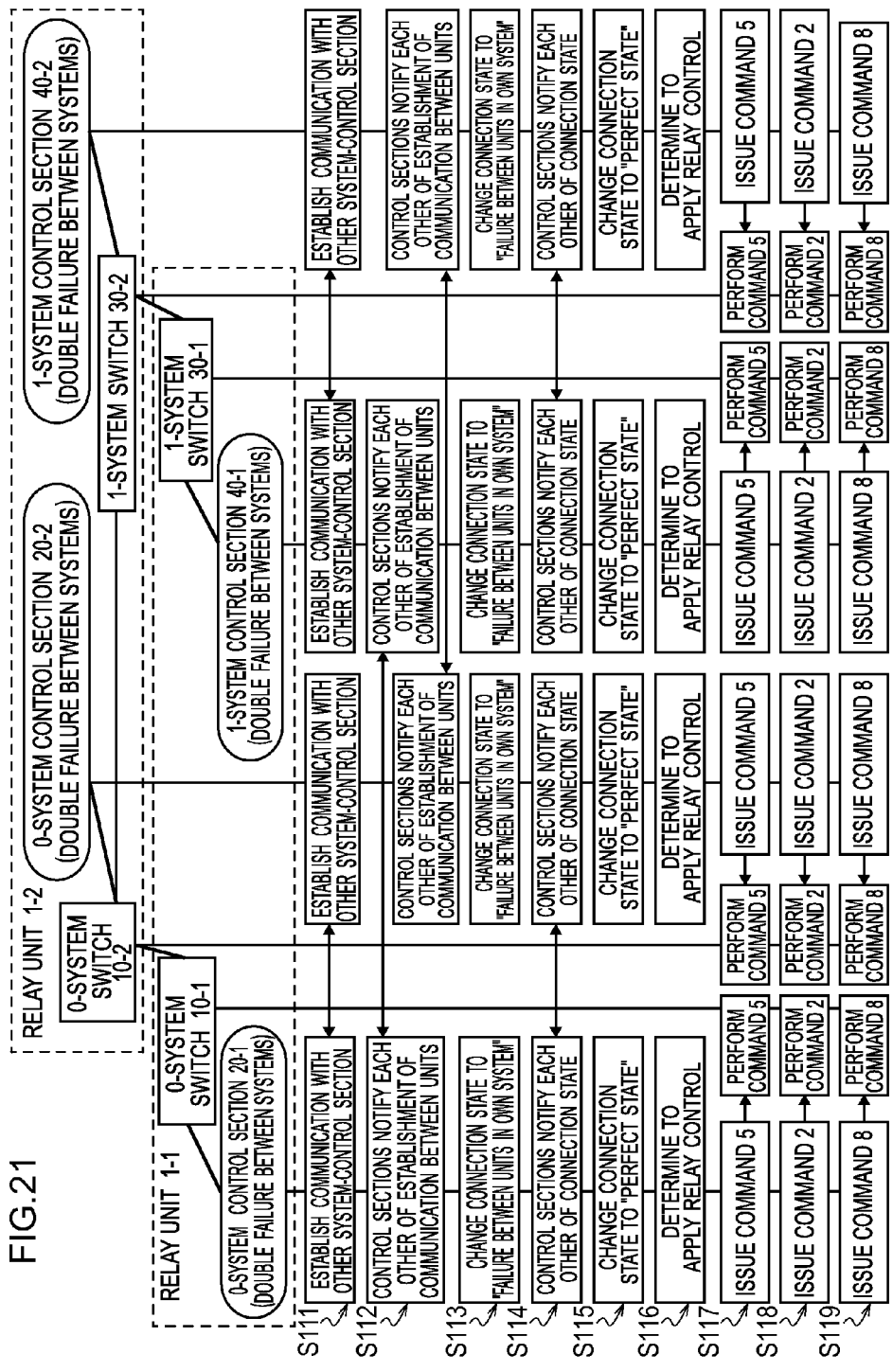
FIG. 21 is a sequence diagram illustrating the operations of the switches and the control sections in two systems at the time of the processing for establishing initial communication with the opposing control section.

Next, an operation when the 0-system control section 20-1, which is the own control section, establishes the initial communication with the 0-system control section 20-2, which is the opposite control section, will be described with reference to FIGS. 20 and 21. The 0-system control section 20-1 continuously performs the flow until the initial communication with the 0-system control section 20-2 is established. The description will be made assuming that each of the connection state storage section 21 of the 0-system control section 20-1 and the connection state storage section 21 of the 0-system control section 20-2 stores the "double failure between the units" as the connection state. Each operation will be described using the 0-system control section 20-1 as an operation subject.

First, the communication establishment section 26 attempts to establish communication with the communication establishment section 26 of the 0-system control section 20-2 (Steps S21 and S111). If the establishment of communication is failed, the flow ends. If communication is established, the processing proceeds to Step S22.

The connection state notifying section 24 determines whether or not communication with the 1-system control section 40-1, which is the other system-control section, has been established (Step S22). In the current stage, since communication is established between the 0-system control section 20-1 and the 1-system control section 40-1, the connection state notifying section 24 transmits an inter-unit communication establishment notification (a notification indicating that communication between the units has been established) to the 1-system control section 40-1 (Steps S23 and S112).

The connection state notifying section 44 of the 1-system control section 40-1 also transmits the inter-unit communication establishment notification to the 0-system control section 20-1 (Step S112). The notification receiving section 22 receives the inter-unit communication establishment notification from the 1-system control section 40-1 (Step S112).

Next, the operation of the 0-system control section 20-1 as an operation subject if the inter-unit communication establishment notification is received will be described with reference to FIG. 22. The 0-system control section 20-1 performs a routine when receiving the inter-unit communication establishment notification from the 1-system control section 40-1, which is the other system-control section.

FIG. 23 illustrates a transition table of connection state when the inter-unit communication establishment notification is received. A "connection state before the notification is received" is a connection state before the inter-unit communication establishment notification is received. The current connection state of the 0-system control section 20-1 is the "double failure between the units". A "connection state after the notification is received" is a connection state after the inter-unit communication establishment notification is received, that is, a connection state after update.

First, the state update section 23 updates the connection state stored in the connection state storage section 21 according to the transition table illustrated in FIG. 23 (Step S31). Since the connection state of the connection state storage section 21 is the "double failure between the units", the state update section 23 updates the connection state to a "failure between the units in the own system" (Step S31).

Figure 19:
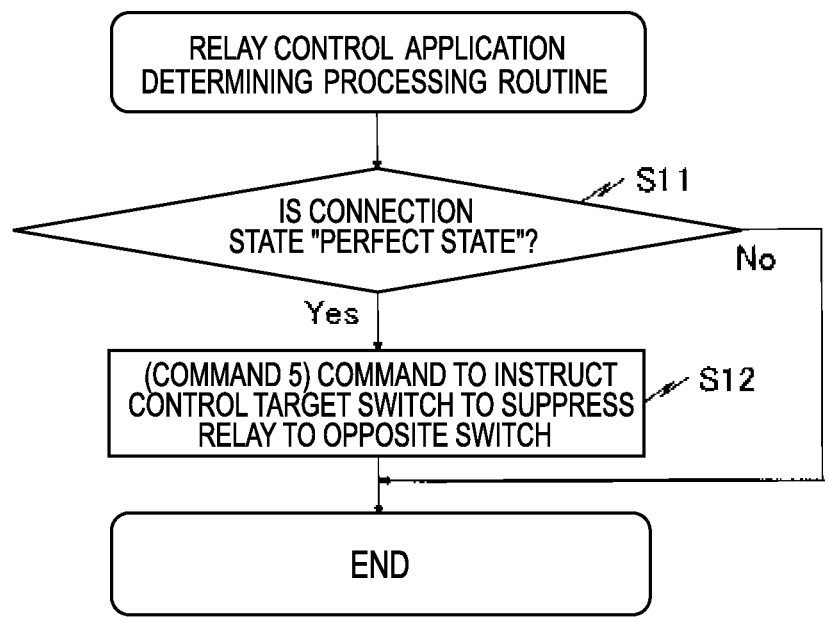
FIG. 19 is a flowchart illustrating a relay control application determining processing routine.

Then, the command section 25 performs the relay control application determining processing illustrated in FIG. 19 (Step S32). The command section 25 determines whether or not the connection state of the connection state storage section 21 is the "perfect state" (Step S11). Since the current connection state is the "failure between the units in the own system", the command section 25 ends the determining processing without issuing the relay suppression command (Step S12).

Then, the connection state notifying section 24 notifies the 0-system control section 20-2 of the connection state (Steps S24 and S114). The connection state notifying section 24 of the 0-system control section 20-2 also notifies the 0-system control section 20-1 of the connection state (Step S114). At that time, a connection state in which a notification is transmitted between the units is the "failure between the units in the own system".

Then, the state update section 23 updates the connection state of the connection state storage section 21 on the basis of the connection state stored in the connection state storage section 21 and the connection state notified by the 0-system control section 20-2 (Step S25).

FIG. 24 illustrates a transition table of connection state when a processing for establishing of initial communication with the opposite control section is performed. The state update section 23 updates the connection state of the connection state storage section 21 according to the transition table. Specifically, since the current connection state of the own control section is the "failure between the units in the own system" and the connection state notified by the other control section is also the "failure between the units in the own system", the state update section 23 updates the connection state of the connection state storage section 21 to the "perfect state" (Step S115).

Then, the command section 25 performs the relay control application determining processing (processing for determining a relay control application) illustrated in FIG. 19 (Steps S26 and S116). The command section 25 determines whether or not the connection state of the connection state storage section 21 is the "perfect state" (Step S11). Since the current connection state is the "perfect state", the command section 25 issues, to the 0-system switch 10-1 which is the control target switch, relay suppression validation command 5 to suppress a relay of a specific frame received from the 1-system switch 30-1, which is the other system-switch, to the 0-system switch 10-2, which is the opposite switch (Steps S12 and S117). The specific frame is, for example, a frame of user traffic. In response to command 5, the 0-system switch 10-1 does not relay the specific frame received from the 1-system switch 30-1 to the 0-system switch 10-2 thereafter. For example, a port number where the specific frame is received can be used to determine whether or not the specific frame is received from the 0-system switch 10-2.

The command section 25 issues, to the 0-system switch 10-1 which is the control target switch, command 2 to permit the relay of a general frame to the 0-system switch 10-2 which is the opposite switch (Steps S27 and S118). The general frame is, for example, a unit control frame. The 0-system switch 10-1 can relay the general frame received thereafter to the 0-system switch 10-2 in response to command 2.

Then, the command section 25 determines whether or not the connection state of the connection state storage section 21 is the "perfect state" (Step S28). Since the current connection state is the "perfect state", the command section 25 issues, to the 0-system switch 10-1 which is the control target switch, command 8 to delete a path to the other system-switch to delete the MAC address, whose transmission path is set to the other system-switch, from the path control table 12 (Step S29, S119).

When the connection state is the "perfect state", the above-mentioned operation prevents the 0-system switch 10-1 from relaying a specific frame to the 0-system switch 10-2, which is the opposite switch. The above-mentioned operation prevents frames from being looped via a ring-shaped relay path formed by the relay paths 61-1, 61-2, 62, and 63.

Figure 22:
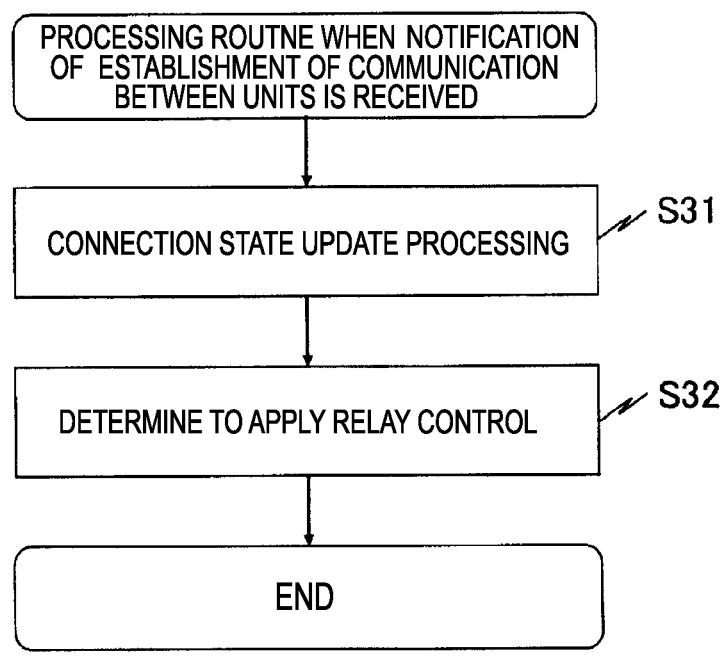
FIG. 22 is a flowchart illustrating a processing routine when an inter-unit communication establishment notification is received.

The above description has been made focusing on the 0-system control section 20-1 with reference to FIGS. 16 to 24. However, as illustrated in FIGS. 17 and 22, the 0-system control section 20-2 and the 1-system control sections 40-1 and 40-2 independently perform the same operation as the 0-system control section 20-1.

Figure 25:
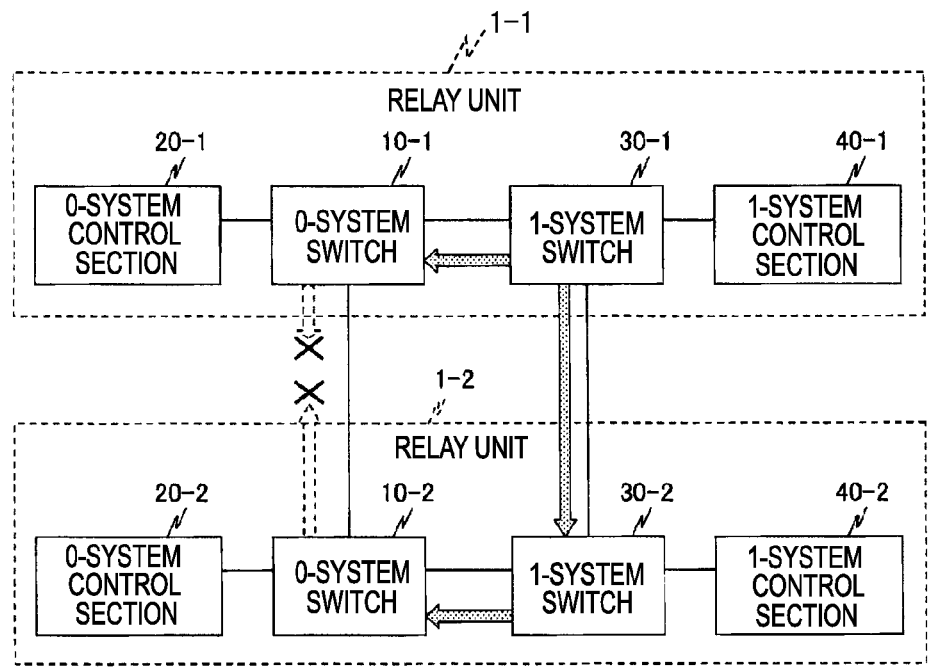
FIG. 25 is a diagram illustrating a frame relay flow from the 1-system switch when the relay of a specific frame is suppressed.

In FIG. 25, the relay flow of frames from the 1-system switch 30-1 when the relay of the specific frame to each switch is suppressed by the above-mentioned processing is indicated by arrows. The 1-system switch 30-1 relays, for example, the frame received from the host terminal 51-1 illustrated in FIG. 1 to the 0-system switch 10-1 and/or the 1-system switch 30-2. In some cases, the 1-system switch 30-2 relays the frame to the 0-system switch 10-2.

In response to the relay suppression validation command 5 from the 0-system control section 20-1, the 0-system switch 10-1 does not relay the specific frame received from the 1-system switch 30-1, which is the other system-switch, to the 0-system switch 10-2, which is the opposite switch. Similarly, in response to the relay suppression validation command 5 from the 0-system control section 20-2, the 0-system switch 10-2 does not relay the specific frame received from the 1-system switch 30-2, which is the other system-switch, to the 0-system switch 10-1, which is the opposite switch. When the connection state is the "perfect state", the above-mentioned operation can prevent the frame transmitted from the 1-system switch 30-1 from being looped via the relay paths 61-1, 61-2, 62, and 63. Similarly, the frame transmitted from the 1-system switch 30-2 can be prevented from being looped.

Figure 26:
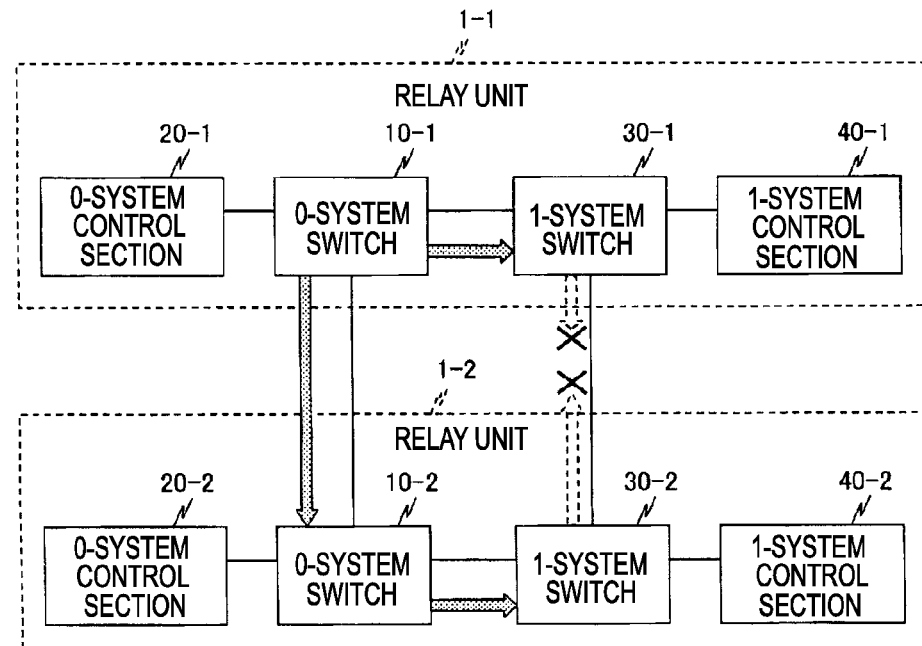
FIG. 26 is a diagram illustrating a frame relay flow from the 0-system switch when the relay of a specific frame is suppressed.

In FIG. 26, the relay flow of the frame from the 0-system switch 10-1 when the relay of the specific frame to each switch is suppressed by the above-mentioned processing is indicated by arrows. The 0-system switch 10-1 relays, for example, the frame received from the host terminal 51-1 illustrated in FIG. 1 to the 1-system switch 30-1 and/or the 0-system switch 10-2. In some cases, the 0-system switch 10-2 relays the frame to the 1-system switch 30-2.

The 1-system switch 30-1 does not relay the specific frame received from the 0-system switch 10-1, which is the other system-switch, to the 1-system switch 30-2, which is the opposite switch, in response to the relay suppression validation command 5 from the 1-system control section 40-1. Similarly, the 1-system switch 30-2 does not relay the specific frame received from the 1-system switch 30-2, which is the other system-switch, to the 1-system switch 30-1, which is the opposite switch, in response to the relay suppression validation command 5 from the 1-system control section 40-2. If the connection state is the "perfect state", the above-mentioned operation can prevent the frame transmitted from the 0-system switch 10-1 from being looped via the relay paths 61-1, 61-2, 62, and 63. Similarly, the frame transmitted from the 0-system switch 10-2 can be prevented from being looped.

As such, the relay system 100 according to this embodiment is provided with the control sections 20-1, 20-2, 40-1, and 40-2 that control the switches 10-1, 10-2, 30-1, and 30-2, respectively. These control sections notify each other of the connection states that each stores, and update their own connection states according to a predetermined transition table on the basis of the connection state that each stores and the connection states notified from the other system-control section or the opposite control sections. If the connection state is the "perfect state", that is, a state in which no failure has occurred in any of the relay paths and frames can be looped, the control target switch is prevented from relaying a specific frame to the opposite switch. This operation can prevent a frame from being looped via the relay path while retaining the redundancy of a frame relay path.

In the above-mentioned example, the processing for establishing initial communication with the other system-control section and the processing for establishing initial communication with the opposite control section are performed. However, the relay units 1-1 and 1-2 may perform the following processing.

Figure 27:
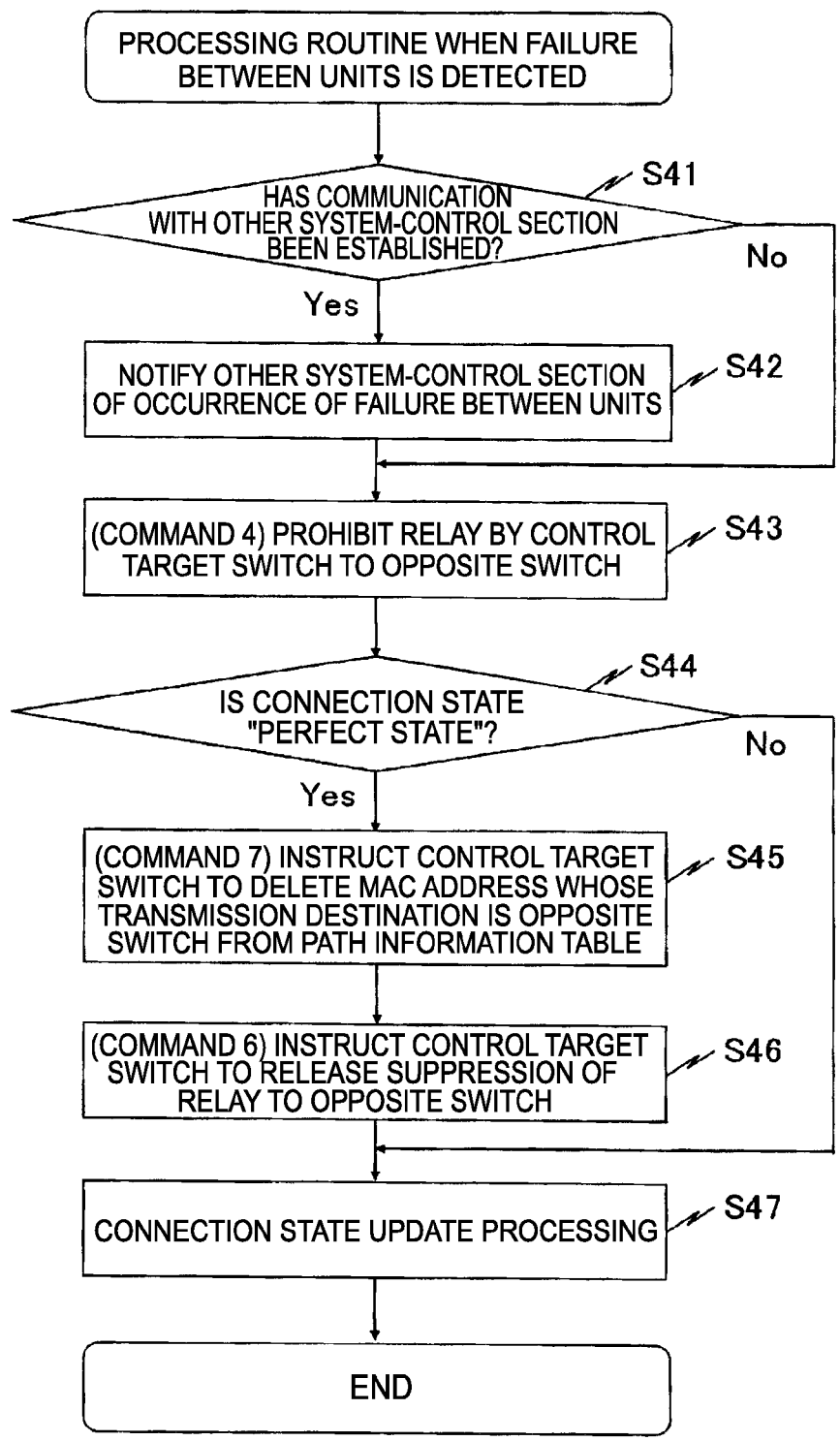
FIG. 27 is a flowchart illustrating a processing routine when failure between units is detected.

Next, the operation of the 0-system control section 20-1 as an operation subject when an inter-unit failure is detected will be described with reference to FIG. 27. The 0-system control section 20-1 performs the routine when an inter-unit failure detection notification has been received from the failure detecting section 14 of the 0-system switch 10-1, which is the control target switch. The inter-unit failure detection notification is transmitted when the failure detecting section 14 has detected the occurrence of a failure in the relay path 62.

First, the connection state notifying section 24 determines whether or not communication with the 1-system control section 40-1, which is the other system-control section, has been established (Step S41). If communication has not been established, the processing proceeds to Step S43. If communication has been established, the connection state notifying section 24 notifies the 1-system control section 40-1 of the occurrence of an inter-unit failure (Step S42).

Then, the command section 25 issues, to the 0-system switch 10-1 which is the control target switch, command 4 to prohibit the relay of a specific frame to the 0-system switch 10-2 which is the opposite switch (Step S43). In response to the command 4, the 0-system switch 10-1 does not relay a specific frame received thereafter to the 0-system switch 10-2.

Then, the command section 25 determines whether or not the connection state of the connection state storage section 21 is the "perfect state" (Step S44). If the current connection state is not the "perfect state", the command section 25 proceeds to Step S47 without issuing command 7 and command 6. If the current connection state is the "perfect state", the command section 25 issues, to the 0-system switch 10-1, command 7 to delete the MAC address, whose transmission destination is the opposite switch, from the path control table 12 (Step S45), and issues, to the 0-system switch 10-1, command 6 to release the suppression of the relay of a specific packet to the 0-system switch 10-2 (Step S46).

Then, the state update section 23 updates the connection state of the connection state storage section 21 on the basis of the connection state stored in the connection state storage section 21 (Step S47). FIG. 28 illustrates a transition table of connection state when the inter-unit failure is detected. A "connection state before communication is unavailable" is the current connection state. A "connection state after communication is unavailable" is a connection state after update. For example, if the current connection state is a "simplex state", the state update section 23 updates the connection state of the connection state storage section 21 to the "independent state".

Figure 29:
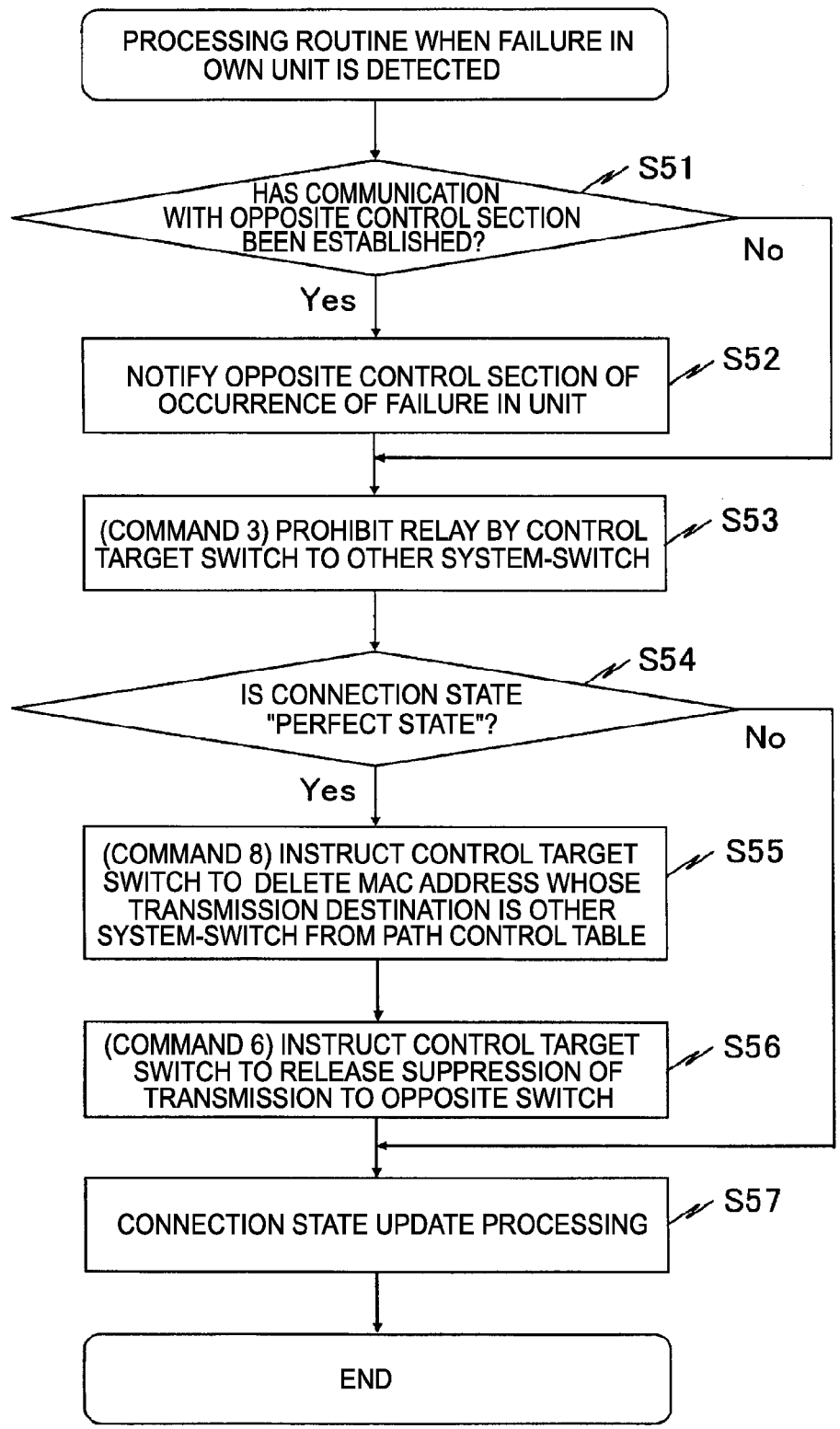
FIG. 29 is a flowchart illustrating a processing routine when failure in the own unit is detected.

Next, the operation of the 0-system control section 20-1 as an operation subject when a failure in the own unit is detected will be described with reference to FIG. 29. The 0-system control section 20-1 performs the routine when a notification of the detection of a failure in the own unit has been received from the failure detecting section 14 of the 0-system switch 10-1, which is the control target switch. The notification of the detection of a failure in a unit is transmitted when the failure detecting section 14 detects the occurrence of a failure in the relay path 61-1.

First, the connection state notifying section 24 determines whether or not communication with the 0-system control section 20-2, which is the opposite control section, has been established (Step S51). If communication has not been established, the processing proceeds to Step S53. If communication has been established, the connection state notifying section 24 notifies the 0-system control section 20-2 of the occurrence of a failure in the unit (Step S52).

Then, the command section 25 issues, to the 0-system switch 10-1 which is the control target switch, command 3 to prohibit the relay of a specific frame to the 1-system switch 30-1 which is the other system-switch (Step S53). In response to command 4, the 0-system switch 10-1 does not relay the specific frame received thereafter to the 1-system switch 30-1.

Then, the command section 25 determines whether or not the connection state of the connection state storage section 21 is the "perfect state" (Step S54). If the current connection state is not the "perfect state", the command section 25 proceeds to Step S57 without issuing command 8 or command 6. If the current connection state is the "perfect state", the command section 25 issues, to the 0-system switch 10-1, command 8 to delete the MAC address, whose transmission destination is the other system-switch, from the path control table 12 (Step S55) and issues, to the 0-system switch 10-1, command 6 to release the suppression of the relay of a specific packet to the 0-system switch 10-2 (Step S56).

Then, the state update section 23 updates the connection state of the connection state storage section 21 on the basis of the connection state stored in the connection state storage section 21 (Step S57). FIG. 30 illustrates a transition table of connection state when a failure in the unit is detected. A "connection state before communication is unavailable" is the current connection state. A "connection state after communication is unavailable" is a connection state after update. For example, if the current connection state is a "double failure between the units", the state update section 23 updates the connection state of the connection state storage section 21 to the "independent state".

Figure 31:
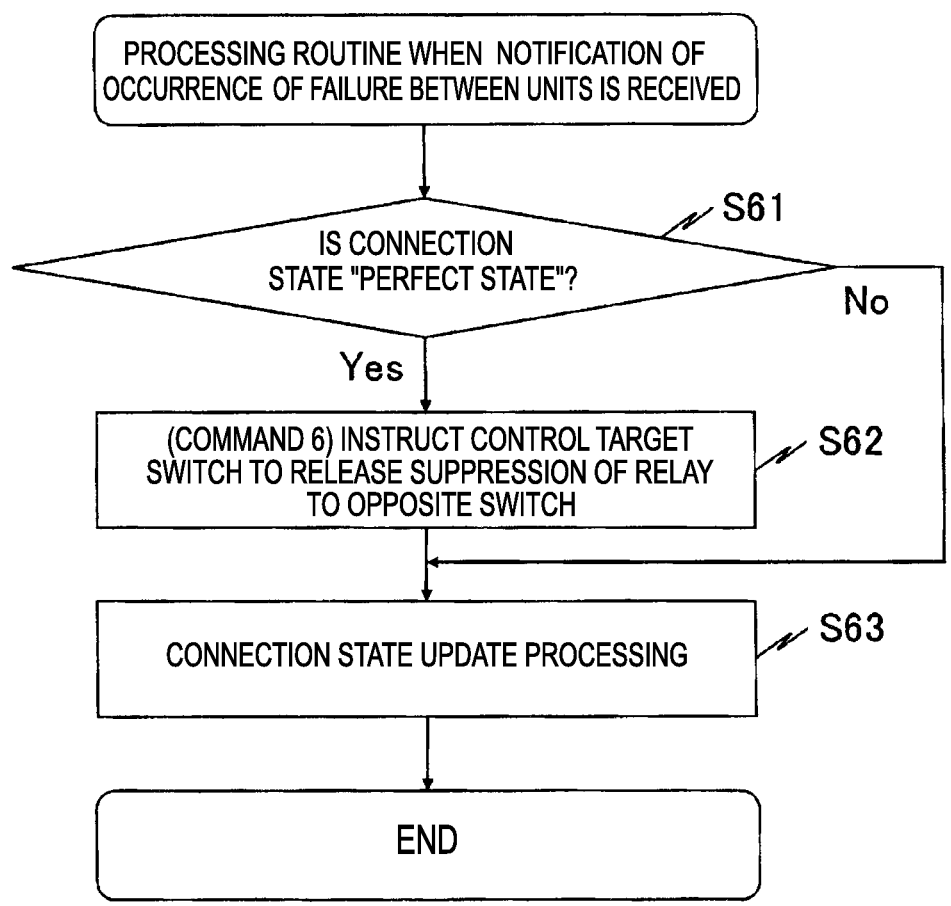
FIG. 31 is a flowchart illustrating a processing routine when an inter-unit failure occurrence notification is received.

Next, the operation of the 0-system control section 20-1 as an operation subject when a notification of the occurrence of an inter-unit failure is received will be described with reference to FIG. 31. The 0-system control section 20-1 performs the routine when an inter-unit failure detection notification from the 1-system control section 40-1, which is the other system-control section, has been received.

First, the command section 25 determines whether or not the connection state of the connection state storage section 21 is the "perfect state" (Step S61). If the current connection state is not the "perfect state", the command section 25 proceeds to Step S63 without issuing a relay suppression invalidation command 6. If the current connection state is the "perfect state", the command section 25 issues, to the 0-system switch 10-1 which is the control target switch, command 6 to invalidate the suppression of the relay of a specific frame to the 0-system switch 10-2, which is the opposite switch (Step S62).

Then, the state update section 23 updates the connection state of the connection state storage section 21 on the basis of the connection state stored in the connection state storage section 21 (Step S63). FIG. 32 illustrates a transition table of connection state when the notification of the occurrence of an inter-unit failure is received. A "connection state before the notification is received" is the current connection state. A "connection state after the notification is received" is a connection state after update. For example, if the current connection state is an "inter-unit failure in the own system", the state update section 23 updates the connection state of the connection state storage section 21 to the "double failure between the units".

Figure 33:
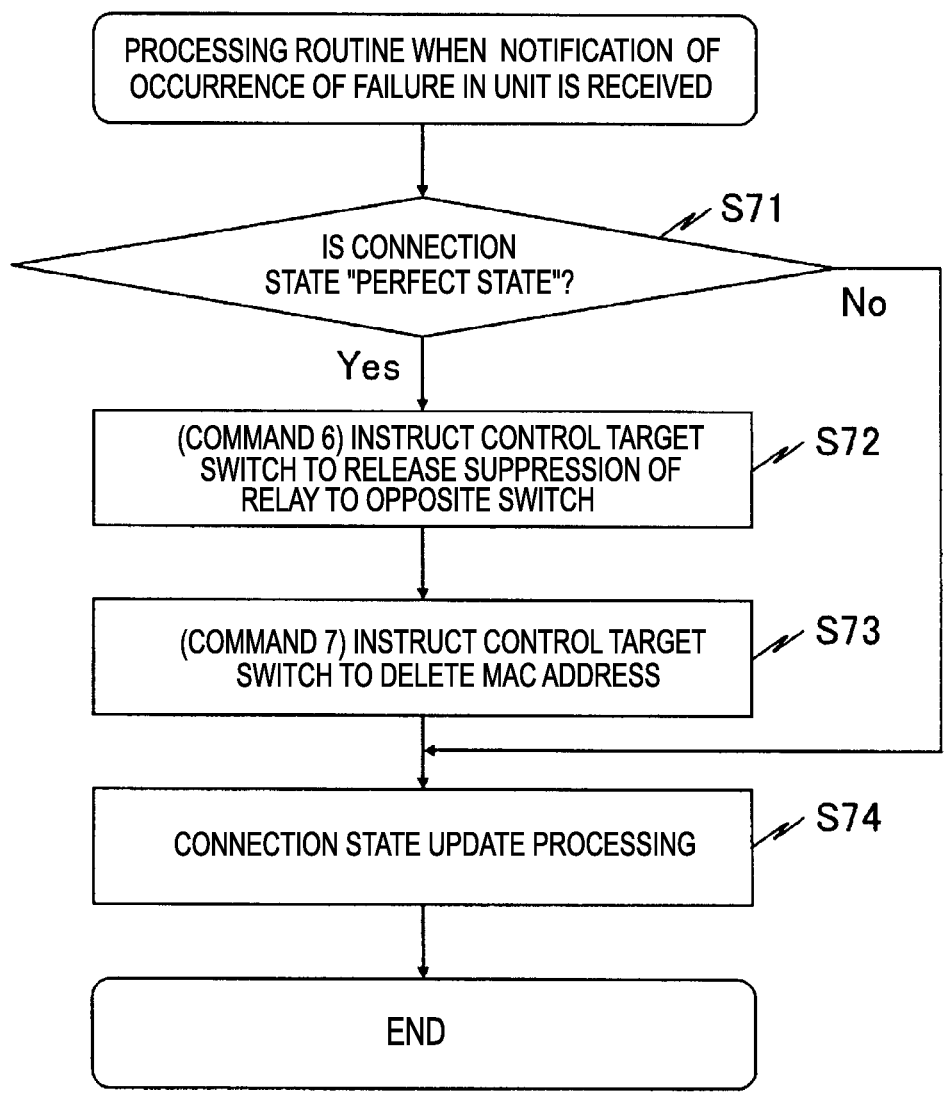
FIG. 33 is a flowchart illustrating a processing routine when notification of the occurrence of failure in a unit is received.

Next, the operation of the 0-system control section 20-1 as an operation subject when a notification of the occurrence of a failure in a unit is received will be described with reference to FIG. 33. The 0-system control section 20-1 performs the routine when a notification of the detection of a failure in a unit from the 0-system control section 20-2, which is the opposite control section, has been received.

First, the command section 25 determines whether or not the connection state of the connection state storage section 21 is the "perfect state" (Step S71). If the current connection state is not the "perfect state", the command section 25 proceeds to the Step S74 without issuing a relay suppression invalidation command 6. If the current connection state is the "perfect state", the command section 25 issues, to the 0-system switch 10-1 which is the control target switch, command 6 to invalidate the suppression of the relay of a specific frame to the 0-system switch 10-2 which is the opposite switch (Step S72).

Then, the command section 25 issues command 7 to the 0-system switch 10-1. In response to command 7, the path information update section 13 of the 0-system switch 10-1 deletes the MAC address whose transmission destination is the opposite switch with respect to the 0-system switch 10-2 which is the opposite switch, from the path control table 12. The relay section 11 can add the MAC address of the frame which is received thereafter as an "address" to the path control table 12, thereby setting a new frame relay destination.

Then, the state update section 23 updates the connection state of the connection state storage section 21 based on the connection state stored in the connection state storage section 21 (Step S74). FIG. 34 illustrates a transition table of connection state when a notification of the occurrence of a failure in a unit is received. A "connection state before the notification is received" is the current connection state. A "connection state after the notification is received" is a connection state after update. For example, if the current connection state is an "inter-unit failure in the own system", the state update section 23 updates the connection state of the connection state storage section 21 to the "simplex state".

Figure 35:
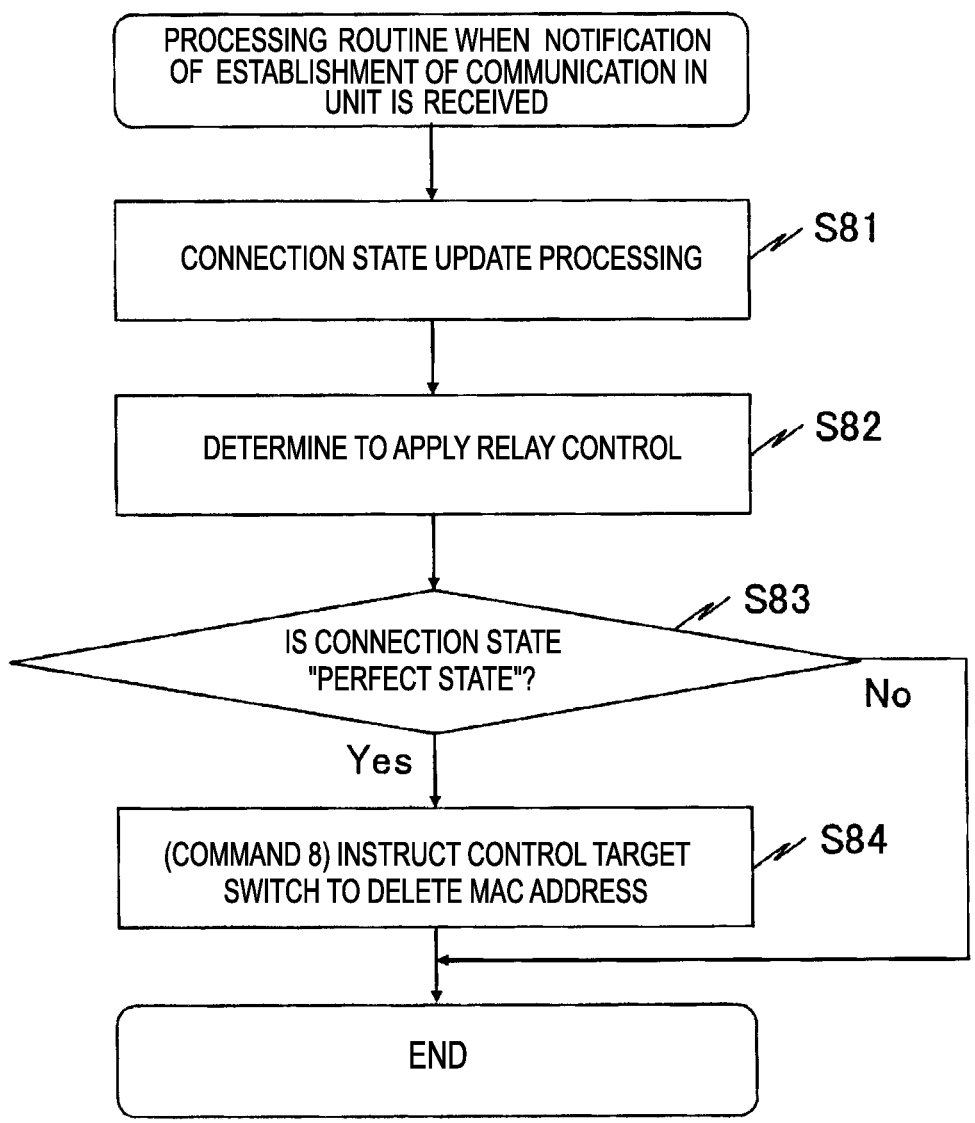
FIG. 35 is a flowchart illustrating a processing routine when notification of the establishment of communication in a unit is received.
Figure 37:
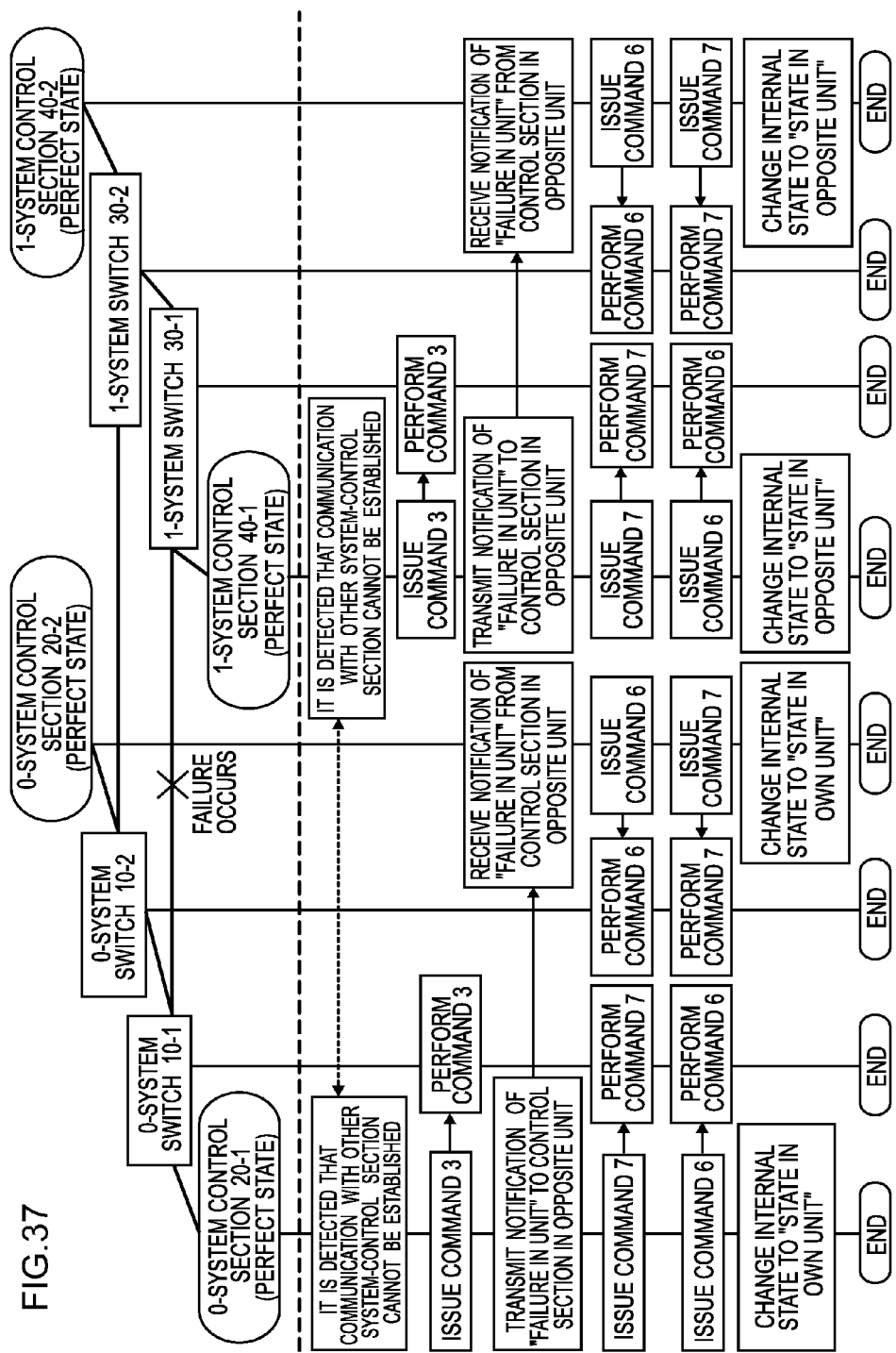
FIG. 37 is a diagram illustrating an operation flow when failure occurs in a unit in a state in which there is no failure.
Figure 38:
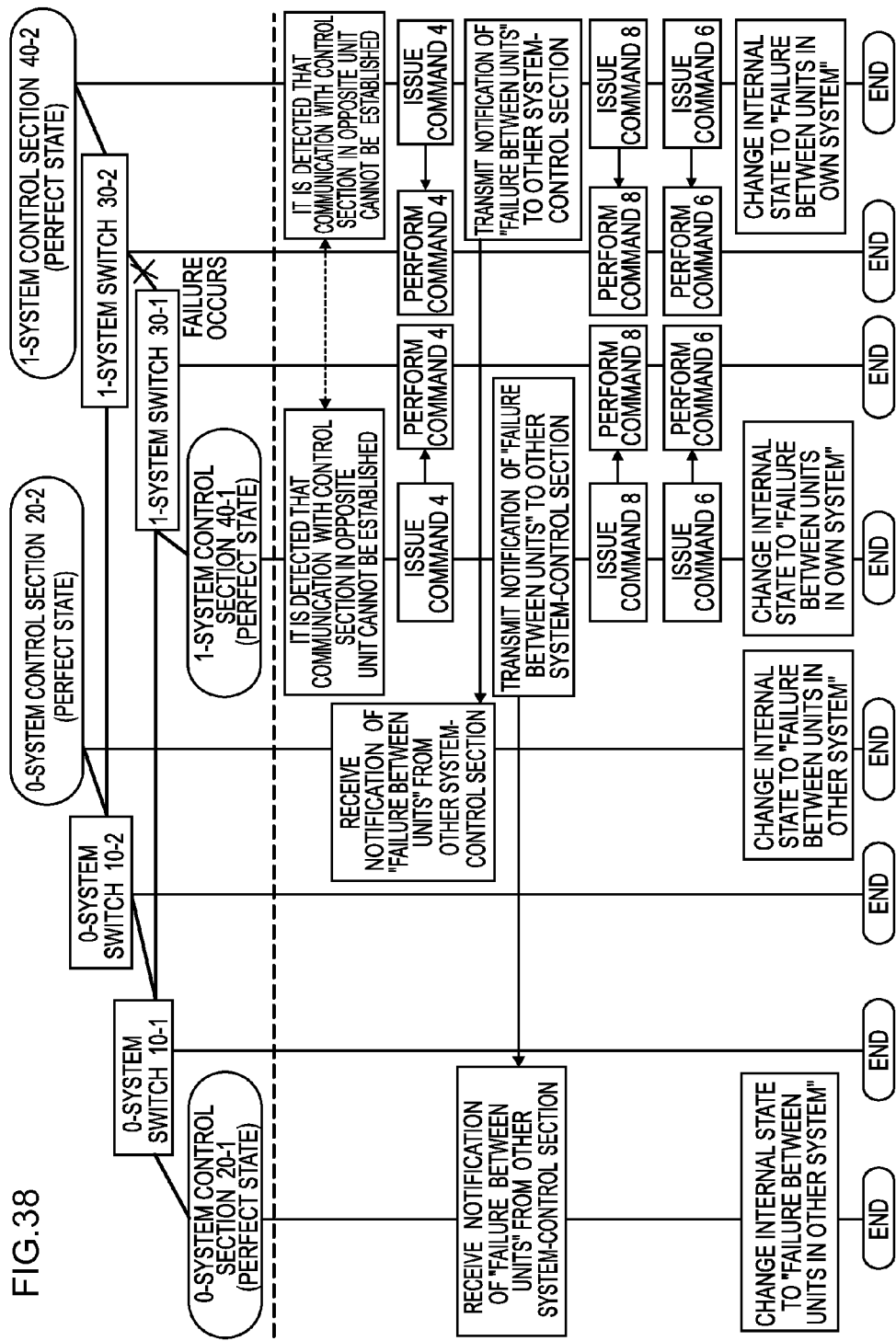
FIG. 38 is a diagram illustrating an operation flow when inter-unit failure occurs in a state in which there is no failure.
Figure 39:
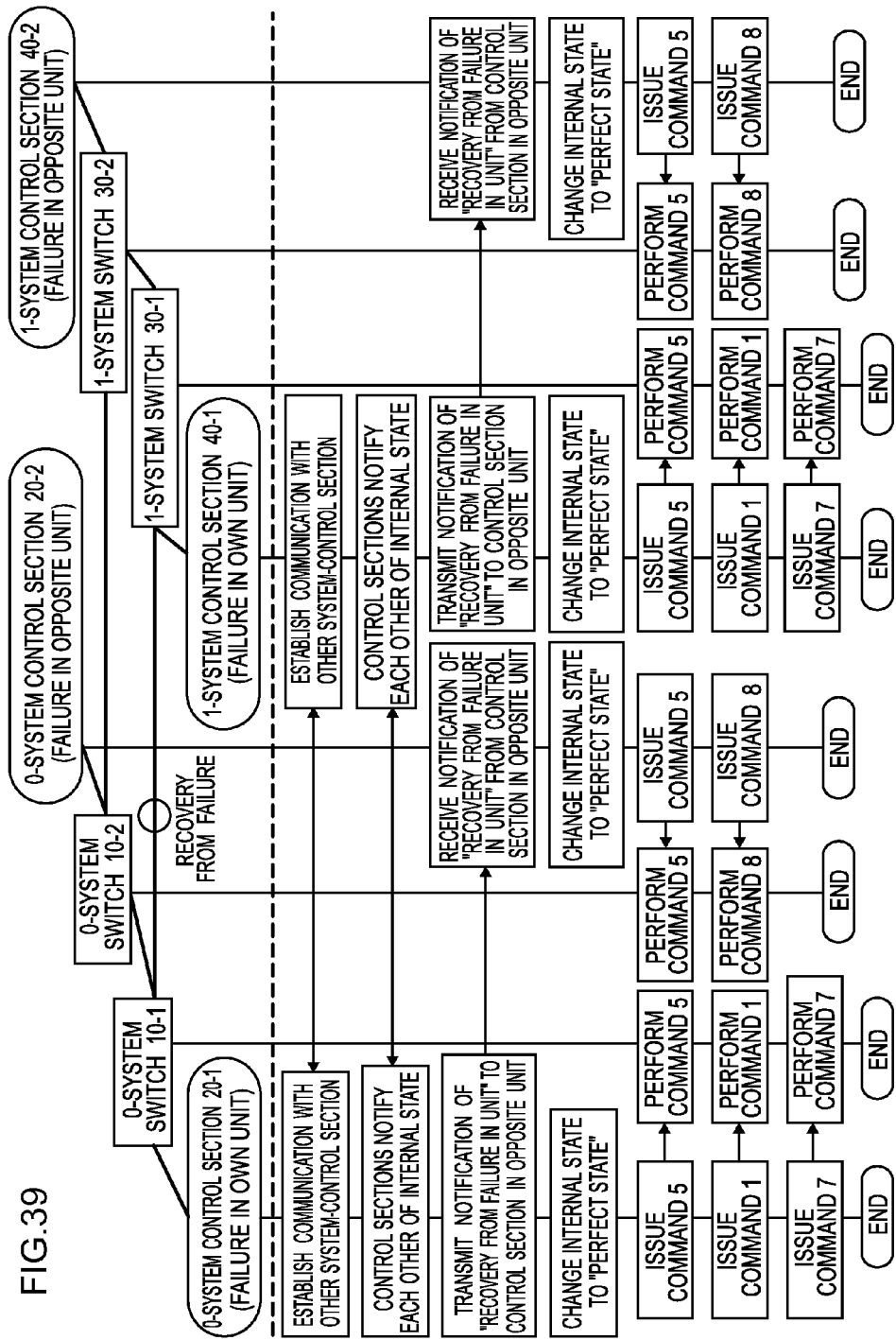
FIG. 39 is a diagram illustrating an operation flow when failure in a unit is remedied.
Figure 40:
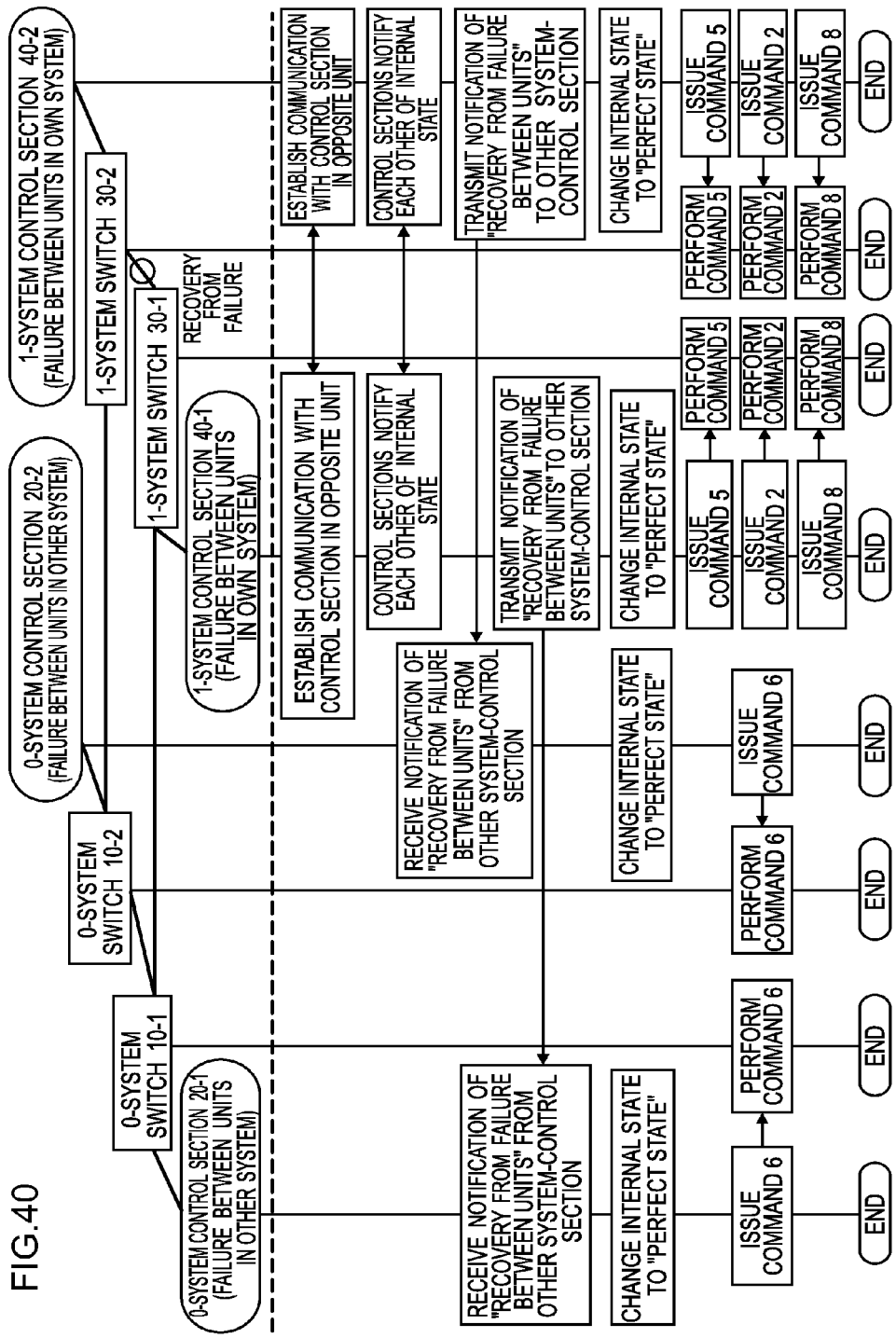
FIG. 40 is a diagram illustrating an operation flow when inter-unit failure is remedied.
Figure 41:
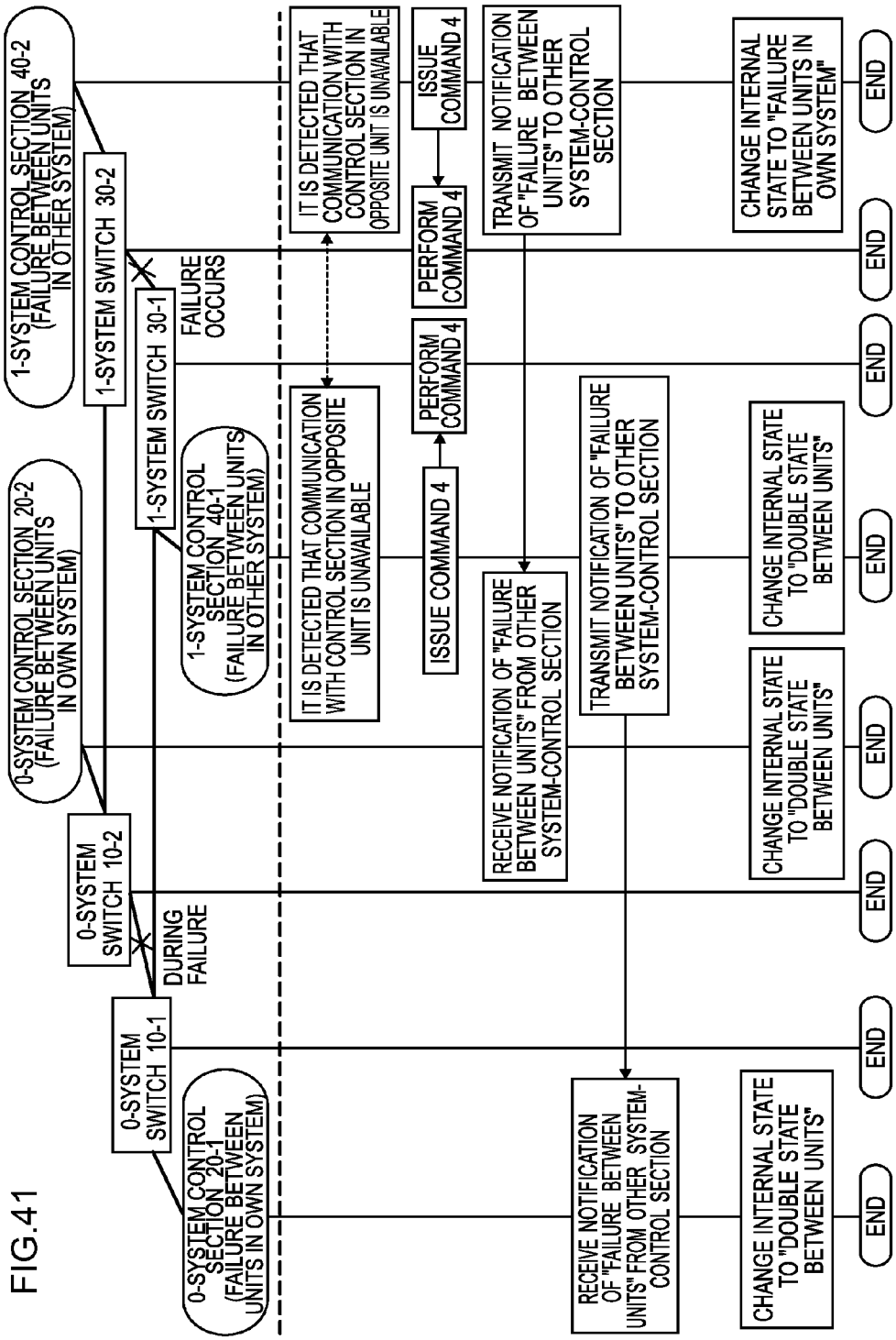
FIG. 41 is a diagram illustrating an operation flow when failure occurs between units of both of two systems.
Figure 42:
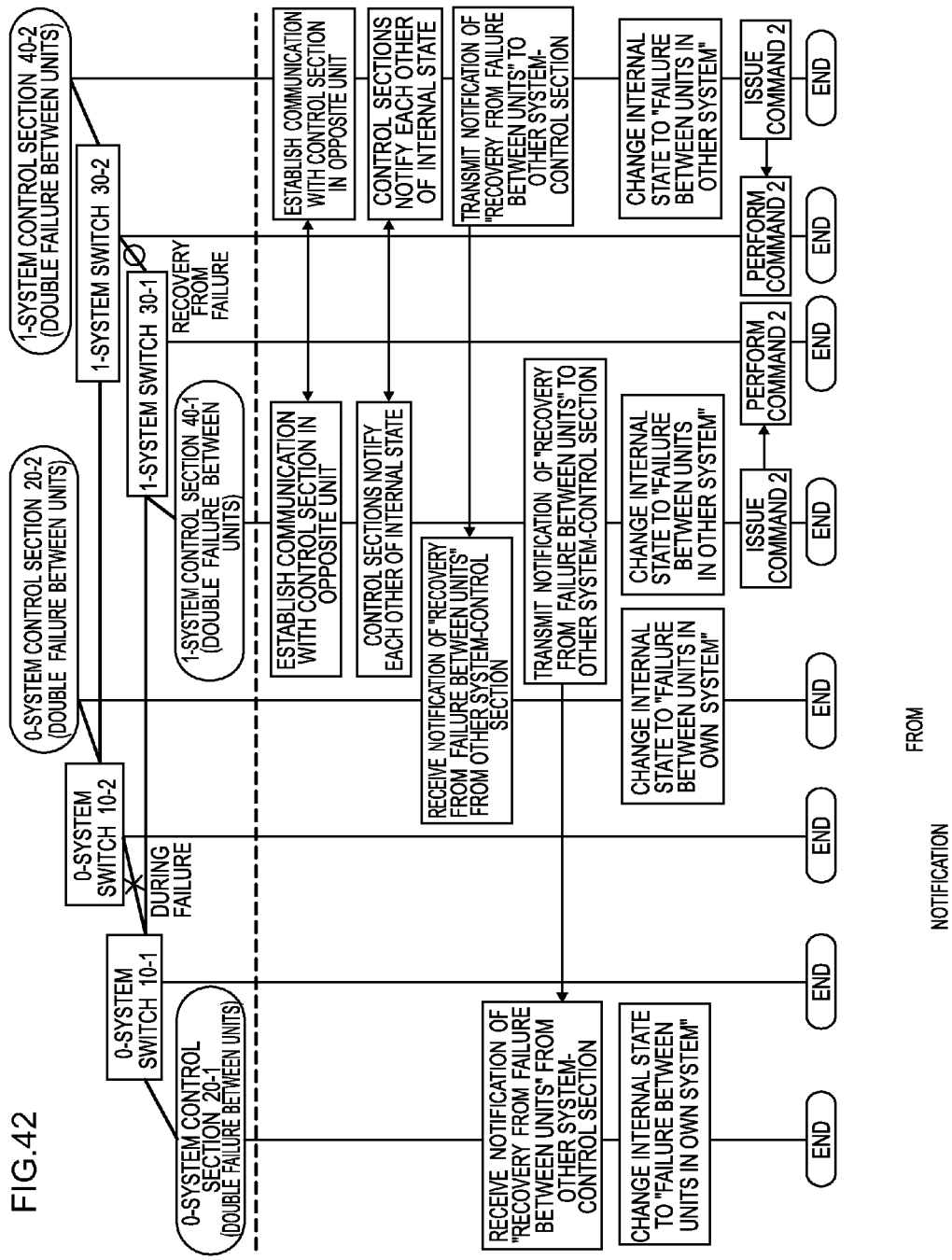
FIG. 42 is a diagram illustrating an operation flow when failure in one system is remedied from a state in which failure occurs between units of both of two systems.
Figure 43:
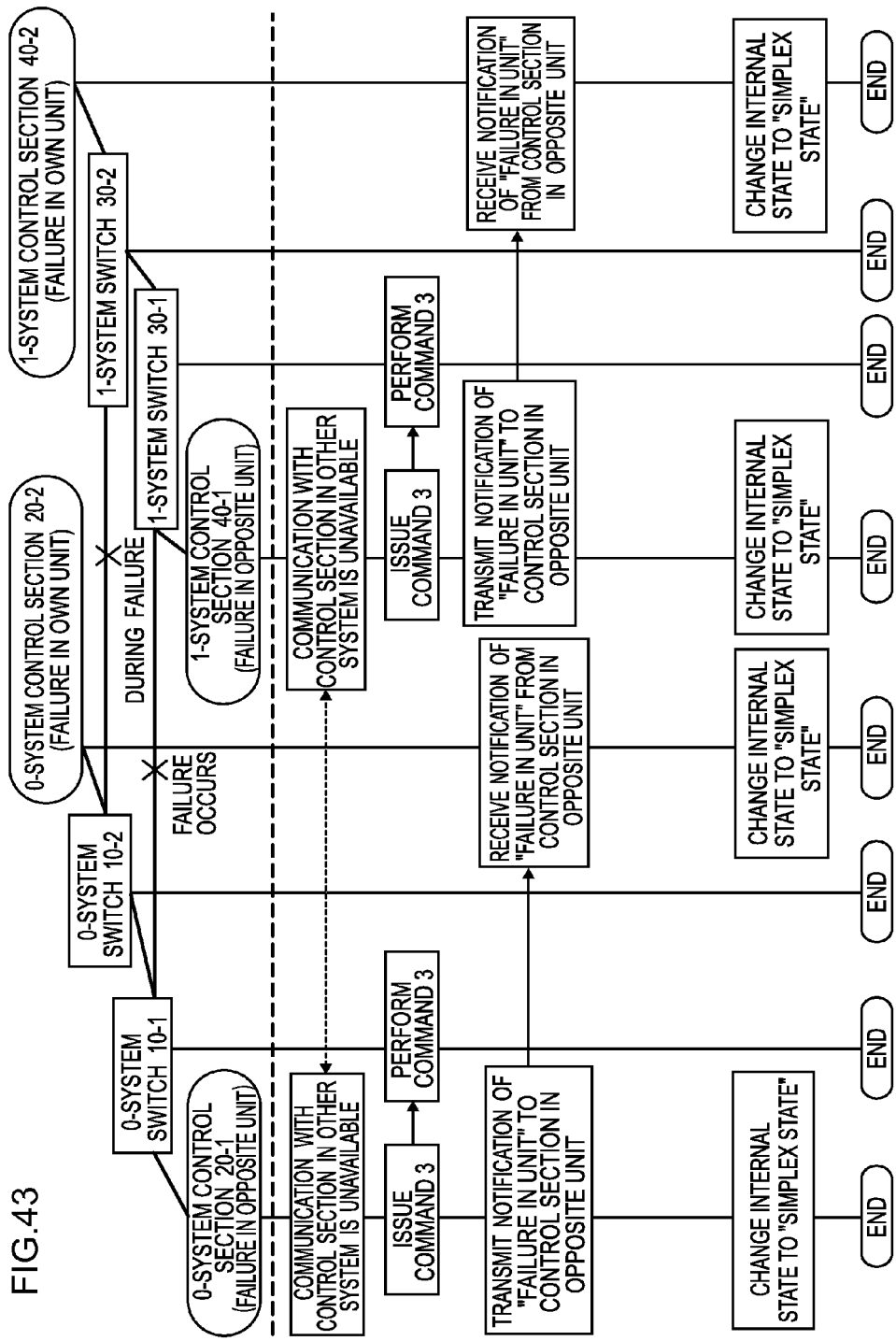
FIG. 43 is a diagram illustrating an operation flow when failure occurs in two units.
Figure 44:
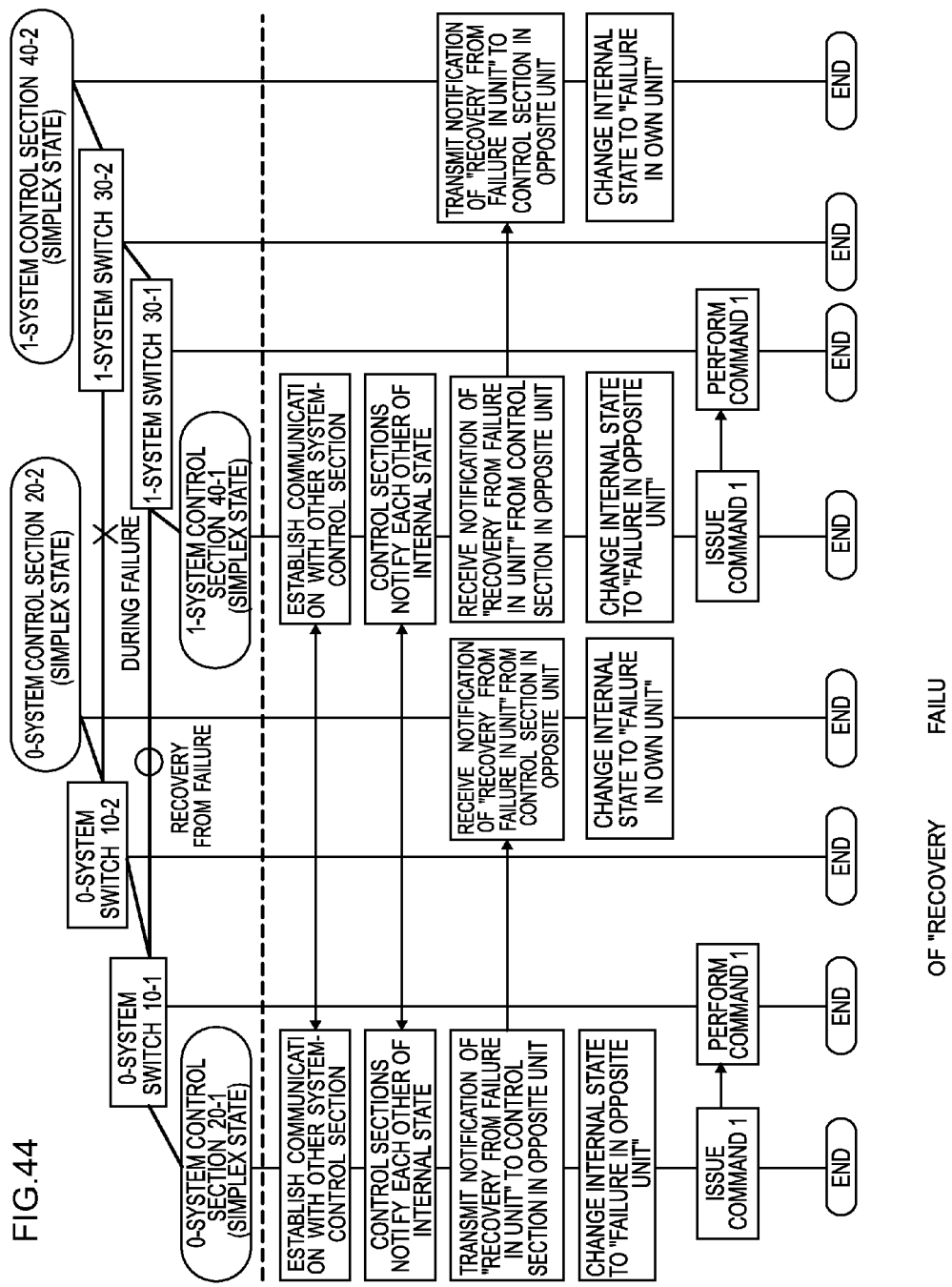
FIG. 44 is a diagram illustrating an operation flow when failure in one unit is remedied from a state in which failure occurs in both of two units.
Figure 45:
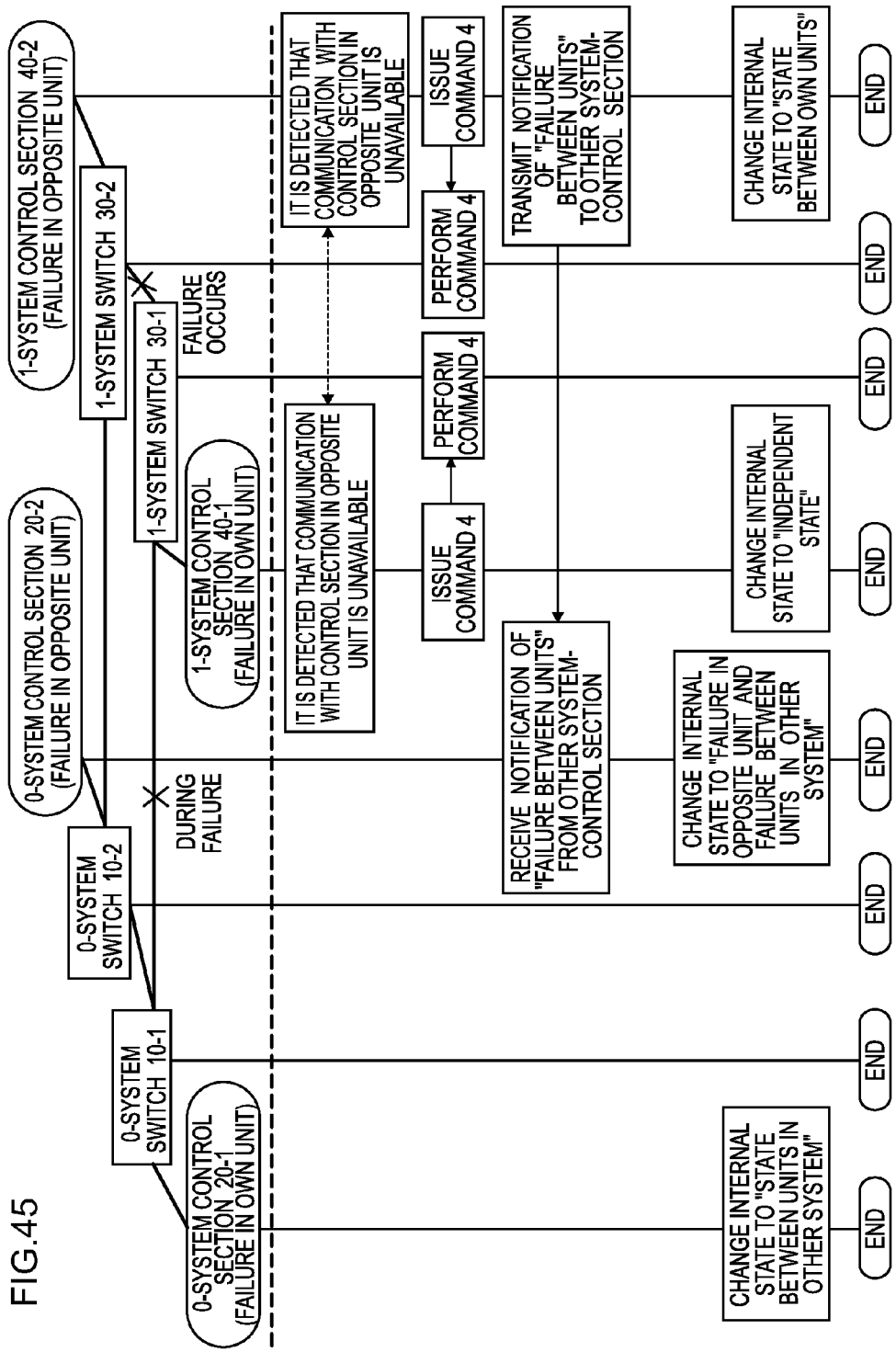
FIG. 45 is a diagram illustrating an operation flow when inter-unit failure occurs in a state in which failure occurs in one of two units.
Figure 46:
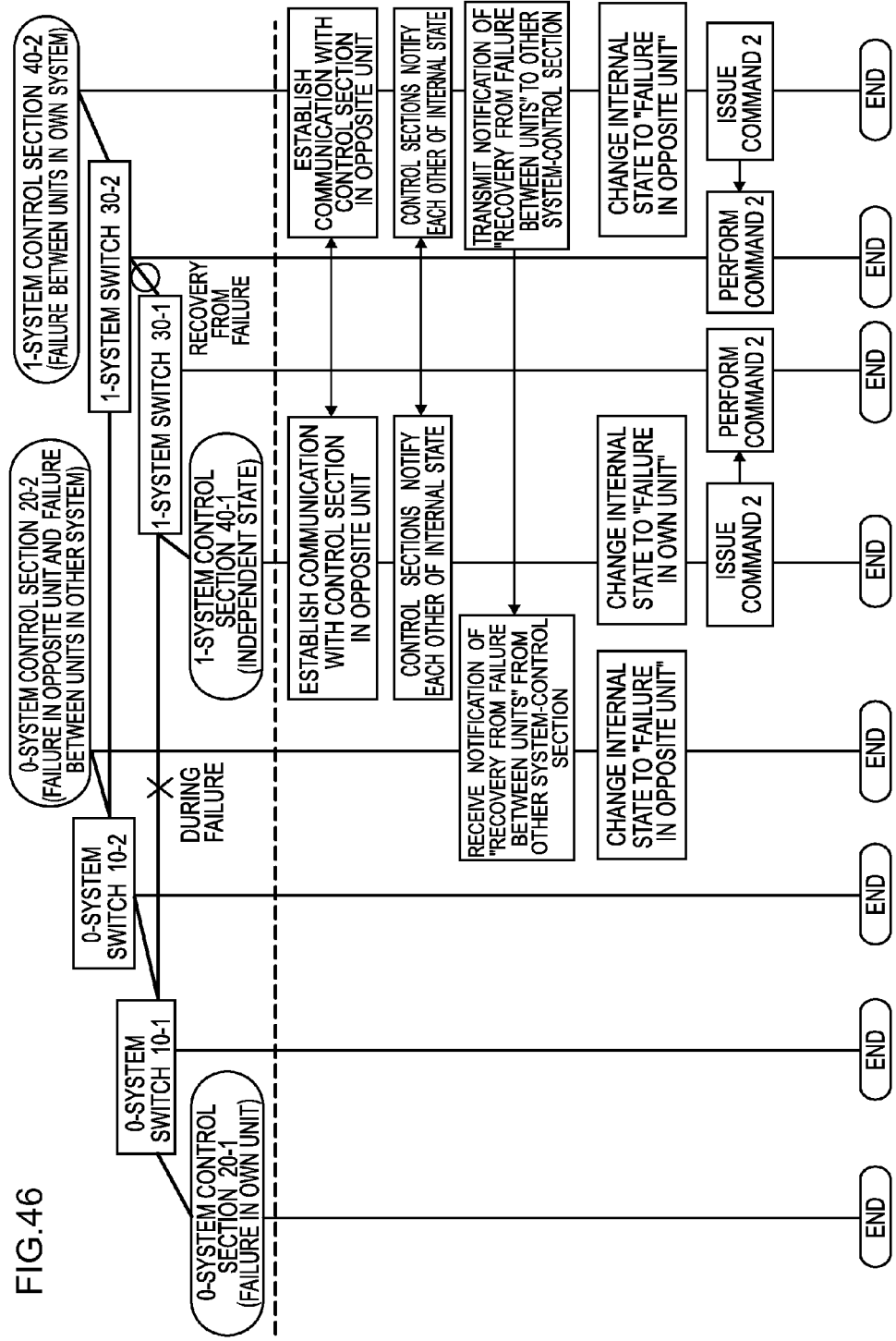
FIG. 46 is a diagram illustrating an operation flow when inter-unit failure is remedied in a state in which both failure occurs in a unit and inter-unit failure occurs.
Figure 47:
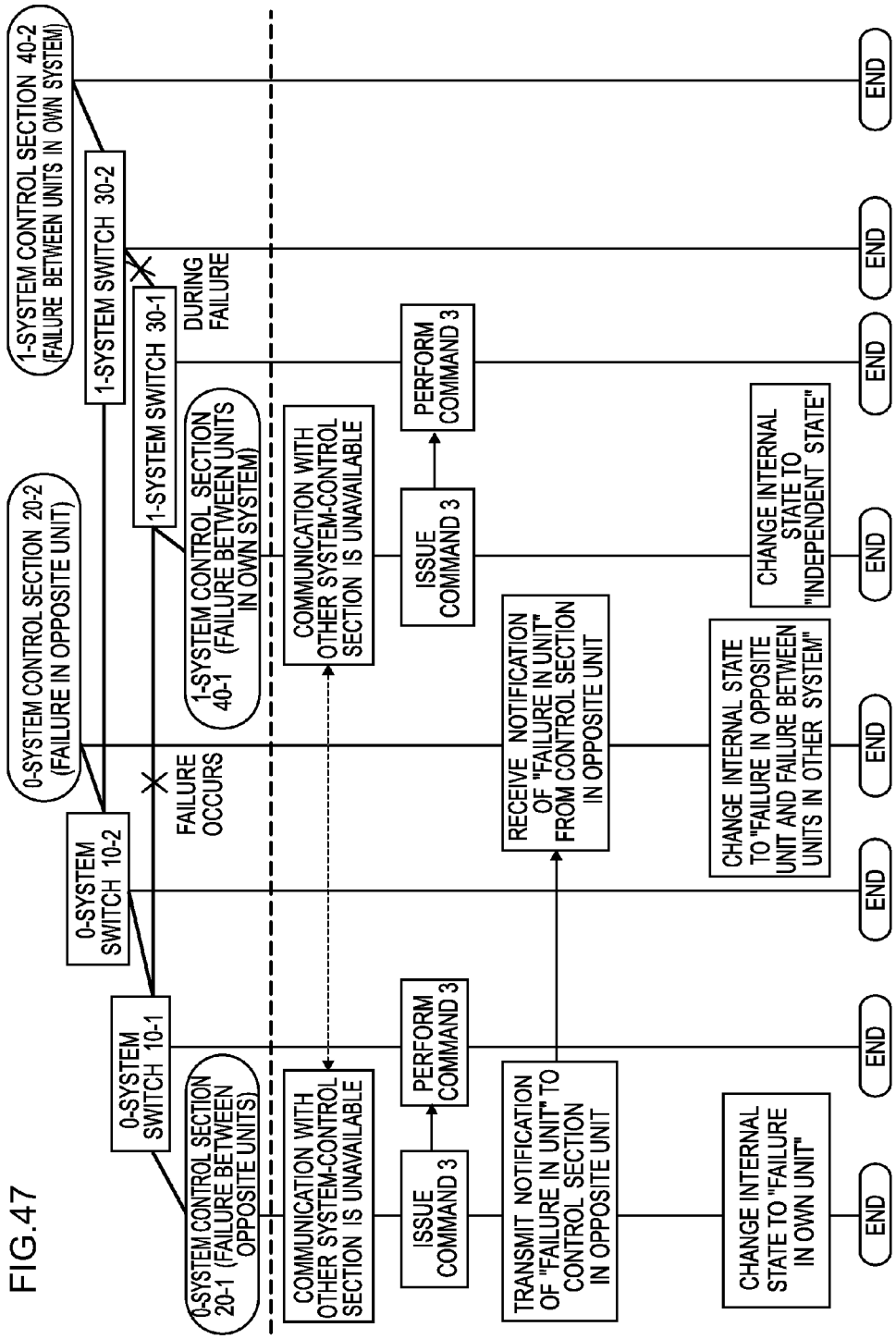
FIG. 47 is a diagram illustrating an operation flow when failure occurs in a unit in a state in which inter-unit failure occurs.
Figure 48:
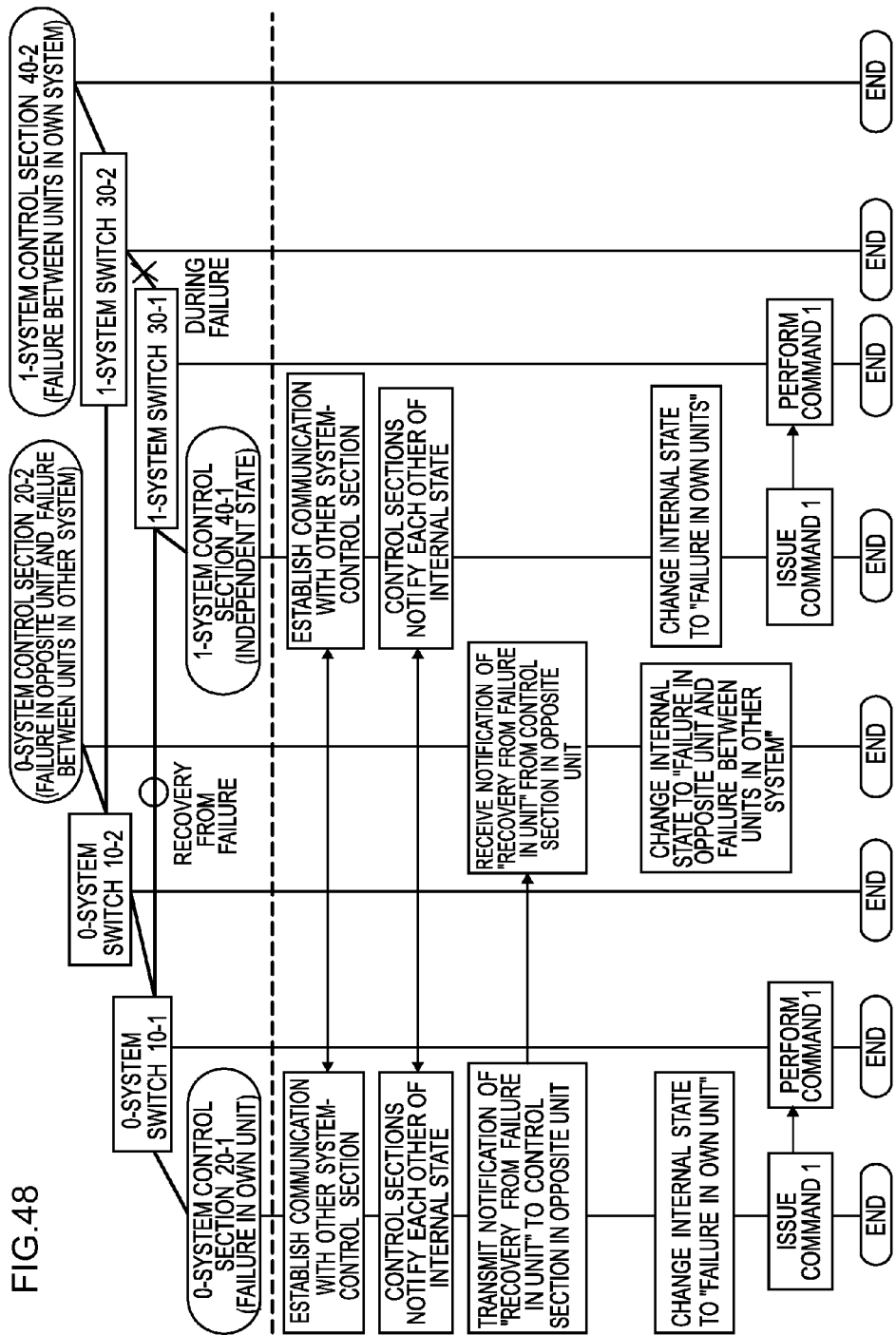
FIG. 48 is a diagram illustrating an operation flow when failure in a unit is remedied from a state in which both failure occurs in the unit and inter-unit failure occurs.
Figure 49:
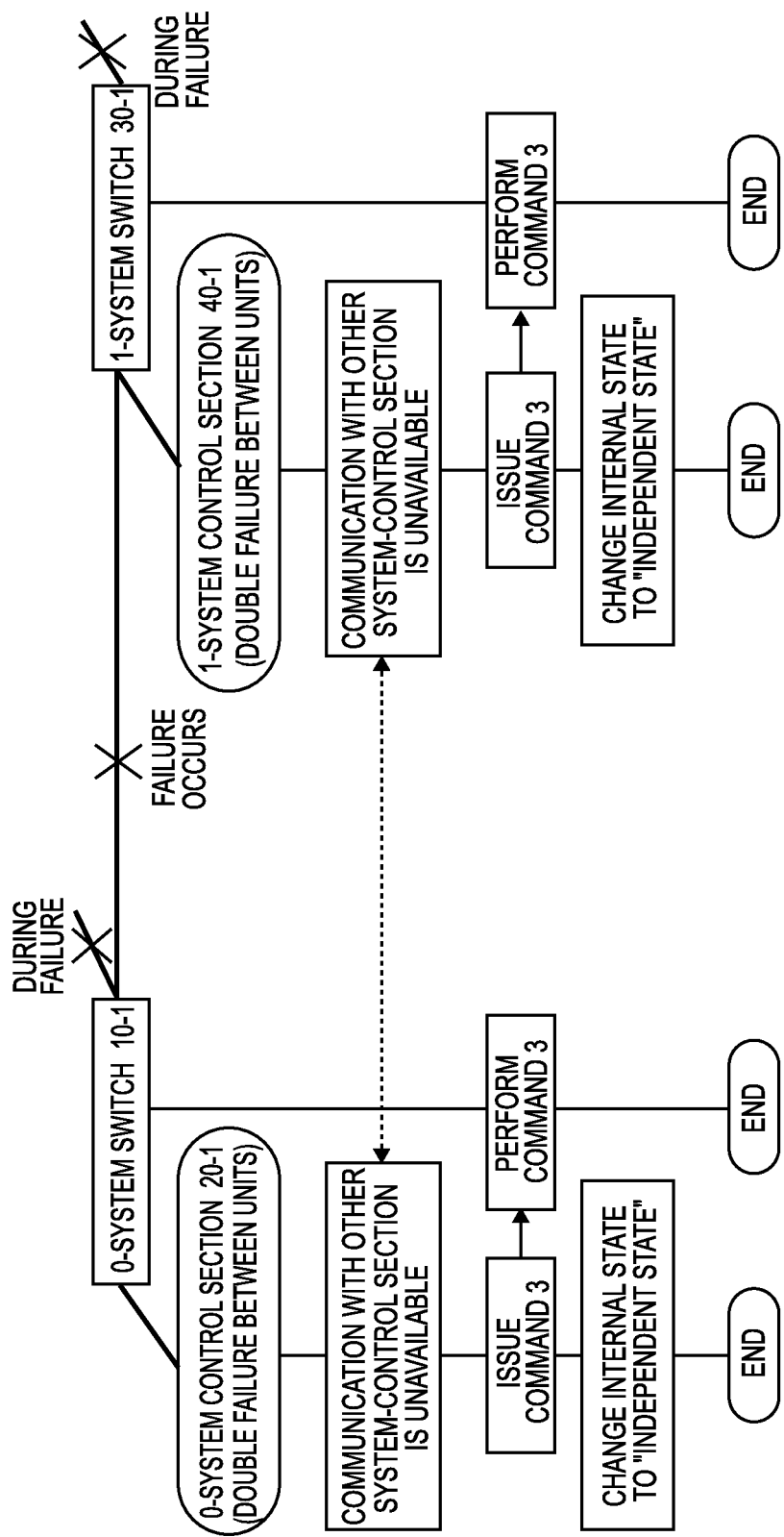
FIG. 49 is a diagram illustrating an operation flow when failure occurs in a unit in a state in which double failure occurs between the units in both of two systems.
Figure 50:
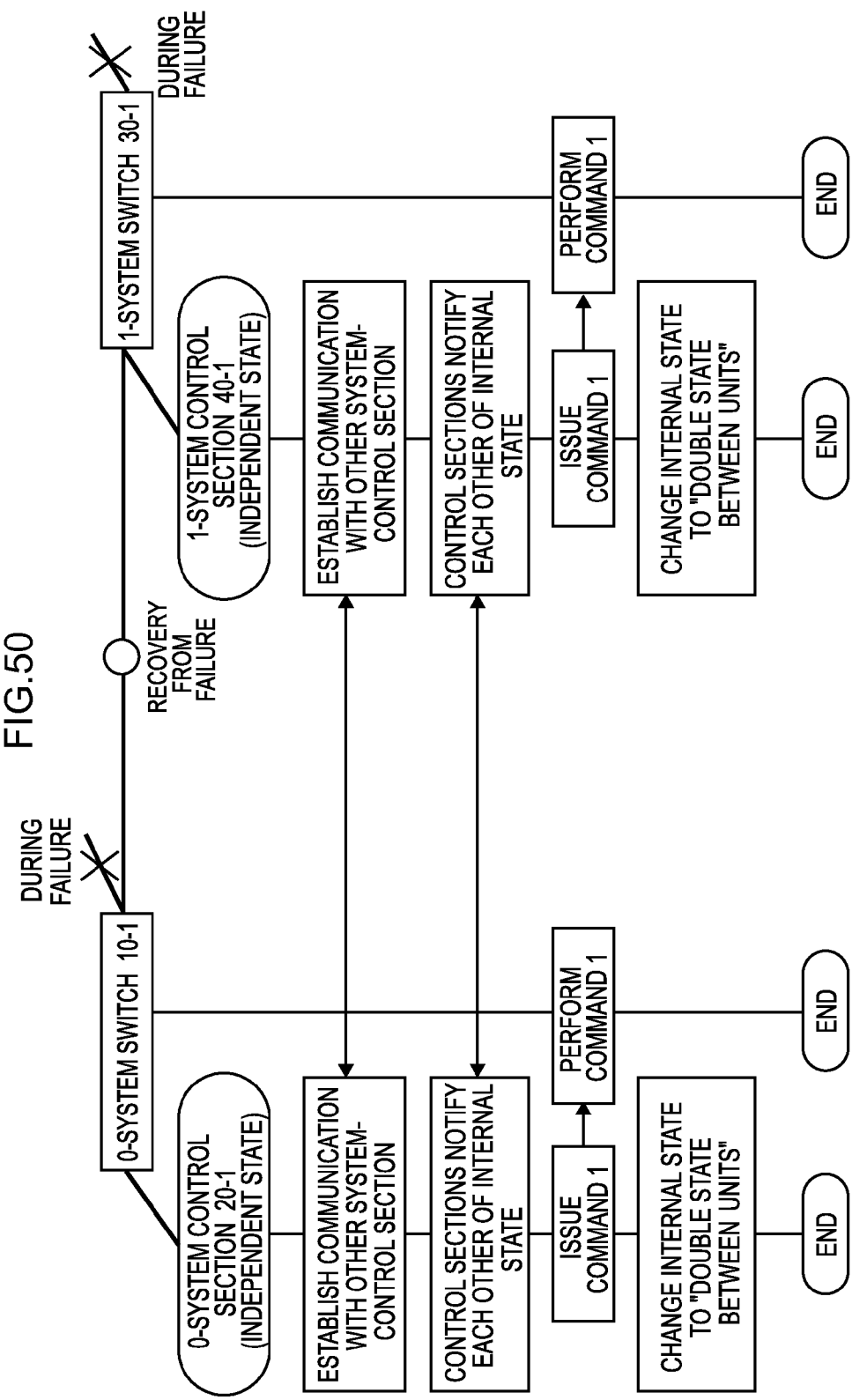
FIG. 50 is a diagram illustrating an operation flow when failure in a unit which is in an independent state is remedied in both of two systems.
Figure 51:
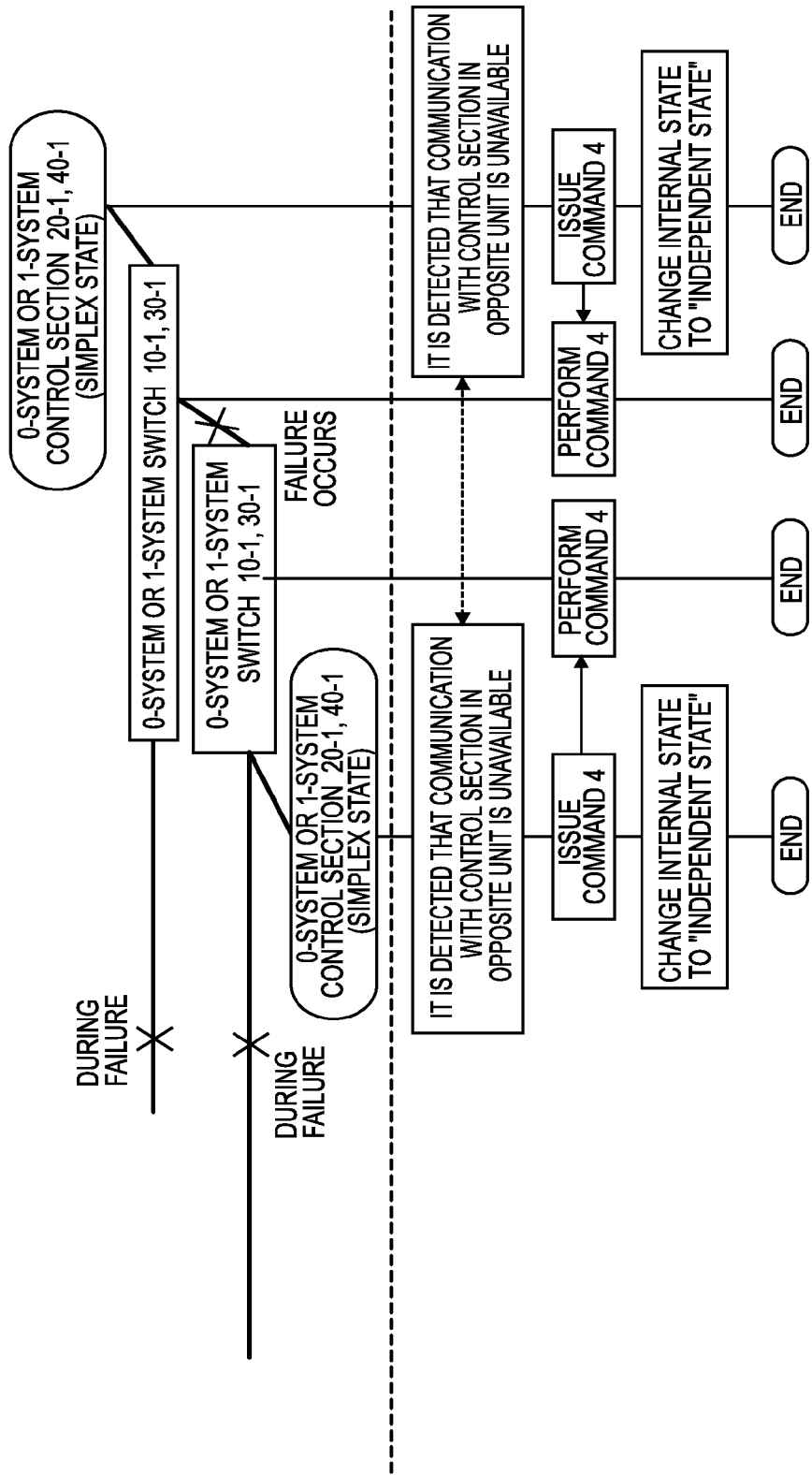
FIG. 51 is a diagram illustrating an operation flow when failure occurs between two units, both of which are in a simplex state.
Figure 52:
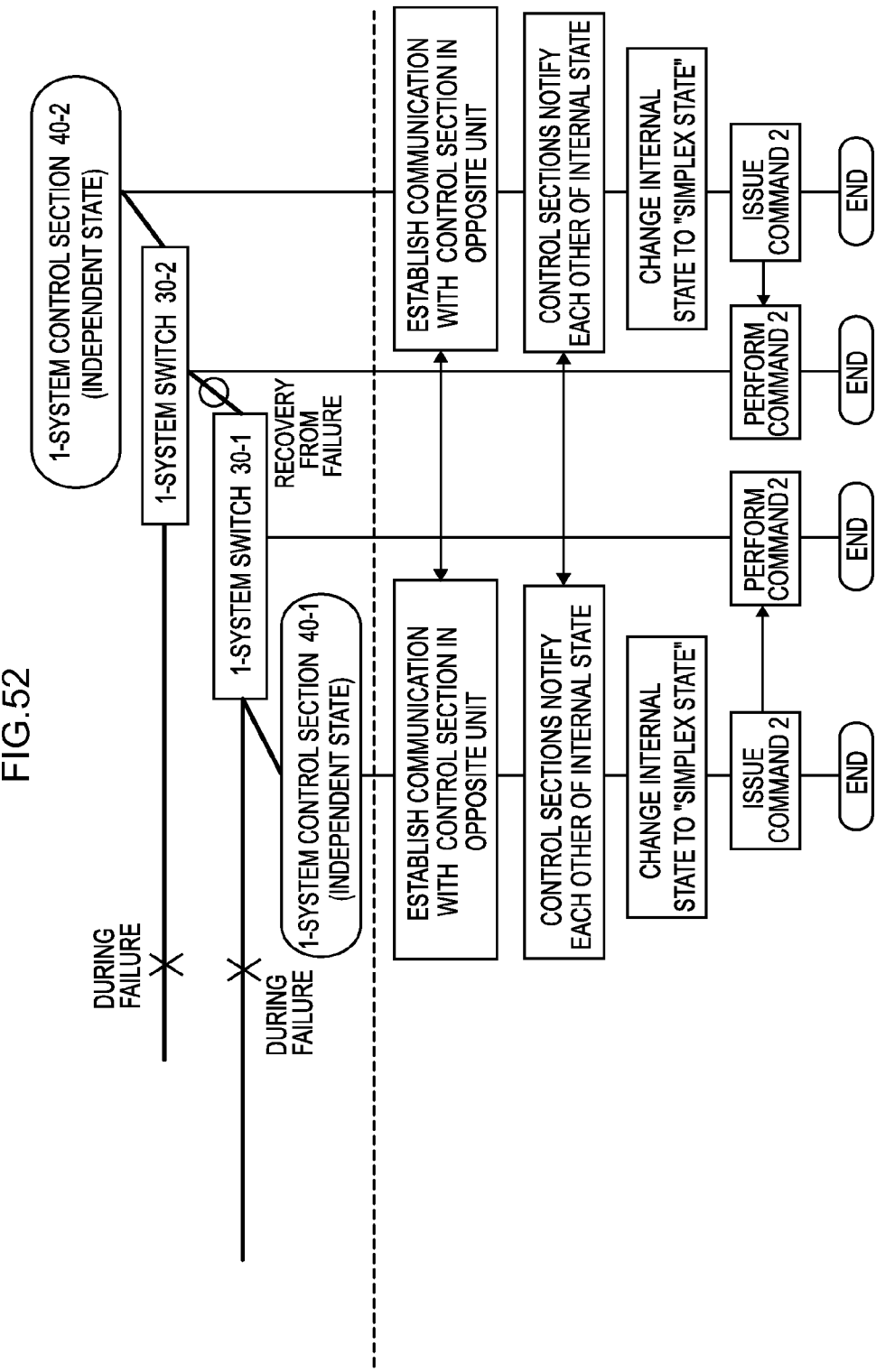
FIG. 52 is a diagram illustrating an operation flow when failure between two units which are both in an independent state is remedied.
Figure 53:
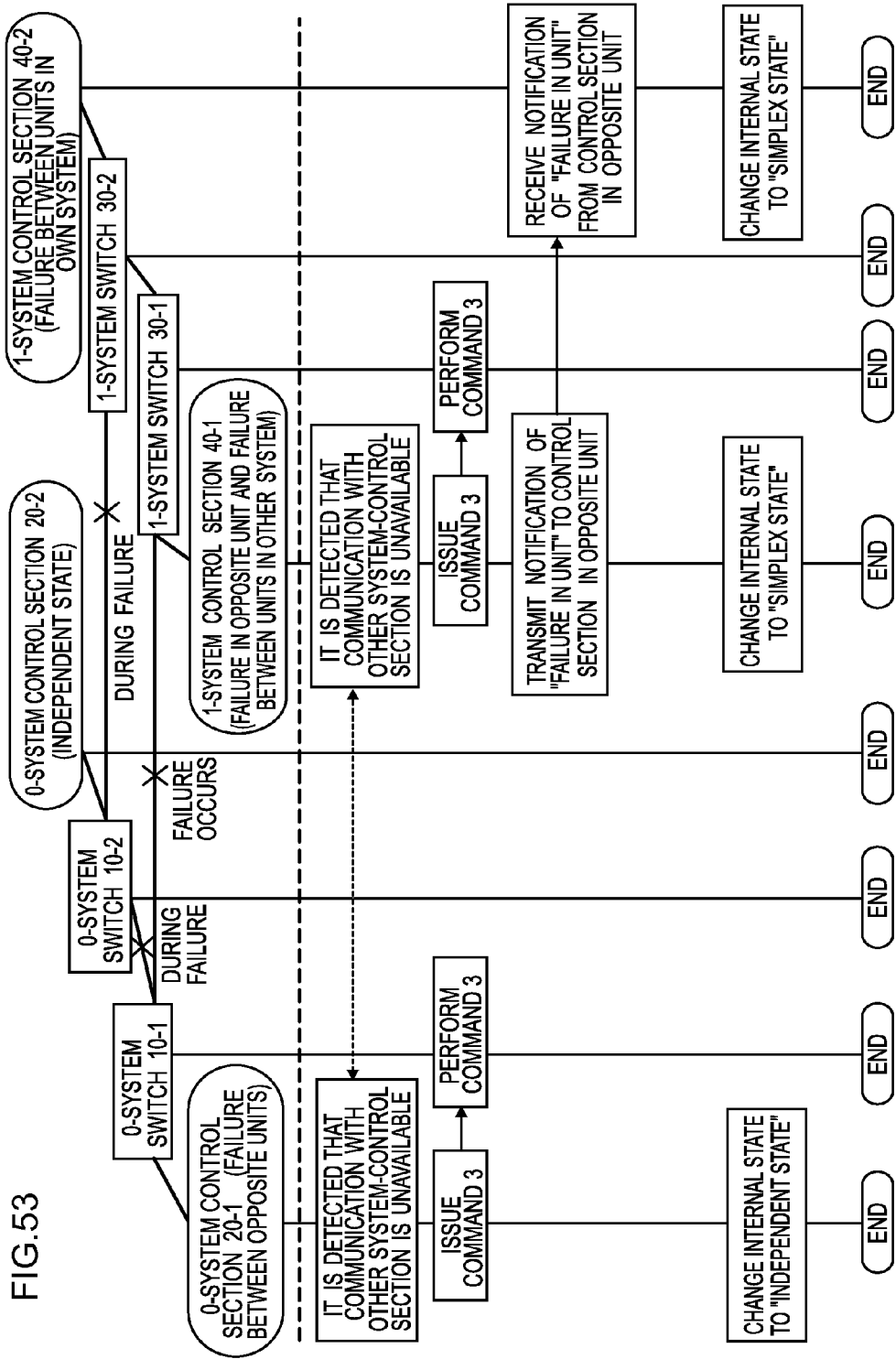
FIG. 53 is a diagram illustrating an operation flow when failure occurs in another unit in a state in which both failure occurs in one unit and failure occurs between opposing units.
Figure 54:
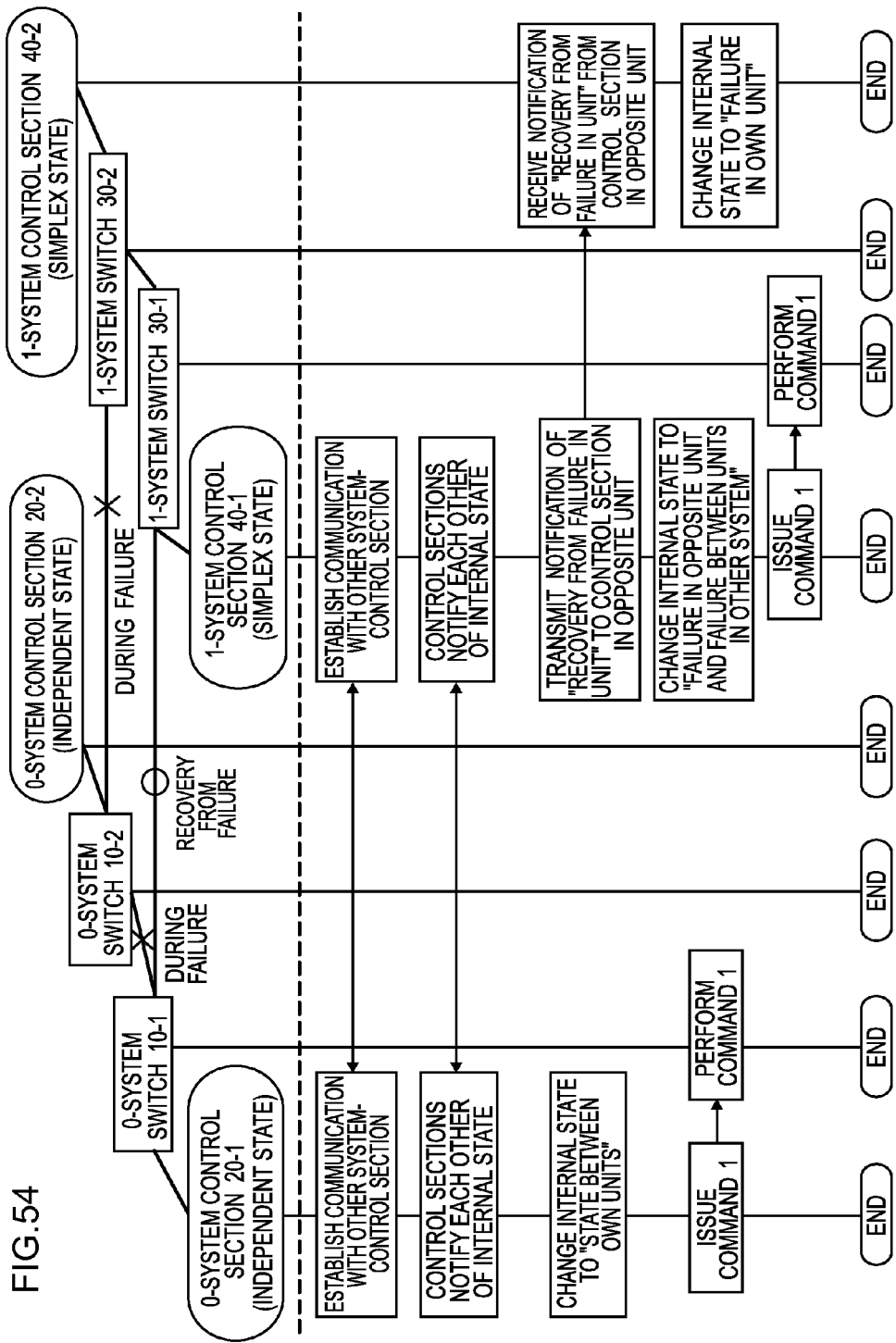
FIG. 54 is a diagram illustrating an operation flow when failure in one unit is remedied in a state in which failure occurs in both of two units and failure occurs between units in one system.
Figure 55:
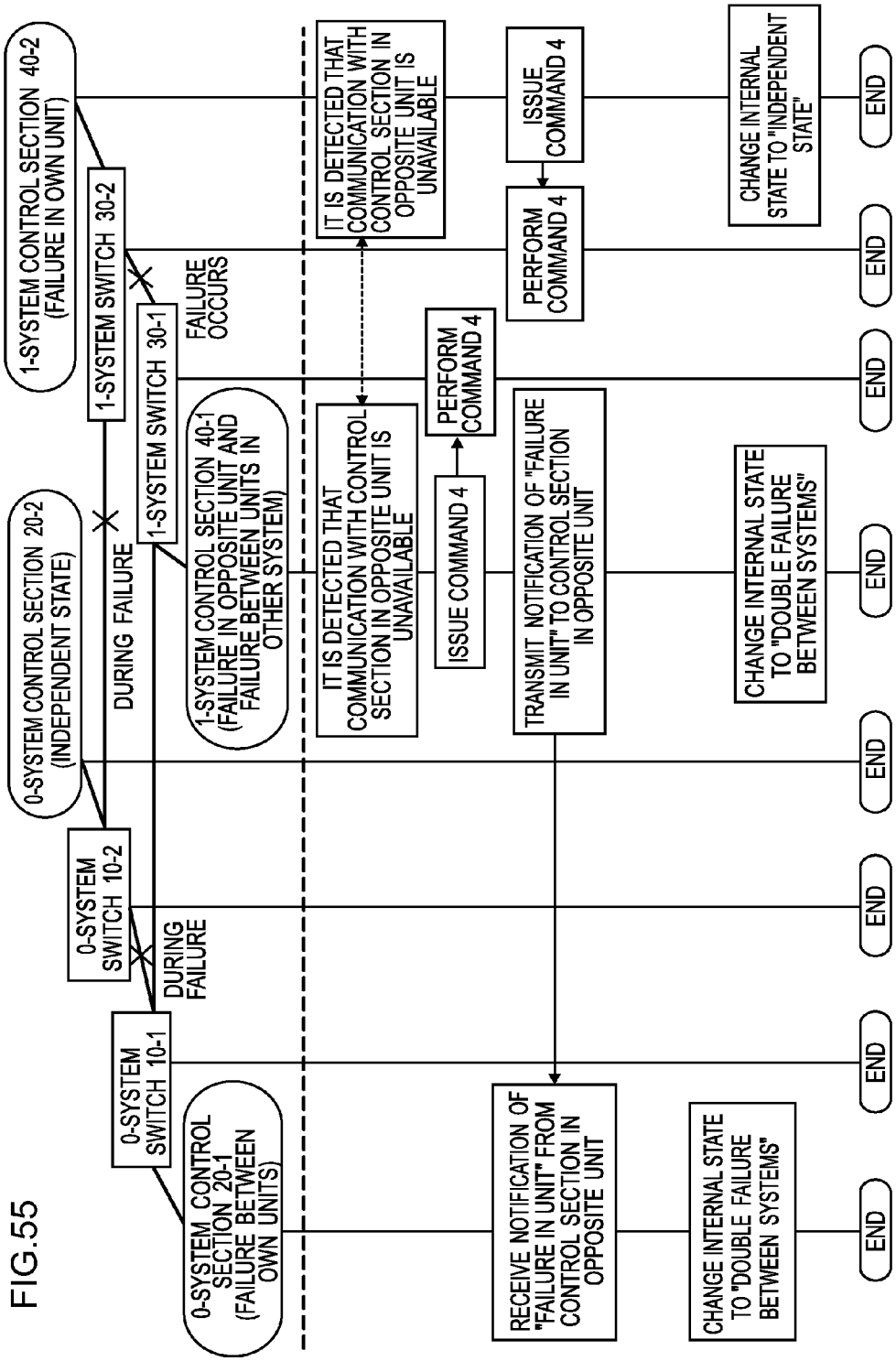
FIG. 55 is a diagram illustrating an operation flow when failure occurs between units in the other system in a state in which failure occurs in one unit and failure occurs between units in one system.
Figure 56:
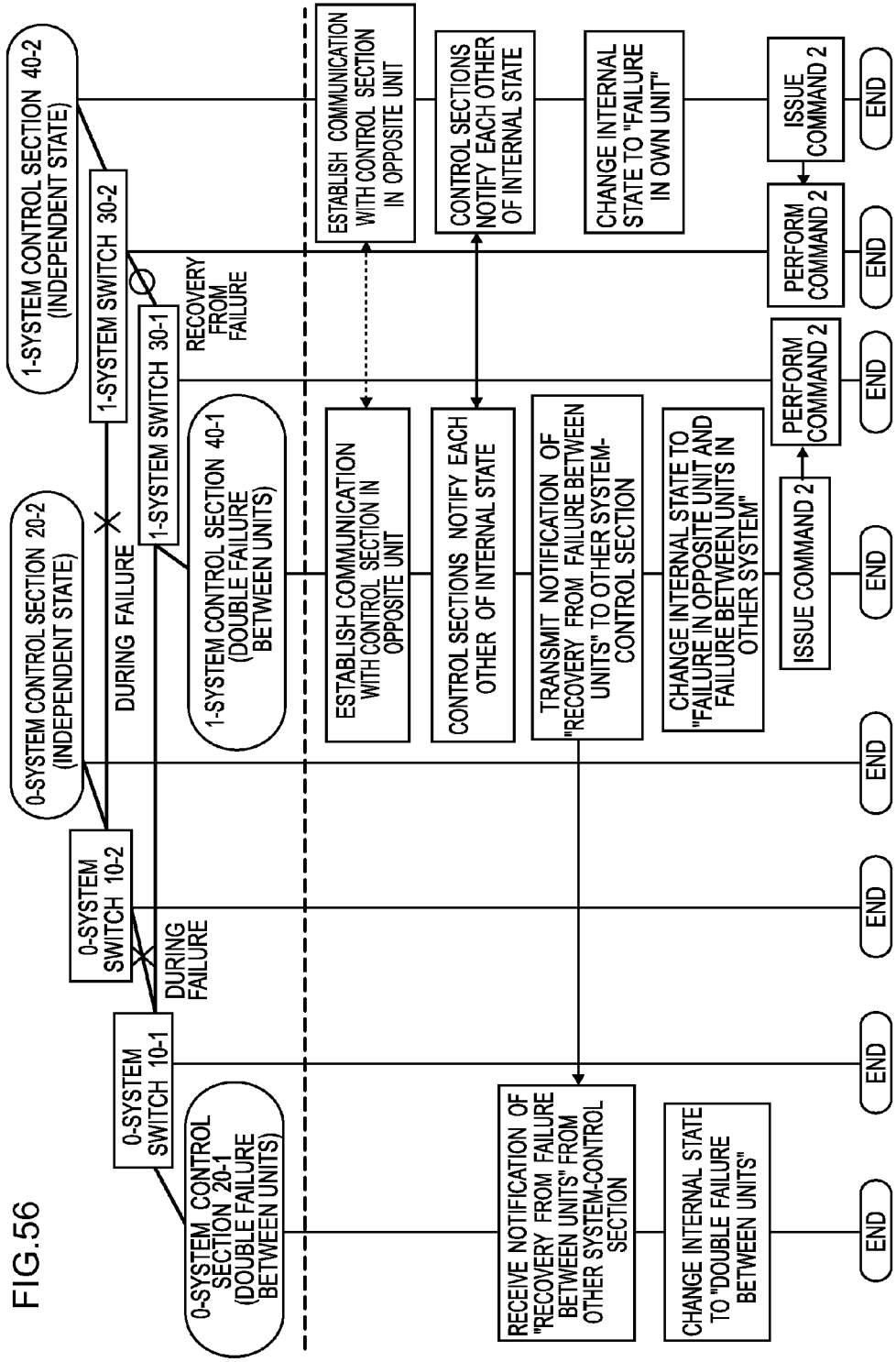
FIG. 56 is a diagram illustrating an operation flow when failure between units in one system is remedied in a state in which failure occurs in one unit and failure occurs between units in both of two systems.

Next, the operation of the 0-system control section 20-1 as an operation subject when a notification of the establishment of communication in the unit is received will be described with reference to FIG. 35. The 0-system control section 20-1 performs the routine when a notification of the occurrence of a failure in the unit from the 0-system control section 20-2, which is an opposite control section, has been received.

First, the state update section 23 updates the connection state of the connection state storage section 21 based on the connection state stored in the connection state storage section 21 (Step S81). FIG. 36 illustrates a transition table of connection state when a notification of the establishment of communication in the unit is received. A "connection state before the notification is received" is a current connection state. A "connection state after the notification is received" is a connection state after update. For example, if the current connection state is the "simplex state", the state update section 23 updates the connection state of the connection state storage section 21 to the "inter-unit failure in the own system".

Then, the command section 25 performs the relay control application determining processing illustrated in FIG. 19 (Step S82). The command section 25 determines whether or not the connection state of the connection state storage section 21 is the "perfect state" (Step S11). If the current connection state is not the "perfect state", the command section 25 ends the determining processing without issuing a relay suppression command (Step S12). If the current connection state is the "perfect state", the command section 25 issues, to the 0-system switch 10-1 which is the control target switch, a relay suppression validation command 5 to suppress the relay of a specific frame to the 0-system switch 10-2 which is the opposite switch (Step S12).

Then, the command section 25 determines whether or not the connection state of the connection state storage section 21 is the "perfect state" (Step S83). If the current connection state is not the "perfect state", the command section 25 ends the routine without issuing command 8. If the current connection state is the "perfect state", the command section 25 issues, to the 0-system switch 10-1 which is the control target switch, command 8 to delete the MAC address, whose transmission destination is the other system-switch, from the path control table 12 (Step S84).

In response to command 8, the path information update section 13 of the 0-system switch 10-1 deletes the MAC address, whose transmission destination is the other system-switch with respect to the 0-system switch 10-1, from the path control table 12. The relay section 11 can add the MAC address of the frame which is received thereafter as an "address" to the path control table 12, thereby setting a new frame relay destination.

FIGS. 22 and 23 illustrate an operation and a transition table when an inter-unit communication establishment notification is received, respectively. Each of the 0-system control section 20-2 and the 1-system control sections 40-1 and 40-2 performs the same processing as the 0-system control section 20-1.

As described with reference to FIGS. 27 to 36, even when a failure is detected, a failure occurrence notification is received, and communication is established, the control sections notify each other of the connection states that each stores, and update their own connection states. If the connection state is the "perfect state", each control section issues a command to suppress the relay of a frame to the opposite switch with respect to the control target switch. Even when a failure is detected, a failure occurrence notification is received, and communication is established, the above-mentioned processing can prevent frames from being looped via the relay paths 61-1, 61-2, 62, and 63 while retaining the redundancy of a frame relay path.

Various patterns are considered for the operation flow of the relay units 1-1 and 1-2 when a failure is detected, a failure occurrence notification is received, and communication is established. FIGS. 37 to 56 illustrate various patterns of the operation flow of the relay units 1-1 and 1-2. FIGS. 37 to 56 also illustrate a connection state, a failure occurrence position, and a position of recovery from failure stored in each control section. These flows are performed according to the operation of the processing routines illustrated in FIG. 22, FIG. 23, and FIGS. 27 to 36. As shown in FIGS. 37 to 56, even when various patterns of failures are detected and a failure occurrence notification is received, the relay system 100 according to this embodiment can prevent frames from being looped via the relay paths 61-1, 61-2, 62, and 63 while retaining the redundancy of a frame relay path. In addition, even when communication is established, that is, a communication is recovered from failure, the relay system 100 according to this embodiment can effectively use a frame relay path while preventing frames from being looped via the relay paths 61-1, 61-2, 61-3, 62, and 63.

<Second Embodiment>

Figure 57:
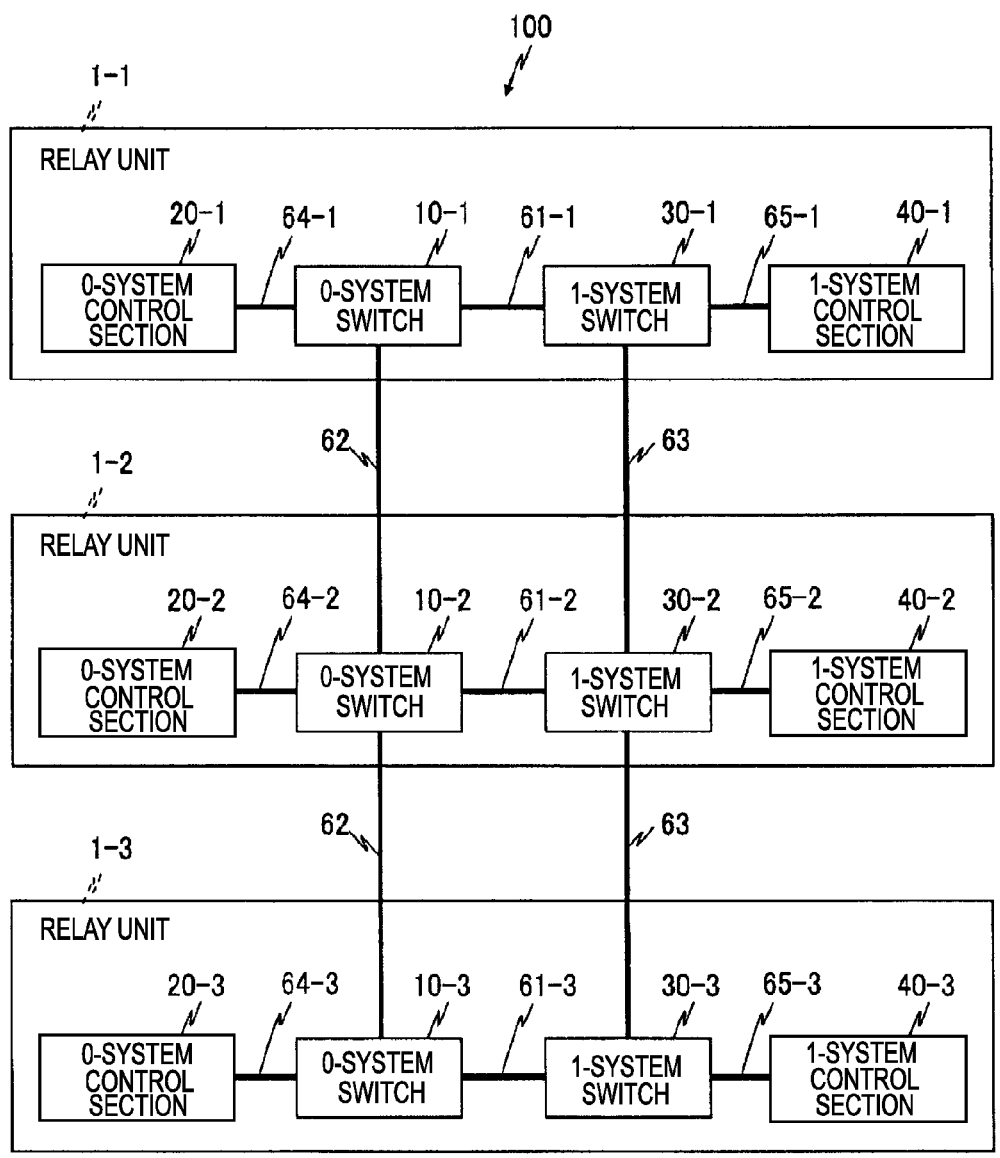
FIG. 57 is a block diagram illustrating the structure of a relay system according to a second embodiment of the invention.

FIG. 57 illustrates the structure of a relay system 100 according to a second embodiment of the invention. In the relay system 100 according to this embodiment, relay units 1-1, 1-2, and 1-3 are connected to each other in multiple stages. Next, components different from those in the first embodiment will be mainly described. A host terminal (not illustrated) is connected to each switch in the same way as that in FIG. 1.

A connection state storage section 41 stores "3" as the number of connections. A notification receiving section 42, a state update section 43, a connection state notifying section 44, and a command section 45 perform an operation according to this embodiment if the number of connections stored in the connection state storage section 41 is equal to or greater than "3". Connection priority stored in the connection state storage sections 41 of the relay units 1-1, 1-2, and 1-3 are, for example, "1", "2", and "3". In this case, the smaller the number is, the higher the priority is.

When a communication establishment section 46 has been established communication between the control sections in the own unit, the connection state notifying section 44 transmits a notification of the establishment of communication (hereinafter, referred to an inter-system communication validation notification) to a control section whose connection priority is higher. For example, when communication is established between the 1-system control section 40-3 and the 0-system control section 20-3, the connection state notifying section 44 of the 1-system control section 40-3 transmits the inter-system communication validation notification to the 1-system control section 40-2, which is an upper device.

In addition, if communication between the control sections in the own unit is not established by the communication establishment section 46 when the notification receiving section 42 has received the inter-system communication validation notification from a lower device, the connection state notifying section 44 relays the received inter-system communication validation notification to an upper device. For example, if communication between the 1-system control section 40-2 and the 0-system control section 20-2 is not established when the notification receiving section 42 of the 1-system control section 40-2 has received the inter-system communication validation notification from the 1-system control section 40-3, which is the lower device, the connection state notifying section 44 of the 1-system control section 40-2 relays the received inter-system communication validation notification to the 1-system control section 40-1, which is the upper device.

In addition, if communication between the control sections in the own unit has been established by the communication establishment section 46, and the inter-system communication validation notification has not been received from the other system-control section, when the notification receiving section 42 has received the inter-system communication validation notification from the lower device, the connection state notifying section 44 relays the received inter-system communication validation notification to the other system-control section. For example, if communication between the 1-system control section 40-2 and the 0-system control section 20-2 has been established, and the inter-system communication validation notification has not been received from the 0-system control section 20-2, when the notification receiving section 42 of the 1-system control section 40-2 has received the inter-system communication validation notification from the 1-system control section 40-3, which is a lower device, the connection state notifying section 44 of the 1-system control section 40-2 relays the received inter-system communication validation notification to the 0-system control section 20-2, which is the other system-control section. If the notification receiving section 42 has received the inter-system communication validation notification from the other system-control section, the connection state notifying section 44 does not transmit the inter-system communication validation notification to the other system-control section.

If the notification receiving section 42 receives the inter-system communication validation notification from each of the lower device and the other system-control section, the command section 45 issues a relay suppression validation command 5 to a control target switch. For example, if the notification receiving section 42 of the 1-system control section 40-1 receives the inter-system communication validation notification from each of the 1-system control section 40-2, which is a lower device, and the 0-system control section 20-1, which is an other system-control section, the command section 45 of the 1-system control section 40-1 issues a relay suppression validation command 5 to the 1-system switch 30-1, which is the control target switch.

A connection state storage section 21, a notification receiving section 22, a state update section 23, a connection state notifying section 24, a command section 25, and a communication establishment section 26 perform the same operation as the connection state storage section 41, the notification receiving section 42, the state update section 43, the connection state notifying section 44, the command section 45, and the communication establishment section 46.

Figure 58:
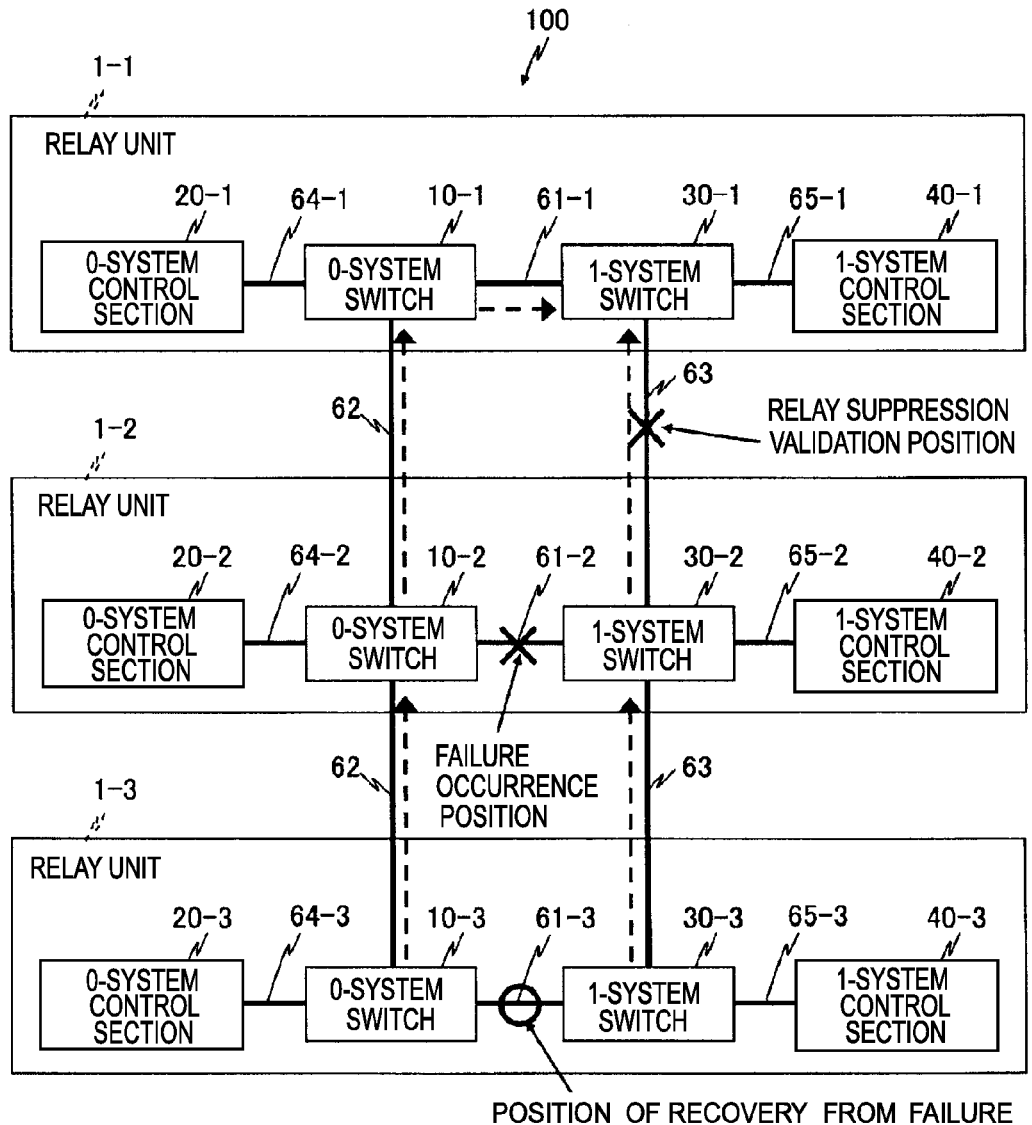
FIG. 58 is a diagram illustrating a position of recovery from failure, a failure occurrence position, a relay suppression validation position, and the flow of an inter-system communication validation notification in the relay system in FIG. 57.

FIG. 58 illustrates a position of recovery from failure, a failure occurrence position, a relay suppression validation position, and the flow of the inter-system communication validation notification in the relay system 100. The flow of the inter-system communication validation notification is indicated by a dashed arrow.

If communication is established between the 1-system control section 40-3 and the 0-system control section 20-3, that is, if communication is recovered from failure, the connection state notifying section 44 of the 1-system control section 40-3 transmits the inter-system communication validation notification to the 1-system control section 40-2, which is an upper device. Similarly, the connection state notifying section 24 of the 0-system control section 20-3 transmits the inter-system communication validation notification to the 0-system control section 20-2, which is an upper device.

When the notification receiving section 42 has received the inter-system communication validation notification from the 1-system control section 40-3, which is a lower device, since communication is not established between the 1-system control section 40-2 and the 0-system control section 20-2, that is, a communication failure occurs in the relay path 61-2, the connection state notifying section 44 of the 1-system control section 40-2 relays the received inter-system communication validation notification to the 1-system control section 40-1, which is an upper device. Similarly, the connection state notifying section 24 of the 0-system control section 20-2 relays the inter-system communication validation notification to the 0-system control section 20-1, which is an upper device.

When the notification receiving section 22 of the 0-system control section 20-1 has received the inter-system communication validation notification from the 0-system control section 20-2, which is a lower device, since communication is established between the 0-system control section 20-1 and the 1-system control section 40-1 and the inter-system communication validation notification has not been received from the 1-system control section 40-1, the connection state notifying section 24 of the 0-system control section 20-1 relays the received inter-system communication validation notification to the 1-system control section 40-1, which is the other system-control section. Since the inter-system communication validation notification has been received from the 0-system control section 20-1, which is the other system-control section, the connection state notifying section 44 of the 1-system control section 40-1 does not relay the received inter-system communication validation notification to the 0-system control section 20-1.

If the notification receiving section 42 of the 1-system control section 40-1 receives the inter-system communication validation notification from each of the 1-system control section 40-2, which is a lower device, and the 0-system control section 20-1, which is the other system-control section, the command section 45 of the 1-system control section 40-1 issues a relay suppression validation command 5 to the 1-system switch 30-1, which is a control target switch. Note that, since the inter-system communication validation notification is not received from the 1-system control section 40-1, which is the other system-control section, the command section 45 of the 0-system control section 20-1 does not relay the inter-system communication validation notification received from the 0-system control section 20-1, which is a lower device, to the 1-system control section 40-1.

The 1-system switch 30-1 does not relay a specific frame, such as a frame of user traffic, to the 1-system switch 30-2, which is the opposite switch, in response to command 5 from the command section 45 of the 1-system control section 40-1.

Even if the relay units 1-1, 1-2, and 1-3 are connected in three stages, the above-mentioned operation can prevent frames from being looped via the relay paths 61-1, 61-2, 61-3, 62, and 63 while retaining the redundancy of a frame relay path.

Next, an operation when relay suppression is invalidated will be described.

When a failure detection notification of the detection of a communication failure between the control target switch and the opposite switch has been received from the failure detecting section 14 of the control target switch, the connection state notifying section 24 transmits the inter-system communication invalidation notification to an upper device. For example, when receiving a failure detection notification of the detection of a communication failure between the 0-system switch 10-2, which is the control target switch, and the 1-system switch 30-2, which is the opposite switch, has been received from the failure detecting section 14 of the 0-system switch 10-2, the connection state notifying section 24 of the 0-system control section 20-2 transmits the inter-system communication invalidation notification to the 0-system control section 20-1, which is the upper device.

If communication is not established between the control sections in the own unit by the communication establishment section 26 when the notification receiving section 22 has received the inter-system communication invalidation notification from the lower device, the connection state notifying section 24 relays the received inter-system communication invalidation notification to the upper device. For example, if communication is not established between the 0-system control section 20-2 and the 1-system control section 40-2 when the notification receiving section 22 of the 0-system control section 20-2 has received the inter-system communication invalidation notification from the 0-system control section 20-3, which is a lower device, the connection state notifying section 24 of the 0-system control section 20-2 relays the received inter-system communication invalidation notification to the 0-system control section 20-1, which is the upper device.

If communication has been established between the control sections in the own unit by the communication establishment section 26 when the notification receiving section 22 has received the inter-system communication invalidation notification from the lower device, the connection state notifying section 24 relays the received inter-system communication invalidation notification to the other system-control section. For example, if communication is established between the 0-system control section 20-2 and the 1-system control section 40-2 when the notification receiving section 22 of the 0-system control section 20-2 has received the inter-system communication invalidation notification from the 0-system control section 20-3, which is a lower device, the connection state notifying section 24 of the 0-system control section 20-2 relays the received inter-system communication invalidation notification to the 1-system control section 40-2, which is the other system-control section.

If the notification receiving section 42 receives the inter-system communication invalidation notification from an other system-device when command 5 has been issued to a control target switch, the command section 25 issues a relay suppression invalidation command 6 to the control target switch. For example, if the notification receiving section 42 of the 1-system control section 40-1 receives the inter-system communication invalidation notification from the 0-system control section 20-1 which is the other system-device when command 5 has been issued to the 1-system switch 30-1 which is the control target switch, the command section 25 of the 1-system control section 40-1 issues a relay suppression invalidation command 6 to the 1-system switch 30-1.

The connection state storage section 41, the notification receiving section 42, the state update section 43, the connection state notifying section 44, the command section 45, and the communication establishment section 46 perform the same operation as the connection state storage section 21, the notification receiving section 22, the state update section 23, the connection state notifying section 24, the command section 25, and the communication establishment section 26, respectively.

Figure 59:
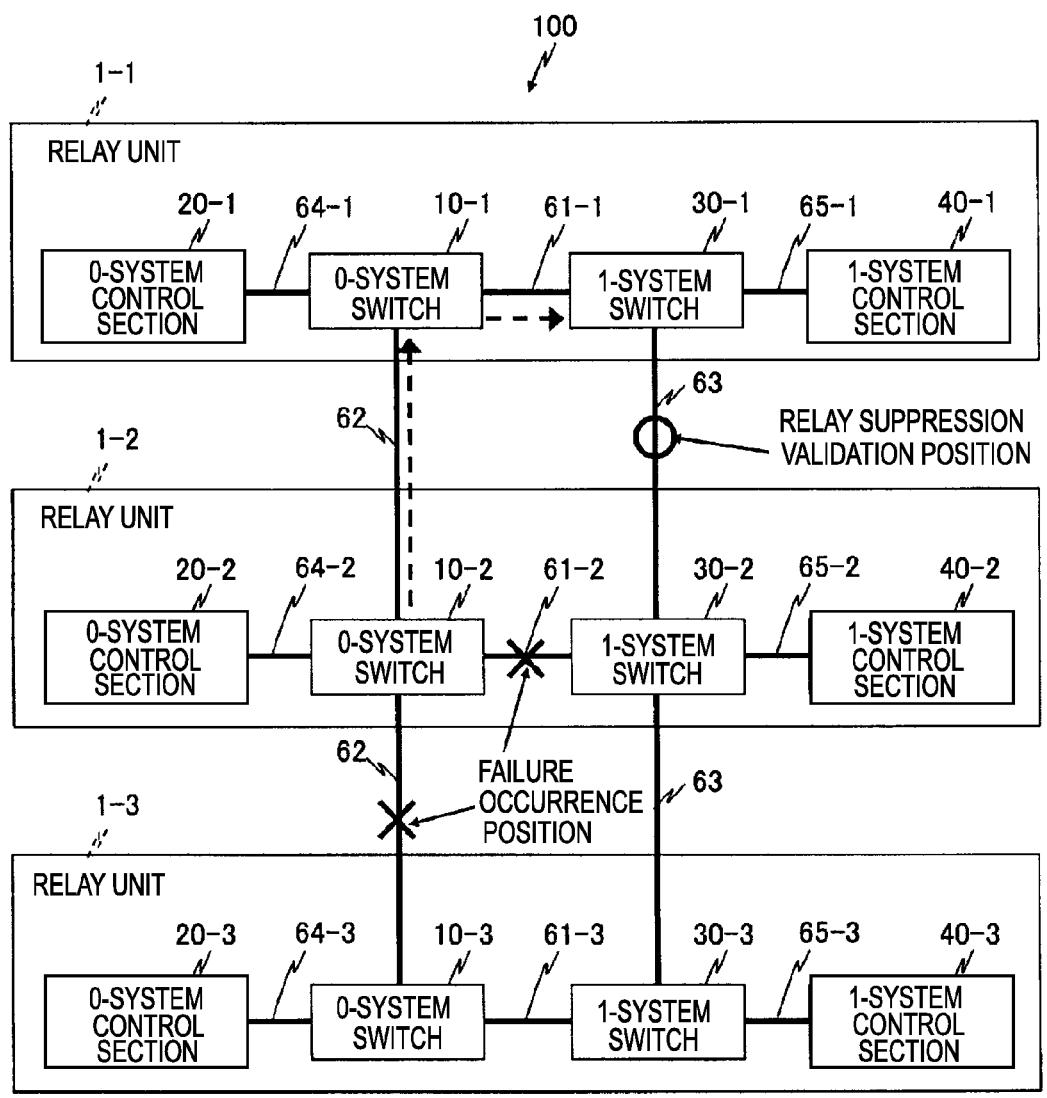
FIG. 59 is a diagram illustrating a failure occurrence position, a relay suppression invalidation position, and the flow of an inter-system communication invalidation notification in the relay system in FIG. 57.

FIG. 59 illustrates a failure occurrence position, a relay suppression invalidation position, and the flow of the inter-system communication invalidation notification in the relay system 100. The flow of the inter-system communication invalidation notification is indicated by a dashed arrow.

When a failure detection notification of the detection of a communication failure between the 0-system switch 10-2, which is the control target switch, and the 1-system switch 30-2, which is the opposite switch, has been received from the failure detecting section 14 of the 0-system switch 10-2, the connection state notifying section 24 of the 0-system control section 20-2 transmits the inter-system communication invalidation notification to the 0-system control section 20-1, which is an upper device.

If communication is established between the 0-system control section 20-1 and the 1-system control section 40-1 when the notification receiving section 22 of the 0-system control section 20-1 has received the inter-system communication invalidation notification from the 0-system control section 20-2, which is a lower device, the connection state notifying section 24 of the 0-system control section 20-1 relays the received inter-system communication invalidation notification to the 1-system control section 40-1, which is the other system-control section.

Since command 5 has been issued to the 1-system switch 30-1, which is the control target switch, the command section 25 of the 1-system control section 40-1 issues a relay suppression invalidation command 6 to the 1-system switch 30-1 when the notification receiving section 42 of the 1-system control section 40-1 has received the inter-system communication invalidation notification from the 0-system control section 20-1, which is the other system-device.

In response to command 6 from the command section 45 of the 1-system control section 40-1, the 1-system switch 30-1 can relay a specific frame which is received thereafter to the 1-system switch 30-2, which is the opposite switch.

Even if the relay units 1-1, 1-2, and 1-3 are connected in three stages, the above-mentioned operation makes it possible to resume the relay of a specific frame by issuing a command to invalidate the suppression of relay to a control target switch. Therefore, it is possible to effectively utilize a frame relay path while preventing frames from being looped via the relay paths 61-1, 61-2, 61-3, 62, and 63.

Figure 60:
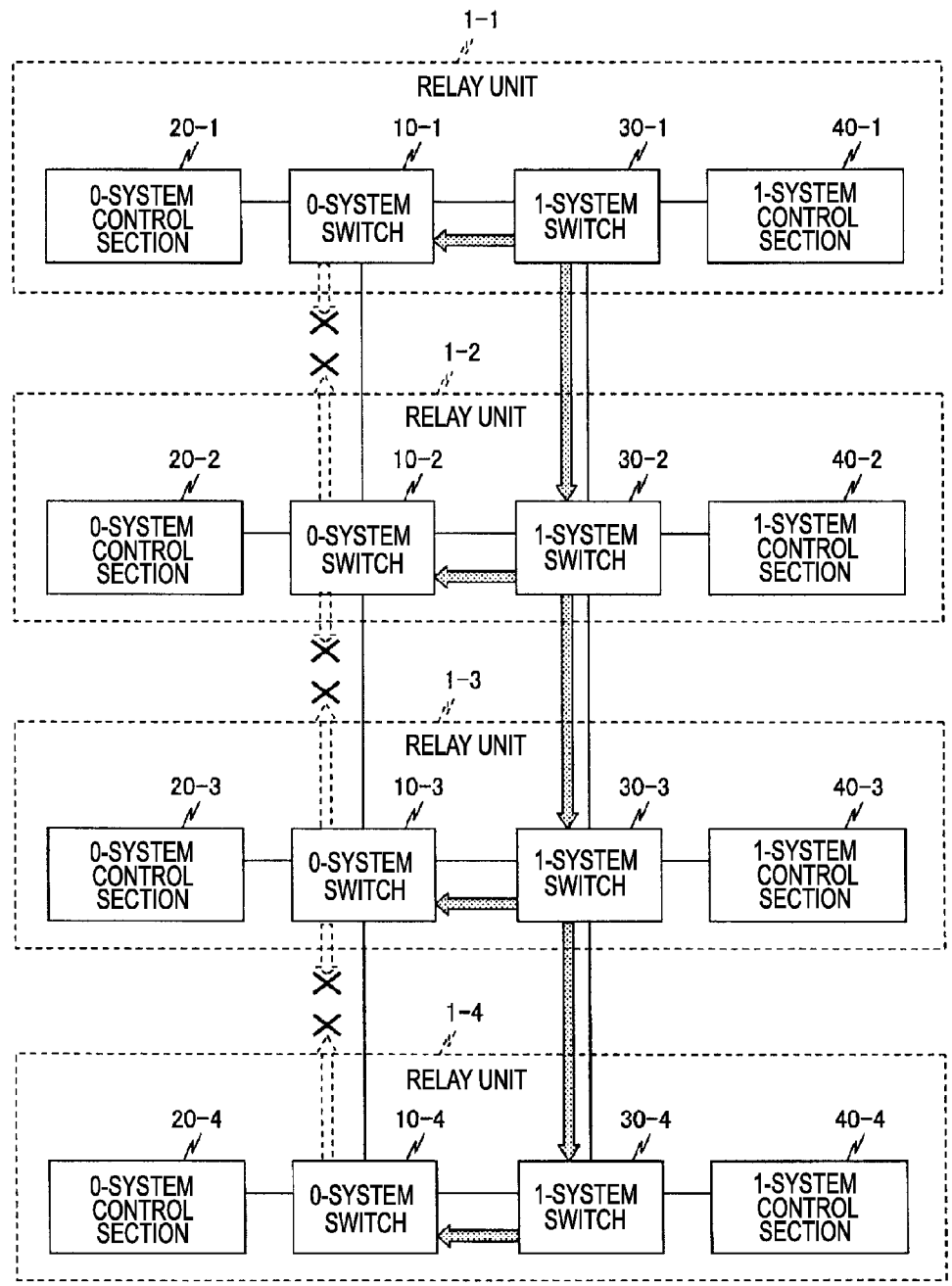
FIG. 60 is a diagram illustrating a frame relay flow from a 1-system switch when relay units are connected in four stages and the relay of a specific frame is suppressed.
Figure 61:
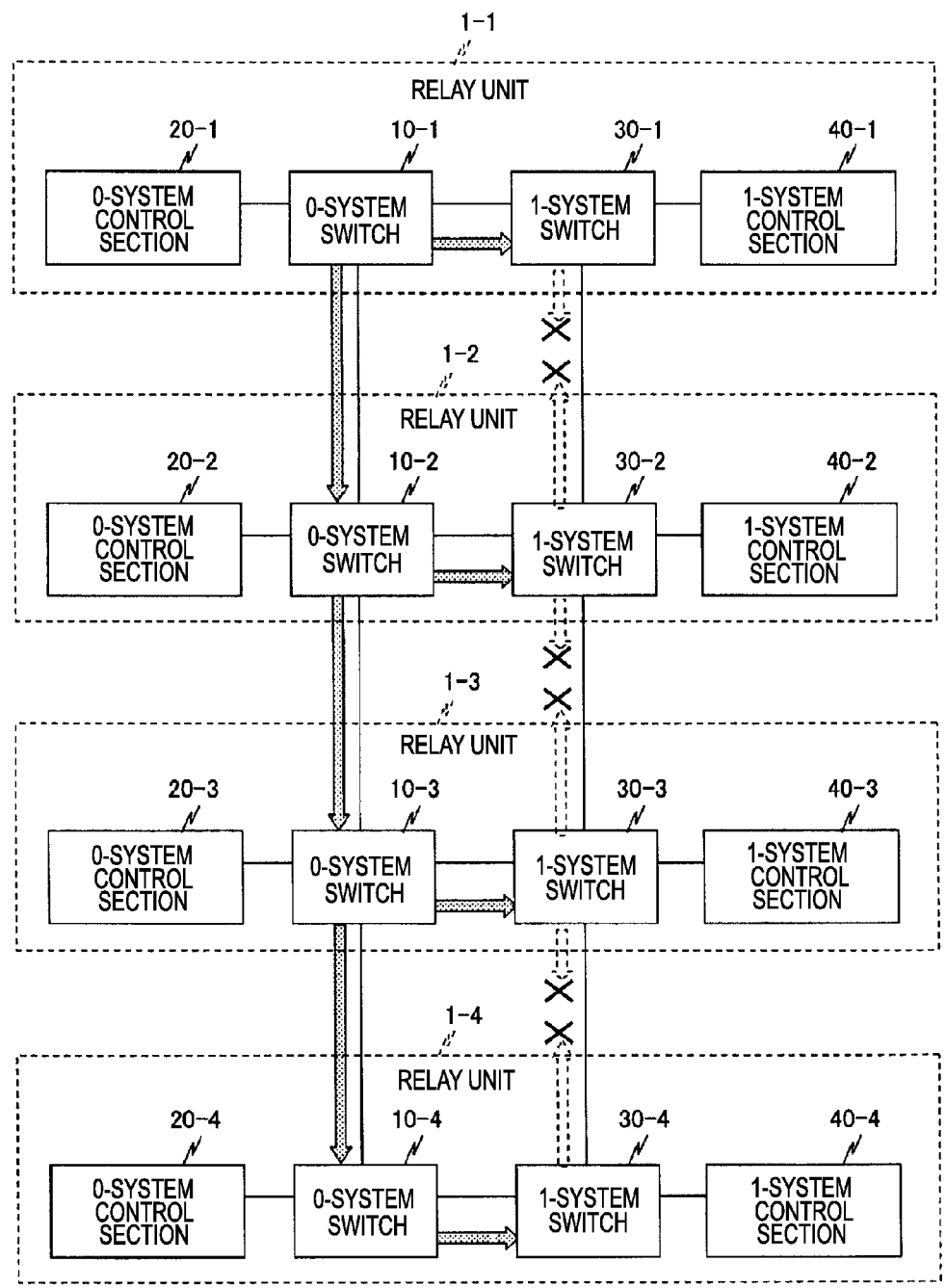
FIG. 61 is a diagram illustrating a frame relay flow from a 0-system switch when relay units are connected in four stages and the relay of a specific frame is suppressed.

In the above-described embodiment, the relay units 1-1, 1-2, and 1-3 are connected in three stages. However, the relay units may be connected in four or more stages. In this case, it is possible to achieve the same effect as described above. For example, FIG. 60 illustrates a frame relay flow from the 1-system switch 30-1 at the time of relay suppression of a specific frame when the relay units are connected in four stages. FIG. 61 illustrates a frame relay flow from the 0-system switch 10-1 at the time of relay suppression of a specific frame when the relay units are connected in four stages. Even if the relay units are connected in multiple stages, the relay flow makes it possible to prevent frames from being looped via relay paths while maintaining the redundancy of a frame relay path.

As described in the first and second embodiments, in the relay unit according to the invention, each control section can select and execute one of the control aspects of the relay operation of a control target switch described in the first and second embodiments according to the number of connections stored in the connection state storage section 21 or 41. In addition, as described in the second embodiment, it is possible to select a control aspect of the relay operation according to the connection priority. For example, the inter-system communication validation notification is transmitted from a relay unit with a lower connection priority to a relay unit with a higher connection priority, and the relay unit further relays the received inter-system communication validation notification to an upper relay unit according to a failure condition.

Embodiments of the present invention are described above, but the present invention is not limited to the embodiments as will be clear to those skilled in the art.

What is claimed is:

1. A relay unit configured to cascade in multiple stages to form a LAN, comprising:
   a main-system line and a sub-system line that are configured to relay a frame;
   an inter-system line that connects the main-system line and the sub-system line;
   a main-system switch and a sub-system switch that are connected to each other via the inter-system line, that are connected to the main-system line and the sub-system line, respectively, and that are configured to relay frames; and
   control sections configured
      to control a relay operation of each of the main-system switch and the sub-system switch,
      to store information on a number of connections of relay units in the LAN and information on a connection priority of the relay unit to which the control sections belong, and
      to select a control aspect of the relay operation of at least one of the main-system switch and the sub-system switch according to the number of connections and the connection priority, wherein the control sections are configured to, upon detecting that the number of connections is 2, perform a frame relay suppression control to thereby prevent the main-system switch and the sub-system switch from relaying, to the main-system line or the sub-system line, a frame that is received via the inter-system line; and each of the control sections is configured to store connection state information on a connection state among the control sections, to update the stored connection state information based on the stored connection state information and connection state information obtained from the others of the control sections, and to perform the frame relay suppression control upon detecting that the updated connection state information corresponds to a connection state in which the control sections are permitted to communicate with one another.

2. The relay unit according to claim 1, wherein the control section rewritably stores the information on the number of connections and the information on the connection priority.

3. A relay system, comprising:
 a first relay unit having a first main-system switch and a first sub-system switch connected via a first inter-system line;
 a second relay unit having a second main-system switch and a second sub-system switch connected via a second inter-system line;
 a main-system line connecting the first and second main-system switches;
 a sub-system line connecting the first and second sub-system switches; and
 a plurality of control sections configured to respectively control the first main-system switch, the first sub-system switch, the second main-system switch and the second sub-system switch, based on information of connection states of the control sections to their respective switch, and that of connection states of the connected switches, wherein each of the control sections is configured to store connection state information on a connection state among the control sections, to update the stored connection state information based on the stored connection state information and connection state information obtained from the others of the control sections, and, upon detecting that the updated connection state information corresponds to a connection state in which the control sections are permitted to communicate with one another, to perform a frame relay suppression control to thereby prevent the first and second main-system switches and the first and second sub-system switches from relaying, to the main-system line or the sub-system line, a frame that is received via the first or second inter-system line, and the control sections are configured to, upon detecting that a number of connections of relay units is 2, perform the frame relay suppression control to thereby prevent the first or second main-system switch, and the first or second sub-system switch, from relaying, to the main-system line or the sub-system line, the frame that is received via the first or second inter-system line.

4. The relay system of claim 3, wherein the information of connection states includes the number of connections between the first and second relay units, and connection priorities of the first and second relay units.

* * * * *